US009251464B1

(12) United States Patent
Kellas-Dicks et al.

(10) Patent No.: US 9,251,464 B1
(45) Date of Patent: Feb. 2, 2016

(54) ACCOUNT SHARING DETECTION

(71) Applicants: Mechthild Regina Kellas-Dicks, Coquitlam (CA); Yvonne J. Stark, North Bend, WA (US)

(72) Inventors: Mechthild Regina Kellas-Dicks, Coquitlam (CA); Yvonne J. Stark, North Bend, WA (US)

(73) Assignee: ServiceSource International, Inc., San Francisco, CA (US)

( * ) Notice: Subject to any disclaimer, the term of this patent is extended or adjusted under 35 U.S.C. 154(b) by 704 days.

(21) Appl. No.: 13/621,254

(22) Filed: Sep. 16, 2012

Related U.S. Application Data

(63) Continuation of application No. 12/547,423, filed on Aug. 25, 2009, now Pat. No. 8,285,658.

(51) Int. Cl.
*G06N 5/02* (2006.01)
(52) U.S. Cl.
CPC ....................................... *G06N 5/02* (2013.01)
(58) Field of Classification Search
None
See application file for complete search history.

(56) References Cited

PUBLICATIONS

Gutierrez, et al., Biometrics and Data Mining: Comparison of Data Mining-Based Keystroke Dynamics Methods for Identity Verification, MICAI '02 Proceedings of the Second Mexican International Conference on Artificial Intelligence: Advances in Artificial Intelligence, 2002, pp. 460-469.*
Scout Analytics, Inc., Non-final Office Action mailed Mar. 14, 2012 for U.S. Appl. No. 12/547,423., 8 pages.
Yu, Jinqiao , "TRINETR: An Intrusion Detection Alert Management and Analysis System", *Doctoral Thesis, West Virginia University.*, (2004), 167 pages.

* cited by examiner

*Primary Examiner* — Wilbert L Starks
(74) *Attorney, Agent, or Firm* — Blakely Sokoloff Taylor & Zafman LLP

(57) ABSTRACT

Apparatus and methods are described for detecting sharing of electronic or online accounts based on grouping of data samples that include keyboard input timing factors and optionally secondary factors. The data samples can be received from various computers having various keyboards of a certain type and may be input by more than one user. The data samples are grouped based on distances and ratios of mathematical combinations of distances between input timing of key events such as dwell and flight time, as well as optionally based on at least one secondary factor related to the keyboard input timing factors. Example secondary factors include a time of day of the input; and/or a machine identification, location, and IP address of the computer used to input the sample.

15 Claims, 26 Drawing Sheets

ACCOUNT SHARING DETECTION

RELATED APPLICATIONS

This application is a continuation of pending U.S. application Ser. No. 12/547,423 file Aug. 25, 2009, entitled "ACCOUNT SHARING DETECTION".

FIELD OF THE INVENTION

The invention relates to keystroke dynamics authentication and grouping. More specifically, embodiments of the invention relate to apparatus and methods for determining whether data samples are from more than one user based on keyboard input timing factors and optionally other secondary factors received from a computer during input of a character string. The input timing factors and secondary factors are used to group input samples of the character string to detect sharing of electronic or online accounts.

BACKGROUND OF THE INVENTION

Many business sell services or access to resources via electronic means, such as the Internet. Their business model requires users of provided services or resources to purchase licenses. In many licensing models, licenses are sold on a per-user basis. For the selling business revenue depends on the number of licenses sold.

Conversely, for the business's customer, expense depends on the number of licenses purchased. A customer of a business may choose to buy, or unknowingly have, fewer licenses than required. The customer may choose to share a single license among multiple users to reduce expenses. Many license or customer agreements prohibit such sharing.

For the business providing the service or resources, it is therefore important to verify the actual volume use of its services/resources to discourage and eliminate unlicensed access to its resources and to prevent revenue loss.

SUMMARY OF THE DESCRIPTION

Apparatus and methods are described for detecting sharing of electronic or online accounts based on grouping of data samples that include keyboard input timing factors and optionally secondary factors. The data samples can be received by a server computer from various computers having various keyboards of a certain type and may be input by more than one user. The data samples are grouped based on distances and ratios of mathematical combinations of distances between input timing of key events such as dwell and flight time, as well as optionally based on at least one secondary factor related to the keyboard input timing factors. Example secondary factors include a time of day of the input; and/or a machine identification, location, and IP address of the computer used to input the sample. The secondary factors may be automatically generated and used by the server without the user's knowledge or control of their generation and use.

BRIEF DESCRIPTION OF THE DRAWINGS

The present invention is illustrated by way of example and not limitation in the figures of the accompanying drawings in which like references indicate similar elements. It should be noted that references to "an" or "one" embodiment in this disclosure are not necessarily to the same embodiment, and such references mean "at least one." According to some embodiments, parallelograms are used to identify data (input or output) and rectangles are used to identify processing elements (e.g., mechanisms).

DETAILED DESCRIPTION

Figure 1:
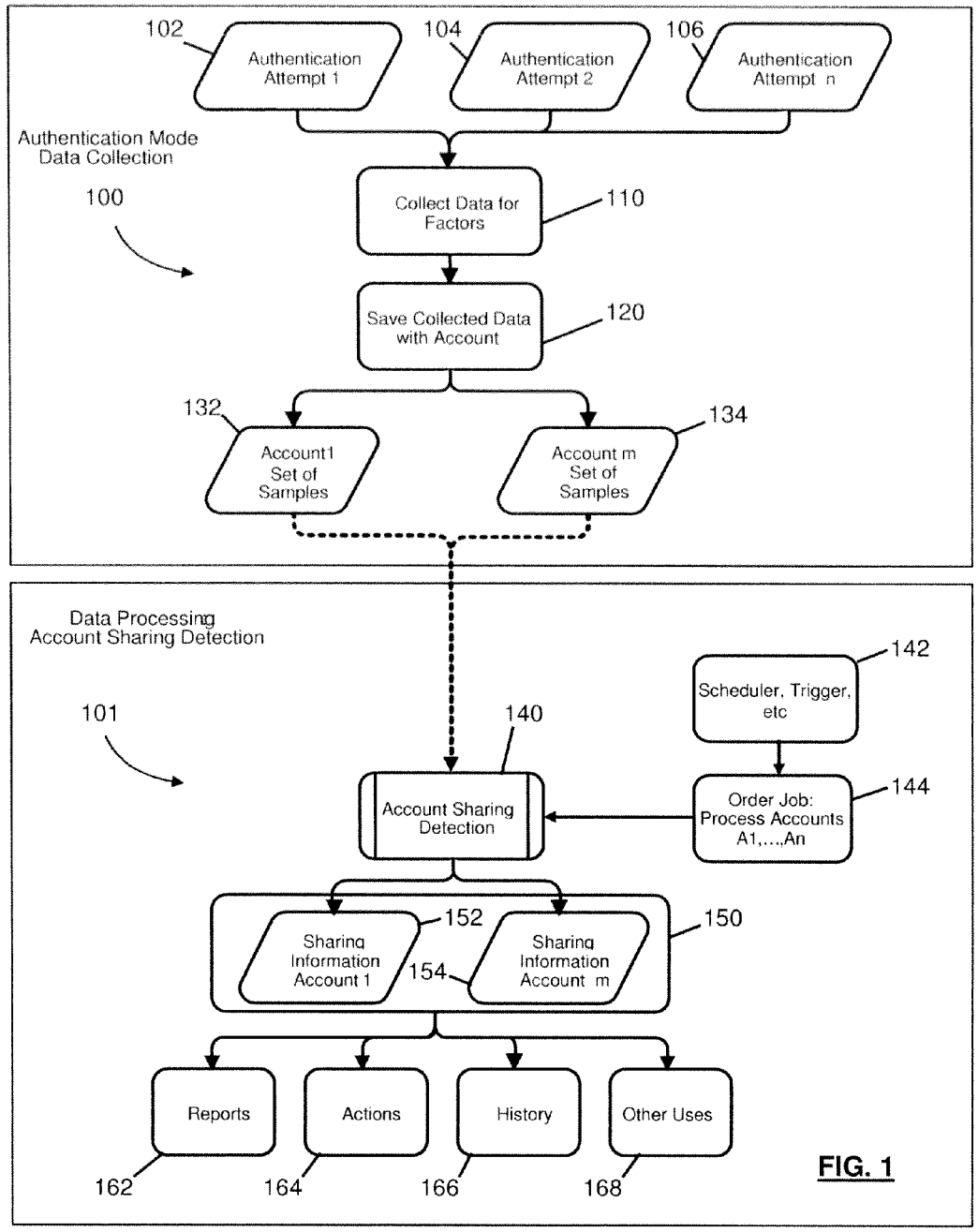
FIG. 1 is a flow diagram of a mechanism for data collection and data processing for account sharing detection, according to embodiments of the invention.

Access to resources provided via electronic means, such as via the Internet, is often anonymous to the degree, that it is difficult to discover how many users are sharing the access provided by one license. A few approaches that have been tried before are:

Access requirements include physical tokens, usernames, passwords: All can be shared and have been shared with various degrees of convenience to the sharer Detecting the number of distinct machines accessing a service: Access from multiple machines does not always mean that there are multiple users—some users have multiple machines or they work in a lab or office which provides multiple machines, any of which can be accessed by any user. On the other hand multiple users may try to hide their activity by sharing a single machine for the purpose of accessing an expensive resource while using only one license.

Detecting access locations: Access from multiple locations similarly does not prove the existence of multiple users: Laptops can travel with their owners, different access portals may appear as different physical locations: For example, AOL customers logging in through AOL always use IP addresses that are registered to Virginia. Therefore, IP addresses are not reliable in identifying multiple users Other attempts at detecting account sharing look at the number of detected machines, the number of detected IP addresses, relationships between the two, etc.

All these method suffer from two shortcomings:

It is very difficult to determine sharing with high confidence

It is very easy to miss account sharing

The underlying reason for these shortcomings is, that none of these methods provide a strong link to the actual user. A link to an object, such as a token, a machine or an IP address may be much less conclusive.

Embodiments of the invention use biometrics in the form of keystroke dynamics to detect account sharing. Biometrics ties the use of a resource to characteristics of an actual person. For example, an embodiment of this invention can tie the use of a resource to how the user typed the access credentials. Based on keystroke patterns that are captured and analyzed during resource access an embodiment of the invention can detect which accounts are highly likely shared, and even how many users are likely to be sharing the account.

Embodiments of the invention provide details on an account that are both informative and usable in actions for prohibiting account sharing, by answering these questions:

Is the account likely shared?

How many different users are likely to be sharing the account?

What are the details of account use: Machine information, IP Address and geographic information, time of day, etc, that go along with each use and with each detected user What is the amount of use by the non-primary user: How often do a second, third etc user access the account, what percentage of all occurrences of usage do these non-primary uses constitute, etc.

A business intent on ensuring compliance with a one-user-per-license model can use embodiments of this invention to detect misuse, to issue warnings to suspected offenders, to monitor accounts for further misuse, and ultimately to enforce compliance through added security measures.

Without the knowledge of which accounts are shared or might be shared, a business may feel forced to inconvenience a large majority of complying users through added security and enforcement measures. On the other hand, through the use of embodiments of this invention the business gains knowledge of suspected shared accounts; then it has the option to target a minority of suspected offenders only, and to let the majority of users proceed without added inconvenience.

In this manner, embodiments of this invention may provide benefits to the business using it, such as: disabling impermissibly shared accounts, revenue recovery from shared users for the business and convenience to the business's customers. Other benefits to the business are conceivable, such as gaining better insight into their user population and into the way provided resources and services are being used.

In the following account sharing detection embodiments of the invention are detailed, including two specific embodiments described as: (1) some embodiments, which have undergone thorough testing and evaluation, and (2) newer additional embodiments that try to address a few practical issues found with the embodiments of (1).

General Considerations

Some factors used in account sharing detection may be linked to a physical machine, a physical location, a physical token, or an Internet connection. Other factors used in authentication are knowledge that is intimate enough to be available only to the person or to another person in close contact. Already account names and passwords are shared by users for convenience or for escaping additional license fees, and a person sharing such information might easily share more knowledge or physical connections to escape detection. Biometric features are unique to a person and are much harder to share. Keystroke dynamics requires no extra hardware beyond what the user of a software account would need anyway. Thus keystroke dynamics is uniquely positioned to detect account sharing.

Keystroke Dynamics Basics

Keystroke Dynamics may be a tool used in embodiments of this invention. This section provides background and information on keystroke dynamics as it may be used in embodiments of the invention.

Timings

Electronic keyboards, keypads and other electronic input devices that allow a person to press a key or a button trigger events in connection with any key-press: At the minimum an event is triggered when a key is pressed and another event is triggered when that key is subsequently released. Executing a sequence of keystrokes, for example by typing a text on an electronic keyboard, generates a sequence of key-events, one down-event and one up-event for each key-press. Each event has a timestamp. For example the result of typing "abc" on an electronic keyboard results in 6 timestamps, 2 for each of keys 'A', 'B', 'C':

A-down-time, A-up-time, B-down-time, B-up-time, C-down-time, C-up-time

Typing Rhythm and Biometrics

According to embodiments, the absolute timestamps by themselves may not be meaningful, but the time periods elapsed between any 2 events describe how the sequence was typed: Fast, slow, which keys were held down longer than others, etc. Thus the sequence of timings contains the information necessary to describe a typing rhythm.

It has been found, that an individual tends to type a sequence of characters similarly from one time to the next. The individual's typing rhythm depends on their typing ability, their finger length and mobility, their typing style and various other physical properties. For a standard keyboard and a standard typed string, the typing rhythm is a biometric characteristic of this individual that remains more or less the same.

It has further been found, that two different individuals often type the same string (e.g., a username and/or password) in two different ways. The typing rhythm of person A may be quite different from the typing rhythm of person B. If there is knowledge of A's typical typing rhythm and B's typical typing rhythm, both for the same string, then some embodiments of the invention are able to tell from just a set of timings captured from the typed string, whether it was person A who typed the string or whether it was person B.

Features:

Suppose a string 's' of length n was typed and resulted in absolute time stamps

{k1-d ("key-1-down-timestamp"), k1-u ("key-1-up-timestamp"), ... kn-d, kn-u}

Since absolute time stamps of a typed string may be meaningless by themselves, a set of mathematical derivatives (e.g., calculations, determinations, or numerical data values) called "features" may be extracted from the sequence of time stamps. For example the following features have been of interest:

Dwell: The time interval from key-press to key-release. There are n dwell times associated with s: $D1=k1\text{-}u\text{-}k1\text{-}d, \ldots Dn=kn\text{-}u\text{-}kn\text{-}d$.

Flight: The interval from key-release to key-press of the next key.

There are n−1 flight times associated with s: $F1=k2\text{-}d\text{-}k1\text{-}u, \ldots F(n-1)=kn\text{-}d\text{-}k(n-1)\text{-}u$.

Latency: The interval from key-press to key-press of the next key.

There are n−1 latencies associated with s: $L1=k2\text{-}d\text{-}k1\text{-}d, \ldots, L(n-1)=kn\text{-}d\text{-}k(n-1)\text{-}d$.

These features are also time intervals themselves. (Note that flight can have negative values). However, features don't need to be time intervals; for example:

Dwell Tendency: A number in 0, −1, +1, indicating, whether dwells increase in size or decrease.

There are n−1 dwell tendencies associated with s:

DT1 (Dwell Tendency '1') compares dwells D1 to D2:

If D2 is much larger than D1, then DT1=1

If D2 is much smaller than D1 then DT1=−1

Otherwise DT1=0

DT2 compares D2 to D3, etc.

Features may be important in embodiments of this invention, since account sharing detection involves the comparison of typing rhythms and the comparison of typing rhythms may be based on the analysis of features. For a more detailed account of keystroke dynamics features and their use, see Additional Keystroke Dynamic Features and Their Use below.

Analysis Prerequisites

According to embodiments, typing rhythms can be compared to determine with some degree of confidence whether two incidences of typing originated from the same typist or from two different typists. Although one typist will repeat the same or a similar typing rhythm for the same string (e.g., a username and/or password), he may easily use two completely different rhythms when typing two different strings. For example, a typist will almost certainly type string "asdf" with a different rhythm then he would type string "afsd". In order to compare typing rhythms in any meaningful way it may be therefore essential to compare only the rhythms of the same string or strings typed on different occasions.

In practice, it has been useful to compare the biometric typing rhythms of strings entered into a username field, into a password field, or into another field that requires the user to type a predefined string (e.g., the same string, known by the user, and typed in at least approximately 2 times). It has also been useful to collect timings from multiple of those strings at the same time (such as entries from username and password fields during authentication), combine them into a single feature set and to compare feature sets from different logon attempts in order to compare typing rhythms. For example, typing rhythm timings of multiple samples can be compared to each other using cluster analysis, etc. as described herein. For getting more conclusive evidence of multiple patterns (e.g., sharing) a threshold may be set for identifying a group only if the number of samples in that group is greater than the threshold. This may amount to a minimum of 10 or more samples being required in order to have enough samples for just 2 even groups (e.g., 5 sample per group threshold). In some embodiments, cluster analysis only comes into play when more than 2 samples are compared to identify whether they are from more than one user. For just 2 samples, identification can be accomplished using only a sample distance comparison. For more than 2 samples, sample distance and cluster analysis can be used to group the multiple samples into sets of similar samples (e.g., similar with respect to Sample Distance). Here, a 2-sample set analysis can be considered as a "cluster analysis".

In Keystroke dynamics analysis the string may (or optionally, must) remain constant because it determines the physical layout of the keys to be hit and thus has great influence on the timings. Similarly the physical characteristics or type of the keyboard may (or optionally, must) remain constant for timings to be comparable from one typing sample to the next. For instance, at least one user may type the same string of keys (e.g., username and/or password, including upper and/or lower case letters, and optionally, numbers, symbols and/or characters) into one keyboard. Also, at least one user may type the same string of keys into multiple different keyboards of the same "type", such as various keyboards having the same key layout for the keys of that string of keys.

In some cases, keyboards of the same type may include keyboards that are all manufactured by the same manufacturer and have the same model number; all have keys in the same layout; all have letter, number and shift keys in the same layout; are all one "QWERTY" layout keyboards; Chinese layout; Hebrew layout; Arabic layout; one of various Asian language layouts; various Baltic language layouts; various cell phone layouts; various PDA layouts; or various touchpad keyboard layouts. A QWERTY layout may describe a QWERTY English layout, QWERTY US-International layout, QWERTY with Latin characters and accents, QWERTY with a European layout (e.g., French, Italian, etc.), or QWERTY with UK-Extended Layout. In some cases, keyboards of the same type will be keyboards that are attached (wired or wireless) as input devices, to different computers.

It may be a fact that users of an account rarely all use the same keyboard, and even a single user may switch from one keyboard to another for different occasions. Nevertheless, in most cases identical layout of keys is sufficient to guarantee that highly similar patterns are produced by the same person across multiple keyboards. In some cases, an identical layout is not essential, as long as most (e.g., over half) of the keys that are used in the biometric comparison are in the same place. In such cases, it may be possible for the same user not to be miss-identified as an imposter, even when using a different language (e.g., Spanish or French instead if English) keyboard layout where the user has to practice to even find the keys.

Therefore, example prerequisites for effectively comparing typing rhythms for keystroke dynamics analysis are:

Only timings from the same string or strings can be compared

Only timings generated by the same-layout keyboard can be compared

Authentication Attempts and Samples

Embodiments of the invention perform account sharing detection on data in many different ways: Data can be obtained by observing behavior and extracting data at any point during the time an account is accessed or at any other time data about an account becomes available. Data could become available from a separate source such as another application or from a database, it may be detected or delivered or deduced or come by in other ways. Data processing may be done in real time or scheduled or delayed or processed in other ways that are useful to the user of embodiments of the invention.

One embodiment of the invention collects data during credential verification (e.g., username and password) when users access a credential-protected account. Credentials provide for strings that are typically familiar to the account user and thus in the large majority tend to be typed at a consistent rhythm for any individual user. These strings also remain the same for a long period of time (at least until the next password change) and thus provide a good basis for comparison using keystroke dynamics. In many environments credential verification also provides a well-defined access point that any user has to pass through in order to access an account. Therefore credential verification may be a good time to collect various observations and details, and there is a good chance that all other authentication attempts will allow the collection of similar and thus comparable information.

This model of data collection during authentication has proven itself to be attractive to prospective customers and very useful for other keystroke analysis methods. In the following it is this model described above (the "authentication model") that may be used for demonstrating the technology and the workings of embodiments of the invention. The embodiments of the invention are not limited to this model, nor are their technology elements limited to this model. It is for better clarity that the invention may be described by example, using the authentication model.

In the authentication model, an embodiment of the invention collects data during the process in which an account user (of an Internet accessible account, for example) establishes access to his account. Collected data can include keystroke timings for the access credentials, time stamp, IP address of the account user's Internet connection, information on cookies stored on the account user's machine, etc. Each of the different types of data items (IP address, timings, etc) can be called a "factor". An authentication attempt will yield values for one or more factors. This data collection of factors and values of a single authentication attempt can also be called a "sample" for short.

An embodiment of the invention using the authentication model collects samples, i.e. the data from authentication attempts. The data may be stored or kept in memory. After multiple samples have been collected for an account an embodiment of the invention processes these samples to determine account sharing characteristics of the account. This process may be scheduled or it may run after each authentication or it may be triggered by some other event.

FIG. 1 is a flow diagram of a mechanism for data collection and data processing for account sharing detection, according to embodiments of the invention. A "mechanism" may describe a process, device (e.g. computer including specialized hardware and/or software), method, system, software (e.g. stored on a recordable medium, and able to be executed by a processor) able to perform the functionality described herein. In some cases, a mechanism may include elements of a block diagram, flow diagram, dendrogram, or other figures or data described herein.

Authentication mode data collection mechanism 100 includes Authentication Attempt blocks 102, 104 and 106. Attempts 102-106 are collected at Collect Data for Factors block 110 which provides the data to Save Collected Data with Account block 120 where the authentication attempt "samples" of blocks 102-106 collected at block 110 are saved and associated with each electronic or online account. At block 132-134 samples are separated or identified by account. For example, the Account 1 Set of Samples of block 132 is distinguished or separate from the other accounts, such as Account m Set of Samples of block 134.

Data processing account share detection mechanism 101 includes Account Share Detection block 140 which receives the samples of accounts from blocks 132-134. Scheduler, Trigger, etc. block 142 is received at block 144 which sends an Order Job: Process Accounts A1 through An, signal or command that causes detection block 140 to determine whether an account is being shared by more than one user. Results block 150 (e.g. results from block 140) includes information identifying whether sharing has been detected for Account 1 through Account m at blocks 152 through 154. For example, block 150 includes Sharing Information Account 1 block 152, through Sharing Account Information m block 154. Block 150 then produces Reports block 162, Actions block 164, History block 166, and Other Uses block 168 based on whether accounts are detected as being shared in blocks 152 though 154. Herein "identifying" or "identification" may describe a process of grouping, clustering, separating, dividing, determining, calculating outliers, calculating groups, or selecting portions or characteristics of data, including as described herein.

Thus, samples of character strings, such as user name and/or passwords may be input at least once at each of blocks 102 through 106 from various computers, each having a keyboard of one type (e.g. QWERTY, etc.). At block 110 the keyboard input timing factors and secondary factors from each attempt are collected along with information identifying the account, such as the user identification or user name. At block 120 the data samples are saved and correlated or identified with each user account so that they can be sorted by account at blocks 132-143. At block 140, the samples are analyzed to determine whether the accounts are being shared so that sharing information can be provided at block 150, which may result in reports 162, actions 164, history 166 or other uses 168, any of which may be output to a display for viewing, output to a printer for printing, or output to an other device such as an electronic file, database, or link. In some cases the sharing information results: could be entered in error logs; cause administrative alerts to be transmitted; sounded or displayed; could be stored in databases and used in statistical analysis; and/or could become part of an account's profile, etc. Thus, block 150 may provide a warning identifying that the samples are from more than one user, to a display or a printer. Moreover, block 150 may provide a report of whether the samples are accepted or rejected, such as due to sharing, to one of a display, a network communication output, or a printer. Block 150 may also provide detailed information on the type of sharing detected: The number of suspected users, the login volumes per user, degree of support for these findings by secondary factors, etc.

The secondary factors may include non-keyboard timing (non-KD) data automatically sent from or generated by the computer at which the user inputs the character string, during or after input of the string of the sample. The secondary factors may be data different than or other than the timing factors or string characters. In some cases, the secondary different factors include one or more of a time of day (e.g., date and time) during input of the data sample, a machine identification of the computer, a location of the computer (geographic identification of whether or not the computer is inside: the United States, a certain state, a certain city, and/or a certain IP address range), and an Internet protocol (IP) address.

Automatic generation may be triggered by the computer detecting (e.g., software of the computer, running on a processor of the computer sending the string to the server) the user name, string of characters, or input to a menu for inputting the string. In response to the trigger, the sending computer may generate and send the secondary factors with the user name, timing data of the string, string of characters, or independently. The sending computer may send the secondary factors without the user's knowledge, control and/or intent of sending of the secondary factors to the server.

In some cases, automatic generation is triggered by the receiving server computer detecting (e.g., software of the computer, running on a processor of the server computer) receipt of the user name, string of characters, or input to a menu for inputting the string. Here, in response to the trigger, the receiving server computer may generate and store the secondary factors with the user account, timing data of the string, string characters, or independently (e.g., by relating or associating the secondary factors with the user account, timing data and/or the string characters of the sample). The receiving server computer may generate and store the secondary factors at the server without the user's knowledge, control or intent of generating and storing the secondary factors.

In come cases, a client computer automatically generates and sends the secondary factors in response to the user input of the string/password, such as using an applet, and/or upon receiving the "enter" key after the string is typed, and inserts the secondary factor data into a network communication packet including the string that is transmitted to the server. In some embodiments, values of secondary factors may be obtained by the server machine through an applet running on the client machine and being activated by a user interaction such as a login sequence. Such an applet may be hosted by a browser, it may be an Active-X or Flash or Javascript control, and it may have the ability to both read and write data on the host machine. Within the limits of its permissions the control may set the values of locally stored entities (such as cookies or Local Stored Flash Objects) for later recognition, or it may query the values of browser settings, previously stored entities or other machine or environment related data. Obtained information may be compiled and encoded and returned to the server machine using any of a variety of formats, protocols and transmission mechanisms such as XML, SOAP, HTTP, TCP/IP. From a set of secondary factor values obtained at the client machine the server machine may derive additional second factor values through deduction or reference lookup, such as the lookup of geographic or other information associated with IP addresses. One example of a data collection mechanism may be a Flash control which contains text fields for username and password and a SUBMIT button and which is hosted by a browser on the client machine. When a user presses SUBMIT after entering access credential, the Flash control can interact with the client machine to store or retrieve information, it can compile and encrypt the information into a string and return the string back to the server as part of the HTTP post back triggered by the SUBMIT event.

Determining whether an account is shared may include calculating feature set data of each pair of the samples using the keyboard input timing factor data and the non-keyboard factor data, and using the data by comparing the feature set data of each pair of samples to at least one threshold to group the samples into at least one cluster. In some cases, such comparing may include (A) calculating distance data (e.g., "measures") between each (optionally between each non-discarded outlier) data point pair of the feature set data of each pair of samples, (B) calculating ratios (e.g., "measures") of (1) mathematical combinations of distances between some of the data point pairs of the feature set data (e.g., an aggregate or average of intra-cluster distances of data point pair of non-outliers) and (2) the mathematical combination of distances between all of the data point pairs of the feature set data (e.g., an aggregate or average of inter-cluster distances data point pair of non-outliers), and (3) identifying the existence of at least one cluster of the feature set data by comparing the ratio data to a ratio threshold and by comparing the distance data to a distance threshold. This process may be repeated to identify one or more of the clusters, each indicating or evidencing a different user's input to attempt to access the single account.

As further described herein, one pair of samples may lead to one pair of data vectors, which may lead to multiple pairs of feature-specific vectors (one pair for each feature), which may lead to multiple pairs of matching data points (multiple pairs for each pair of feature vectors). Thus, the data point pairs can be distinguished from data point vectors, which are not pairs themselves, but are paired for the purpose of comparing two samples (the vectors each represent one sample). More specifically, some embodiments use, "Data point pairs" to refer to the corresponding feature data of two samples, such as the pair {Dwell-1 (Sample1), Dwell-1 (Sample2)}. Further, some embodiments use "Data point feature vectors" to refer to all of one type of feature data of one sample, such as the data {Dwell-1, Dwell-2, . . . (All Sample 1)}, or {Flight-1, Flight-2, . . . (all Sample 1)}. Also, some embodiments use, "Data point vectors" to refer to all of multiple (or all) types of data point feature vectors joined together, all for same sample, such as the data of {Dwell-1, Dwell-2, . . . , Flight-1, Flight-2, . . . (All Sample 1)}. Next, some embodiments use, "Pairs of Data point vectors" to refer to the corresponding data point vectors of two samples, such as the pair of data point vectors v1 and v2 for 2 samples, Sample 1 and Sample 2.

Thus, in some embodiments, calculating the distance data can be described as calculating distance data (e.g., "sample distance") between data point vectors of feature set data of each pair of samples (e.g., a sample based calculation); and calculating the ratios can be described as calculating ratios of mathematical combinations of distances (e.g., sample distance) between pairs of data point vectors of the feature set data in each of two clusters of the data point vectors (e.g., a cluster based calculation, using the distance date from the sample based calculation). Thus, in this example, the vectors are Data Point Feature Vectors for each feature for each pair of samples, and the distance data may be referred to as the "Sample Distance" for 2 samples, which is the distance between the two samples, also referred to as "KD-Distance". In some cases, sample distance may be the distance between Data Point Feature Vectors for any meta or temporary data, such as distance between just the dwell feature vectors, etc.

It is worth noting that in some cases herein, the term "distance" is used to refer to other distances such as "Cluster Distance" which is compared to a threshold for the purpose of determining the type of cluster iteration. Also, herein, use of the "difference between two points in a data point pair" may refer to the measure used to rank and eliminate data point pairs as outliers from the calculation of Distance between 2 samples. The "difference between two points in a data point pair" may also be referred to as "feature point distance".

Prior to calculating distance data, at least one outlier data point pair of the feature set data of each pair of samples may be identified and discarded (e.g., based on feature point distances of each pair of samples, such as by comparing all dwell feature point distances of one pair of samples to one another and eliminating the pairs of dwell points with the largest distance; and by comparing the flight feature point distances of one pair of samples to one another and eliminating the flight point pairs with the largest distance). Outlier data point pairs for each pair of samples may be independent or different than the outlier data point pairs of another (or each other) pair of samples. With or without the outliers, calculating distance data may include calculating time difference measurements between pairs of data points of keyboard input timing factors (e.g., all pairs, or some pairs if outliers are excluded from the calculation); calculating ratio data may include calculating ratios of combinations of the time difference measurements between pairs of data points of feature sets of pairs of samples (e.g., calculating ratios of sums or averages of distances between a plurality of subsets, each subset including a plurality of the data point pairs of the feature set data); and identifying the existence of at least one cluster may include at least completely removing a cluster (e.g., as to remove a cluster of outlier data), merging two clusters (such as to indicate that the data of those two clusters are samples input by a single users), or identifying at least one cluster as distinct (such as to indicate that the data of that clusters is samples input by a single users, and any additional clusters identified will identify samples input by a second user) based on (1) comparing the cluster distance data of two clusters, (e.g., based on the distance data) to a distance threshold, and (2) comparing the ratio data to a ratio threshold. Such ratios of combinations may be described as ratios of combinations (typically aggregates or averages) of distance measures (KD distance) between pairs of data point pairs. In some cases, indicating that a cluster is distinct (e.g., "completing" a cluster) may designate the cluster as a unique, standalone pattern or group. According to some embodiments, once a cluster has the "complete" designation it is not further examined for closeness to other clusters, it is no longer merged or removed or completed again.

Moreover, in some embodiments, determining whether an account is shared may include (A) calculating (or receiving) a plurality of dwell time data points and flight time data points for each sample; (B) calculating feature point distances between dwell time and flight time data points of each pair of samples; (C) identifying a first set of clusters based on the feature point distances and a first distance threshold; (D) calculating ratios of combinations of distances (e.g., sample distances) between some of the pairs of data points (e.g., within a cluster) and the combination (e.g., average) of all the ratios (e.g., within the one cluster and another cluster).

(E) comparing the ratios to a second threshold to identify a second set of clusters, wherein the second set of clusters is based on the first set of clusters and the ratios. Prior to calculating feature point distances, at least one outlier of the dwell time and flight time data points of each pair of samples may be identified and discarded (e.g., based on feature point distances of each pair of samples). This process may be repeated to identify one or more of the clusters, each indicating or evidencing a different user's input to attempt to access the single account.

In some embodiments calculating ratios may be described as calculating ratios of (1) mathematical combinations of distances between the pairs of data point vectors within each cluster of the first set of clusters and (2) mathematical combinations of distances between the pairs of data point vectors within a union of two clusters of a first set of clusters.

In some cases, the existence of at least two first clusters of the feature set data may be identified by comparing the distance data to a distance threshold; then combinations of distances between data point pairs of the feature set data in each of the first clusters and in the union of the two first clusters are calculated; then ratios between the three calculated combinations of distance data are calculated; and then the existence of at least one second cluster of the feature set data is identified by comparing the ratio data to a ratio threshold, and by comparing the distance data to a distance threshold (and optionally, also by comparing the distances of the secondary factors with a third threshold).

Also, in some embodiments, in addition to distance (e.g., cluster distance) and ratio data, determining whether an account is shared may include correlating a "secondary" factor (e.g., another non KD or a secondary factor) of each sample in each cluster; and identifying a set of clusters based on a comparison of the cluster distances to a distance threshold, a comparison of ratio scores to a ratio threshold, and a comparison of the other factor correlations (e.g., calculated by comparing the other factors of each sample of one cluster to the other factors of each sample of another cluster) to an other factor threshold, wherein identifying the set of clusters includes merging at least two clusters, completing at least one cluster, or deleting at least one cluster; and then identifying at least two clusters. A warning identifying that the samples are from more than one user may be displayed or printed if more than one cluster exists in the set of clusters. Likewise, based on merging, completing or deleting, the way the system provides access to an account associated with the samples entered (e.g., username or account) may be changed. For instance, the user's account policy may be changed if two or more clusters are identified. In some cases, access may be allowed to users that input samples that fall within a first cluster of the set of clusters, but denied to users that input samples that fall within a second cluster of the set of clusters.

According to some embodiments, determining whether an account is shared may include (A) receiving dwell time data and flight time data for a plurality of samples of the same one or more entered strings generated by a plurality of users typing on a plurality of keyboards of one type of keyboard attached to a plurality of computers; (B) calculating a plurality of dwell time feature point distances for pairs of data point vectors of pairs of the plurality of samples; (C) calculating a plurality of flight time feature point distances for pairs of data point vectors of pairs of the plurality of samples; (D) calculating a sample distance score between each pair of the plurality of samples based on the feature dwell distances and the flight distances; (E) identifying two clusters based on the sample distance scores; (F) calculating a cluster distance between two clusters based on the sample distance scores; (G) calculating a ratio score for each of the two clusters based on mathematical combinations of intra-cluster and inter-cluster sample distance scores of the two clusters; (H) receiving at least one other factor for each sample, the other factor automatically generated by the computer; (I) correlating the other factors in each of the two clusters; (J) based on distance scores between each pair of the plurality sample of the two clusters, the two ratio scores, and the correlated other factors, performing one of merging at least two clusters of the set of clusters, completing at least one cluster of the set of clusters, or deleting at least one cluster of the set of clusters. In some embodiments, based on merging, completing or deleting, the way the system provides access to an account associated with the same one or more entered strings can be changed.

Advantages of the above noted clustering embodiments include, without limitation thereto, that the information obtained by each criterion-specific processing (e.g., distance evaluation, ratio evaluation and second factor evaluation) is expressed as cluster relationships, so that the input to each criterion-specific processing is a cluster relationship and the output is a cluster relationship with more information. With each application of a criterion the knowledge pool of the relationship between the two examined clusters increases. The final output of processing using all criteria will be a new set of clusters and a new set of relationships. More specifically, for distance-evaluation the input may be 2 clusters, and the output may be the distance between clusters (if distance is small, clusters belong together, if distance is large, need more information). Potentially, clustering for the 2 inputs may be complete after distance-evaluation (e.g., this could be a first set of clusters). If not, ratio evaluation may be executed to provide more accurate evaluation than and after the distance-evaluation. Here, for ratio evaluation, the input may be the results from distance evaluation, clusters, and the output may be strong KD clusters (e.g., one or two standalone clusters) and clustering may be complete. Or the output may be a potentially emerging KD cluster, and secondary factor evaluation may be executed to provide more accurate evaluation than and after the distance+ratio evaluations. For the second factor evaluation, the input may be the results from distance and ratio evaluation, clusters. The output may be emerging KD (+secondary factor information) OR same cluster as the distance+ratio evaluations. Thus, if an only distance-evaluation or an only (distance+ratio evaluation) does not satisfy a strength of groupings threshold (e.g., for that type of evaluation), the next more sophisticated evaluation (e.g., (distance+ratio evaluation), or (distance+ratio+secondary factor) evaluation, respectively) may by performed to provide a better, more accurate grouping determination.

Grouping Samples

To identify and profile account sharing embodiments of the invention take all authentication attempts ("samples") for an account and group them into subsets ("Groups"). The groups may be formed in such a way, that similar samples are grouped together and dissimilar samples are split up into different groups. Each sufficiently large and consistent group may be used to identify or represent a different person. From the resulting groups an embodiment of the invention may answer questions such as:

Is the account shared?
How many users are sharing the account?
How is the account shared:
How many logins are not by the primary user?
How frequently is the account accessed by the non-primary user?
What is the connection between the primary user and other users:
Do they share one (or more) machine(s)?
Do they share IP addresses (locations)?
Are there time patterns, where users alternate?

The grouping, and consequently the answers to the above questions may be subject to errors. Errors may arise when two or more samples by a single account user are not similar enough to be judged having the same origin, possibly due to variations in account use, typing, access method, etc. This error leads to False Positives—accounts are identified as shared when in fact they are not. Other errors may arise when samples by different account users are very similar, which can happen occasionally, for instance, when two people have very similar typing rhythms. This error leads to False Negatives—accounts that are in fact shared are not detected as shared or not every person accessing the account is detected as a separate pattern. Errors can also arise from limitations or peculiarities in the grouping algorithm. To keep errors small, embodiments of the invention may use 2 key elements:

An effective algorithm for assessing 2 samples and deciding how similar they are in terms of originating from the same user vs. originating from two different users An effective grouping algorithm acting on multiple samples: for separating dissimilar samples into different groups and bundling similar samples into the same groups Examples of these algorithms will be described in detail below. An example background for the grouping algorithm is provided next.

Background on Statistical Cluster Analysis

According to embodiments, to group samples into distinct groups the statistical field of Cluster Analysis offers itself. Embodiments of the invention may use a mechanism (e.g., a method, computer, server, specific machine, logic, software and/or process) built on Hierarchical Cluster Analysis and enhanced specifically for the use in the field of Account Sharing Detection in connection with the use of Keystroke Dynamics and potentially multiple other factors. For a detailed account of the basics of Hierarchical Cluster Analysis, see "Cluster Analysis", Fourth Edition; Brian S. Everitt, Sabine Landau, Morven Leese, Oxford University Press, New York, 2001. See also, "Cluster Analysis for Researchers"; H. Charles Romesburg, Lulu Press, 2004. To illustrate the important points, as they pertain to embodiments of the invention, here is a quick overview:

According to embodiments, the starting point for Hierarchical Cluster Analysis is a set of data samples. Each data sample can be seen as a vector of data points, where data points are obtained from measurements and observations. The data point vector is not necessarily homogeneous, i.e. its coordinates can be data points of a variety of types and units. Different data samples are usually comparable, i.e. the i-th coordinate of each data sample vector is of the same type and measurement for all samples. For example, two very simple data samples obtained during the access attempt to an account could look like the following:

$$S1 = \begin{pmatrix} \text{Time of Day} & 10:30:00 \\ \text{Machine ID} & 1 \\ \text{Access from inside US} & \text{true} \\ \text{IP Address} & xx \cdot xx \cdot xx \cdot xx \end{pmatrix}$$

$$S2 = \begin{pmatrix} \text{Time of Day} & 11:00:00 \\ \text{Machine ID} & 2 \\ \text{Access from inside US} & \text{false} \\ \text{IP Address} & yy \cdot yy \cdot yy \cdot yy \end{pmatrix}$$

S1 and S2 contain a matching mix of data points of different types: time, Boolean, indices and formatted strings.

One purpose of Clustering is to form groups of samples, where each group represents a different category. In some cases, each group is intended or used to represent (e.g., identify) a different user. To this end Hierarchical Clustering starts by forming single-element clusters, one cluster for each data sample, containing that data sample. A distance between any two clusters (sets of samples) is defined: it is calculated based on the pair-wise distances of elements in both clusters. A number of different mechanisms for calculating sample distances and cluster distances are contemplated (e.g., including some available and commonly used in the art). For some examples, see "Cluster Analysis", Fourth Edition; Brian S. Everitt, Sabine Landau, Morven Leese, Oxford University Press, New York, 2001. See also, "Cluster Analysis for Researchers"; H. Charles Romesburg, Lulu Press, 2004. In a clustering iteration of some embodiments, the two closest clusters by cluster distance are determined. They are then merged into a single cluster and distances between the new clusters are recalculated. The clustering iteration is reapplied until either there is only one global cluster left, or until it has been decided to stop.

Figure 2:
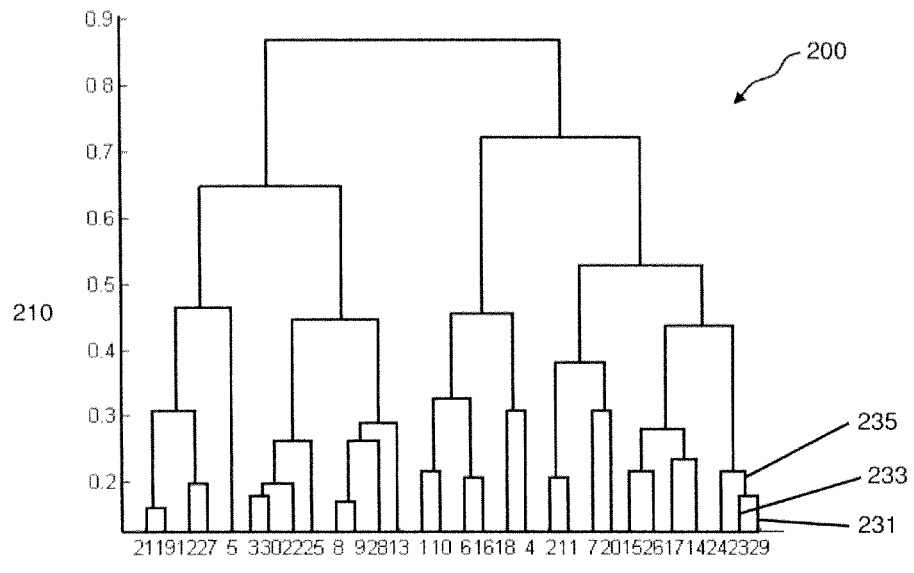
FIG. 2 shows a dendrogram showing clustering or grouping of sample data, according to some embodiments of the invention.

Hierarchical Clustering can be visualized through a dendrogram (which is a tree representation of hierarchical clustering applied to specific samples). FIG. 2 shows a dendrogram showing clustering or grouping of sample data, according to some embodiments of the invention. FIG. 2 shows dendrogram 200 having data of each data sample represented by branches along axis 220 and vertical height 210 indicating the distance or height at which 2 branches are joined. For instance, data samples 23 and 29 are represented by branches 233 and 231 respectively, and are joined at branch 235 which begins at a vertical height where the two branches merge of approximately 0.15.

At the bottom of the dendrogram each data sample is represented by one branch. The vertical height at which two branches are joined is scaled to match the cluster distance between the two merging clusters at the time of merge. In this way, similar data samples are grouped closer together, while less similar data samples are grouped further apart. Each horizontal level represents the state of clustering at a particular point in the sequence of clustering iterations.

It may be a non-trivial task to identify clusters that are similar and clusters that are not similar for the purpose of an investigation (e.g., to determine or identify whether samples are from more than one user). Here are two possible approaches:

In a first example Hierarchical Clustering approach one could "cut the tree" at a certain merge distance: I.e. the horizontal level in the dendrogram corresponding to a specific merge distance identifies which groups have been formed below a merge distance, and which groups are distinguished by at least that merge distance. One shortcoming of that process is that the data space may consist of some groups that are tighter by nature, and of other groups that are looser by nature. Cutting the tree enforces a uniform internal distance on what is to be considered a group and what isn't, thus not doing justice to the potentially different nature of the underlying groups. In some cases, samples from more than one user may be more accurately identified by considering more than just distance, such as by considering distance ratio and other considerations.

Figure 3:
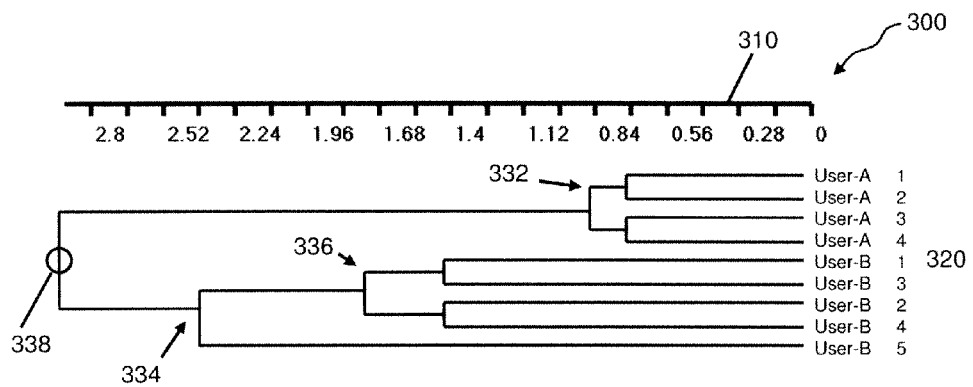
FIG. 3 shows an embodiment of a sideways-oriented dendrogram showing data samples of two users represented by branches and having a horizontal height at which two branches are merged.

FIG. 3 shows an embodiment of a sideways-oriented dendrogram showing data samples of two users represented by branches and having a horizontal height at which two branches are merged. FIG. 3 shows sideways-oriented dendrogram 300 having horizontal access 310 and vertical access 320 representing data of samples from user A and user B. FIG. 3 shows user A data samples at cluster 332 and user B data samples at clusters 334 and 336. FIG. 3 also shows merge point 338 for user A as compared to user B.

In one example, an account may be shared by a highly consistent typist and by an inconsistent typist. Using a single merge distance some embodiments may set the distance low, and then recognize the consistent typist, but see the inconsistent typist as many more small groups of data. Using a single large merge distance, other embodiments might miss the first typist altogether. Some different embodiments might find a distance to accommodate both users in this account, but then for a different account this distance may not work so well.

A second example of an approach of Cluster Analysis is to relate the merge distances within a group to the merge distance of that group to another group. If the internal distances are small compared to the external distances, the cluster is well separated from other clusters. This process is more flexible at allowing multiple clusters of different tightness to be recognized all at the same time.

Embodiments of the invention use the above concepts of Hierarchical Clustering, and expand and adapt them to the specific problem of account sharing detection using multiple factors, such as keystroke dynamics, and secondary factors (e.g., machine identification, network information and many others).

Basic Approach—KD Only:

One simple embodiment of the invention uses a basic approach to account sharing detection by using keystroke dynamics as its only factor. That is, user samples contain only timings associated with the typing of a username, password, pass phrase, etc during the process of accessing the account. The KD Only process is also the foundation for more complex account sharing detection processes involving keystroke dynamics plus other factors, such as an Advanced Account Sharing Detection—KD+Other factors, approach mentioned below.

In the KD-Only approach each sample contains keystroke timings. An embodiment of the invention using the KD-Only approach divides the set of all samples into groups based only on the samples' keystroke timings. Each group formed in this way represents a keystroke pattern, and, these groups may be used to further identify or represent a distinct user each. After groups have been determined, the same questions about account sharing can be answered. (Is the account shared? How many users are sharing? Etc)

Advanced Account Sharing Detection—KD+Other Factors

Embodiments of the invention may add or include the use of "secondary" non-biometric account sharing detection technologies such as machine identification, IP addresses, etc. to determine or detect clues as to whether an account is shared or not. Biometric account sharing detection may be superior to non-biometric account sharing detection because it establishes a closer link to the actual person behind an attempt to access an account. Even so, biometric account sharing detection can benefit from the use and analysis of non-biometric factors in addition to or combined with its biometric factors. An embodiment of the invention uses a multi-factor approach: Data samples are captured in such a way that they include keystroke timings plus at least one other factor. Thus, embodiments may include using a process, processor, computer, server, system, etc. to use keystroke timings plus one or more other secondary factors available, to improve account sharing detection over a KD-only model.

For example, in addition to (e.g., collecting or receiving) keystroke timings (e.g., for all typed characters of a string, such as a username, a password or a (username+password)), each sample may also include (e.g., collecting or receiving) secondary factor information such as any one or more (or all) of the following:

Machine information (cookies, Flash local stored objects, etc)
Browser information
Network information
Access information (e.g. access URL, IP Address)
Time of Day
Derived Information (e.g. geographic lookup of IP addresses including city, country, longitude, latitude)
Etc Embodiments of the invention are not limited to collecting data only on the specific factors mentioned above. They may use any other information (e.g., non-keystroke timings information) that is available in the deployed environment and that identifies the origin or the way of an access attempt or the use of an account at that time. Further, embodiments of the invention do not require all the factors above to be collected. They may collect some of the factors all the time or may collect some of the factors all the time for some accounts and different factors for different accounts, or may collect some of the factors only some of the time even for a single account. Instead of using just keystroke dynamics to group samples, advanced account sharing detection embodiments of the invention may use all available factors to group samples. When processing multiple factors embodiments may select or deal with the question of factor priority. Thus, in some cases, account sharing detection may include (e.g., a person, processes or computer) predetermining or selecting:

What is the order of significance of different factors; is it fixed or is it flexible?
If the order of significance is the same for all or for some factors, how are the values of these factors to be combined into a measure that can be used as a basis for grouping?

In some embodiments, keystroke dynamics is used as the only primary factor. Groups are determined based on primary factors. Additional factors are considered during and after the grouping, if they support a moderately strong to strong keystroke dynamics grouping. In that case the additional factors are considered to be strengthening the result obtained by keystroke dynamics alone. In some embodiments data collection must include keystroke dynamics data collection in order to be effective.

These are not the only embodiments or applications of the invention. There can be environments, where other "secondary" factors provide a higher degree of certainty of identifying accounts being used by different people than does keystroke dynamics. For those environments the order of factor significance can be modified. Another factor can play the primary role instead of keystroke timings, this other factor may become an essential factor to be collected for all samples in place of keystroke timings, and keystroke timings analysis can support the primary factor.

Errors and Error Tradeoff

Any account sharing detection is a statistical analysis subject to errors: False Positives (a non-shared account is indicated as shared) and False Negatives (a shared account is not detected) and other errors connected to the detailed information associated with the sharing that was or was not detected.

Typically decreasing one error increases another (e.g., False Positives and False Negatives). Thus, in some cases, account sharing detection may include (e.g., a person, processes or computer) predetermining or selecting processes or thresholds described herein based on (e.g., using as factors) one or more purpose (e.g., goal) of the analysis, and/or role that known errors are to play in that purpose. Here are a few example purposes and roles:

A company may want to detect illegal account sharing and follow up on accounts detected as shared by demanding payment, locking out users, requiring a frequent password change policy or implementing some other way that makes account use more difficult for affected accounts. It is important that an account sharing result is low on False Positives.

A company may want to help users of shared accounts in special ways, for example these accounts may be processed differently in ways that makes sharing easier. In this case it is important to find any possibly shared account and to keep False Negatives low.

A company may want to estimate how many accounts are shared for the company's own assessments and planning. It is important that the number of shared accounts is accurate, not necessarily, which accounts are shared and which ones aren't. It is important that False Negatives and False Positives are balanced To meet these different purposes or requirements it may be important to have different processes or thresholds for account sharing detection, with different optimizations of statistical errors.

Embodiments of the invention detailed in the following pages can be used for any or all of the purposes and/or roles above. Thus, each scenario of purposes and/or roles may use its own processes, thresholds and/or optimizations to achieve the desired accuracy. The thresholds given for some embodiments are for an application that tries to keep False Positives below a threshold in the range of 1%-5%.

Account Sharing Detection: An Overview Over the Mechanism and its Elements

Main Elements

Figure 4:
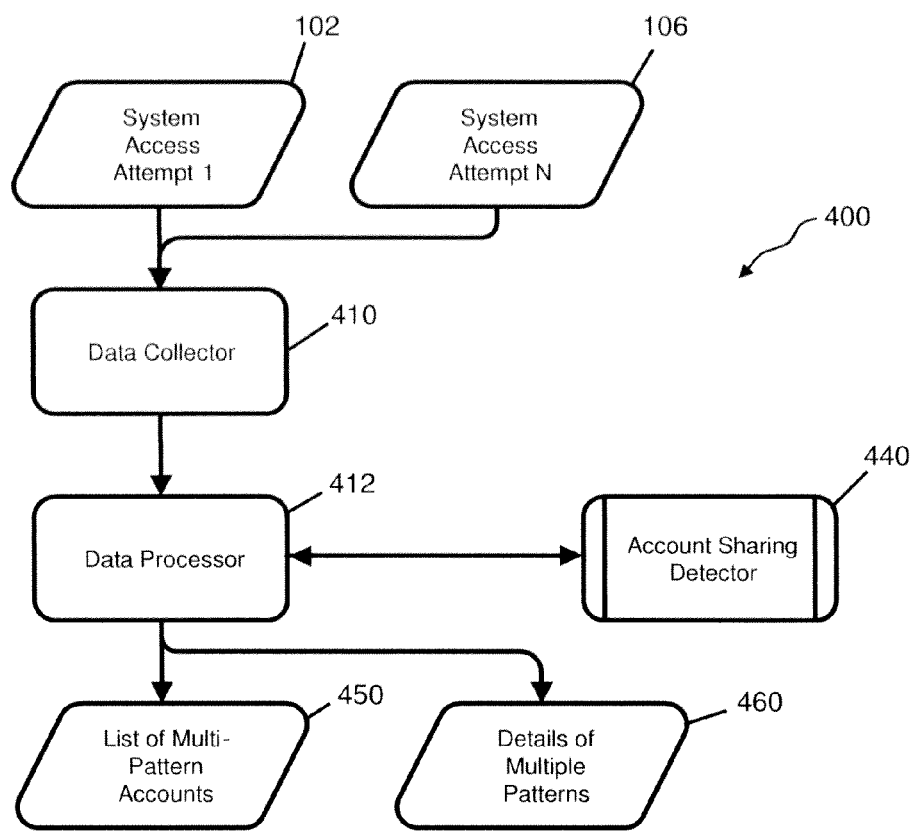
FIG. 4 shows a diagram of a mechanism for account sharing detection, according to embodiments of the invention.

According to embodiments, the Account Sharing Detection Mechanism may include two main elements or processes: Data collection, and data processing. FIG. 4 shows a diagram of a mechanism for account sharing detection, according to embodiments of the invention. FIG. 4 shows account sharing detection mechanism 400 that includes data collector block 410 receiving access attempts from system access attempt 1 block 102 through system access attempt N block 106. The output of data collector block 410 is received by data processor block 412 which interacts with account sharing detector 440 to calculate or generate List of Multi-Pattern Accounts block 450 and details of multiple patterns block 460 which may be used to detect whether accounts are shared. Mechanism 400 may include blocks or processes described above with respect to data collection 100 and account sharing detection 101 (See FIG. 1). For example, data collector block 410 may include descriptions above of blocks 110, 120 and 132 through 134. Data processor block 412 and/or account sharing detector block 440 may include descriptions above with respect to block 140 (and optionally blocks 142 and 144). Blocks 450 and 460 may include descriptions above with respect to block 150 (and optionally blocks 162-168).

In the first process, for each attempt by a user to access an account, data is collected. For each accessed account this data may be used by the processor to detect multiple patterns that suggest incidences of or that can be used to detect (or identify) sharing. While a user accesses an account, during a logon process, or during the user's subsequent transactions within the account, data on the user is collected. This data may include one or more of the account user's credentials, his keystroke timings of how he typed specific strings (for example his username and password, or a PIN or a pass phrase, etc) his access process (which URL is used for access, which Internet Service Provider requests the access, which IP address seeks access, which browser is used for interaction), his behavior (at what dates or times access is requested, what transactions are executed during the access), etc. Some data allows derived data to be collected, such as geographical information related to the location of the IP address: City, State, Country, Time zone, longitude, latitude, etc. The type and amount of collected data depends on what can be collected and is not restricted to this specific list.

Figure 5:
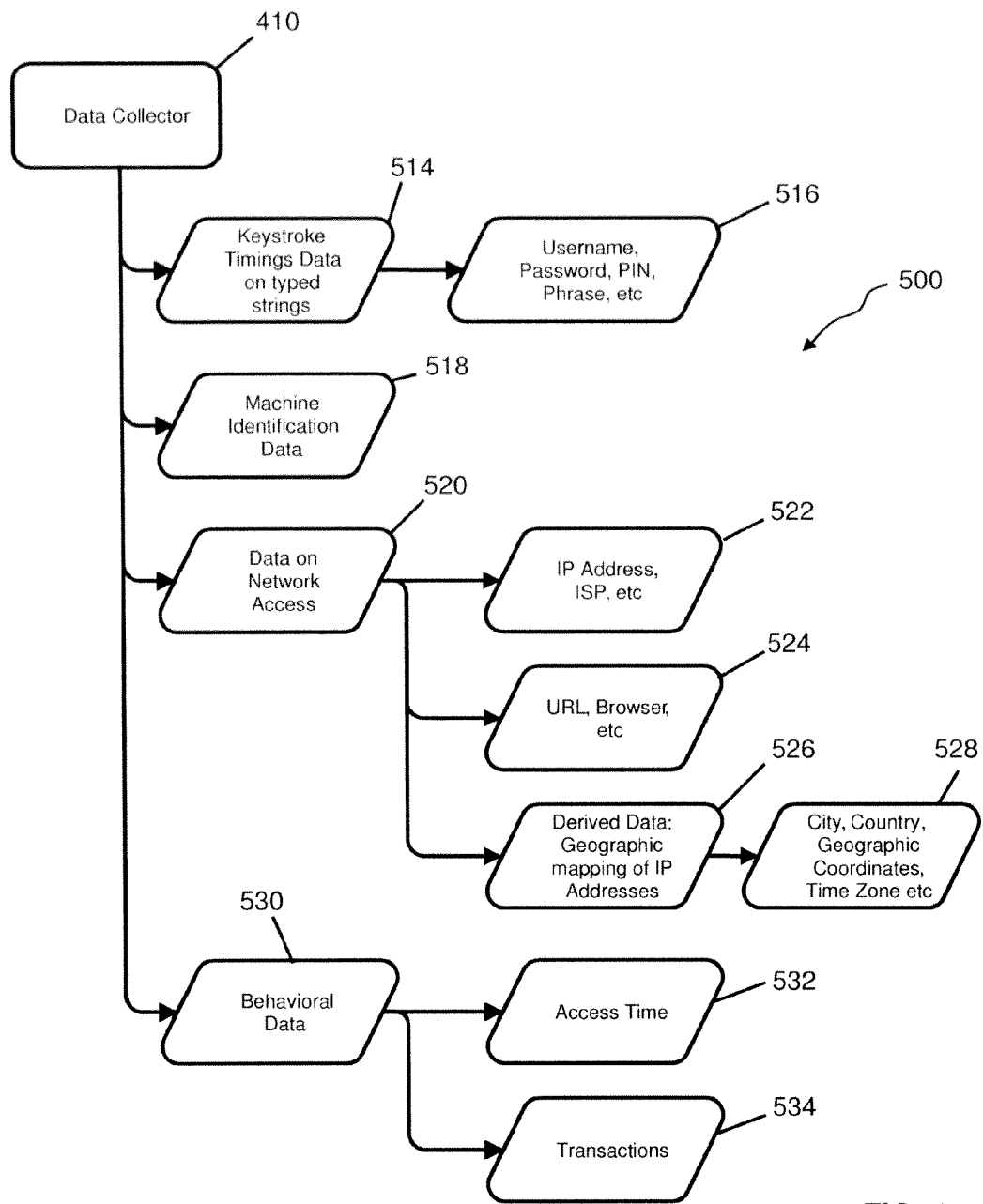
FIG. 5 shows a mechanism for data collection for account sharing detection, according to embodiments of the invention.

FIG. 5 shows a mechanism for data collection for account sharing detection, according to embodiments of the invention. For example, the data detailed in FIG. 5 can be collected for the purpose of account sharing detection. FIG. 5 shows account sharing detection data collection mechanism 500 including data collector block 410. Collector block 410 provides Key Stroke Timings Data on Typed Strings block 514, Machine Identification Data block 518, Data on Network Access block 520, and Behavioral Data block 530. More specifically, block 410 is able to identify (determine, divide, separate and/or detect out) from block 514, User Name, Password, PIN, Phrase, etc. at block 516. Block 410 is also able to detect or identify from block 520, IP address, ISP, etc. at block 522, URL, browser, etc. at block 524; and derived data; geographic mapping of IP addresses at block 526. From block 526, block 410 may detect or identify City, Country, Geographic Coordinates, Time Zones, etc. at block 528.

From Block 530, block 410 is able to detect or identify Access Time at block 532, and transactions at block 534.

The second element of the Account Sharing Detection Mechanism may include processing the collected data. Processing of collected data may involve determining different patterns of account access and account use. Depending on the strength and distinctiveness of the patterns an account can be suspected of being shared (e.g., sharing can be detected or identified). Embodiments of the invention may include sharing detection without including receipt or collection of the samples, such as by performing only certain mechanisms, processing or clustering of factor data (e.g., data previously provided data or currently stored).

Figure 6:
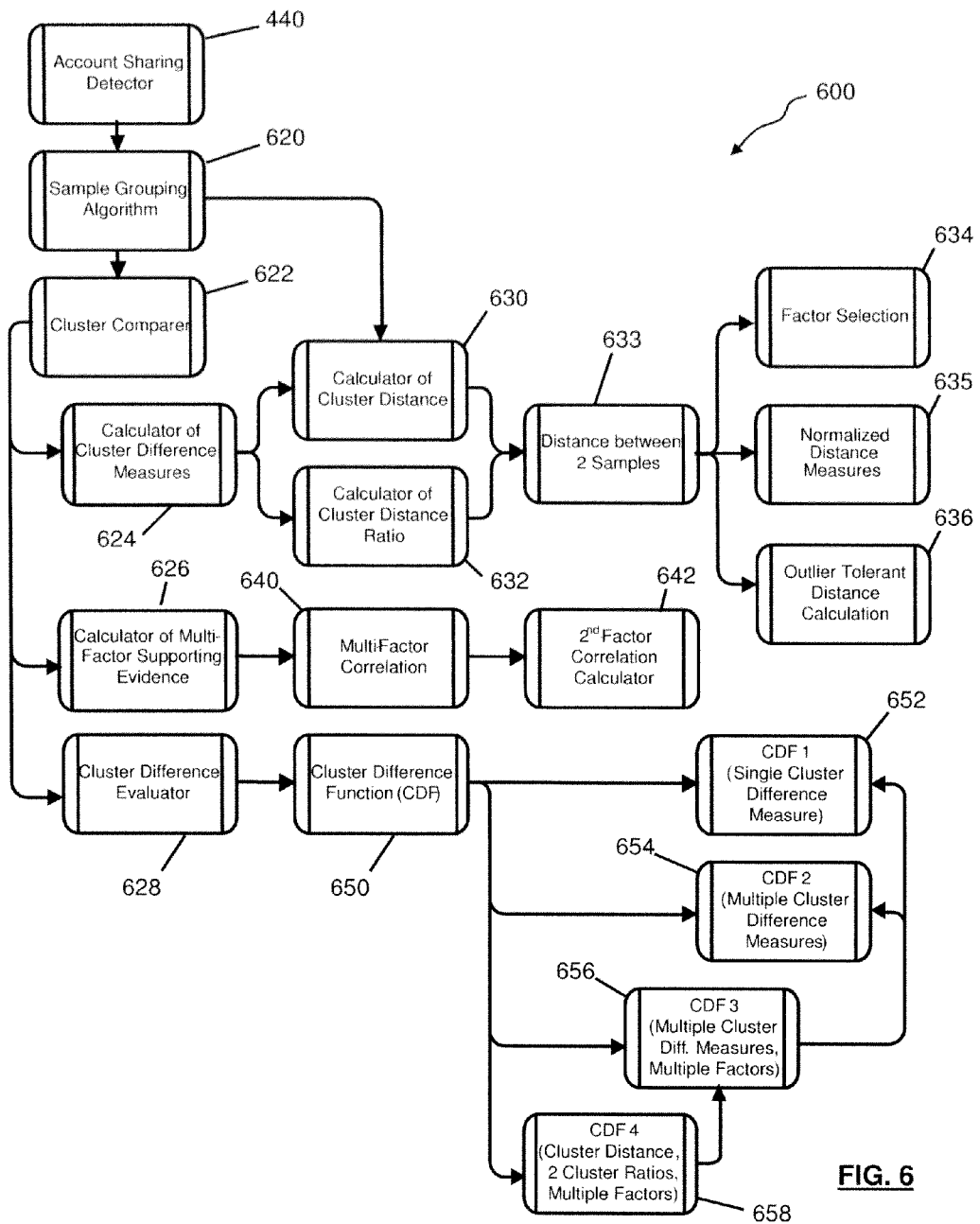
FIG. 6 shows a mechanism for an account sharing detection processor, according to embodiments of the invention.

Data processing may involve many different technological elements; an example is depicted in FIG. 6. FIG. 6 shows a mechanism for an account sharing detection processor, according to embodiments of the invention. FIG. 6 shows mechanism or data dependencies 600, such as where a parent block "uses" a dependent/child block to perform a mechanism or process. Each dependent block receives input from the parent block and returns output to the parent block. In turn each block also provides input for its dependent/child blocks and receives output from the child blocks that it processes to subsequently generate output to return to the parent block. Thus, mechanism 600 may not necessarily be a process flow (e.g., parent A is using child B is not limited to A provides input for B).

Mechanism 600 is shown including account sharing detector block 440 using sample grouping algorithm block 620. Block 620 uses cluster comparer block 622 and calculator of cluster distance block 630. Block 622 uses calculator of cluster difference measures block 624, calculator of multifactor supporting evidence block 626, and cluster difference evaluator block 628.

Block 624 uses calculator of cluster distance block 630 and calculator of cluster distance ratio block 632. Blocks 630 and 632 use distance between two samples block 633, which uses factor selection block 634, normalized distance measures 635, and outlier tolerant distance calculation block 636.

Block 626 uses multifactor correlation block 640, which uses second factor correlation calculator block 642.

Block 628 uses cluster difference function (CDF) block 650. Block 650 uses one or more of (e.g., based on cluster distance, cluster distance ratio (optionally), and secondary factors (optionally)) CDF 1 block 652, CDF 2 block 654, CDF 3 block 656, and/or CDF 4 block 658. More specifically, Block 658 also uses block 656, which uses blocks 654 and 652. Embodiments may include any single, more than one, or all of blocks 652 through 658. CDF 1 block 652, CDF 2 block 654, CDF 3 block 656, and CDF 4 block 658 provide or identify whether clusters A and B are distinct, such as by considering cluster distance, cluster distance ratio, and secondary factors. Mechanism 600 may include descriptions above for block 412.

To put technology items of the account sharing mechanism embodiments into their context, below are example short descriptions of the items mentioned in FIG. 6.

Account Sharing Detector

Embodiments use an Account Sharing Detector to process data for each accessed account. For each single account, some or all data collected in connection with access to the account enters the processing. The data associated with a single access attempt is referred to as a "Sample". A "Sample Grouping Algorithm" groups all samples into sets of samples, called "groups" or "patterns". For example, "clustering" may be used to form groups or patterns of samples, where each group or pattern is used to represent (e.g., identify) a different user. For instance, during or after "clustering" by a mechanism described herein, the sets of samples may be called "clusters", "groups" or "patterns". In some cases, the samples (e.g., factor data of the samples) in each "cluster", "group" or "pattern" may be described as "related" based on by having similar factor data (e.g., by being "clustered" as described herein).

In some embodiments, "clusters" are sets of samples that are formed during cluster analysis. These sets can be temporary in the clustering iteration or they can become the final sets used to identify a user; "groups" or "identified groups" are the final sets as determined by account sharing detection, that identify a unique user. For the invention they are always clusters promoted to Identified Groups. Also, "patterns" are used mostly for groups, but also for clusters. Patterns can be very distinct or not distinct or somewhat distinct.

Through the action of embodiments of the account sharing detector, each sample becomes an element of exactly one pattern, or it becomes an element of the set of Outlying samples. The Patterns and the set of Outlier Samples may be pair-wise disjoint sets whose union is the entire sample set. Based on the content of pattern sets and outlying sample set embodiments determine the account sharing result. For example, if there is more than one pattern, then it is determined that the account is shared. Also, the number of patterns may indicate or identify the number of distinct people sharing the account.

Figure 7:
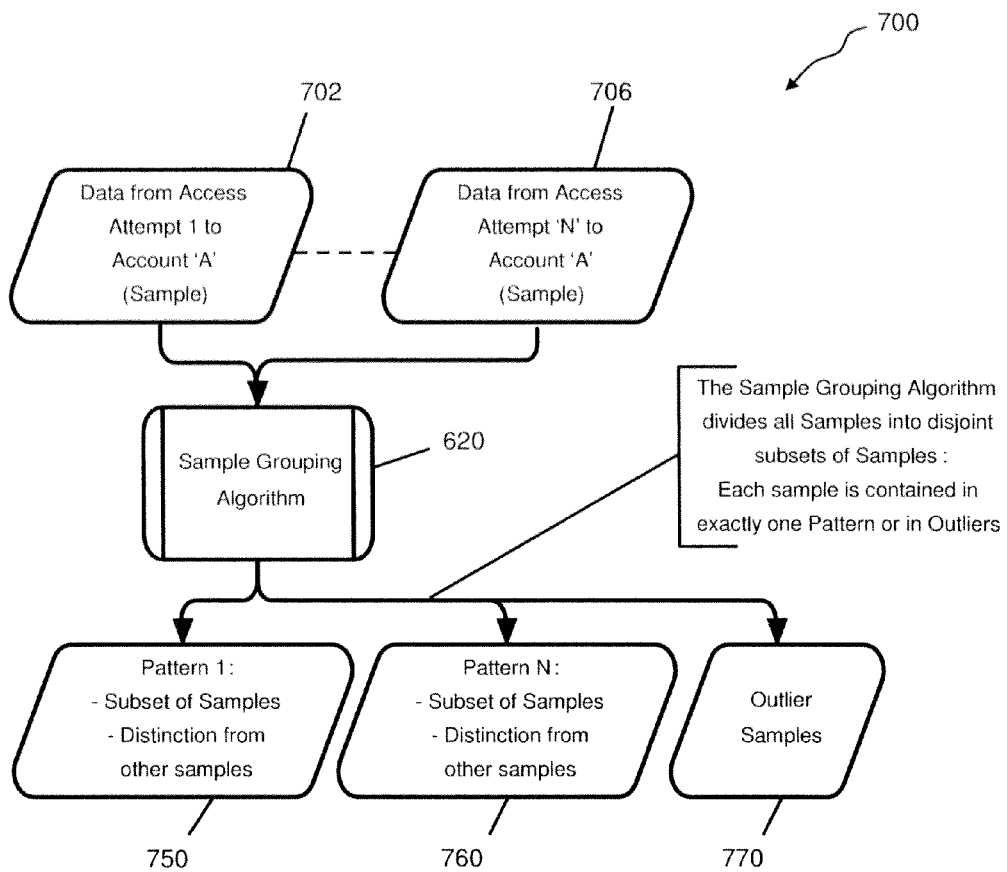
FIG. 7 shows an account sharing detector mechanism, acting on or processing a single account, according to embodiments of the invention.

FIG. 7 shows an account sharing detector mechanism 700, acting on or processing a single account, according to embodiments of the invention. FIG. 7 shows mechanism 700 including sample grouping algorithm block 620 receiving data from attempts to access. For example, block 620 receives from block 702 through block 706, Data From Access Attempt 1 to Account 'A' (Sample) through Data From Access Attempt 'N' to Account 'A' (Sample). Block 620 divides the samples received from block 702 through 706 into (e.g. identifies) disjoint subsets of samples, where each sample is either contained in exactly one pattern (e.g. group) or in a group of outliers. Specifically, block 620 outputs or identifies at block 750-Pattern 1: Subset of Samples Distinct from Other Samples, through block 760-Pattern N: Subset of Samples Distinct from Other Samples. Block 620 also divides out, outputs or identifies outlier samples block 770. Mechanism 700 may include descriptions above with respect to block 140 and/or 440.

Sample Grouping Algorithm

According to embodiments, the Account Sharing Detector may use a Sample Grouping Algorithm. The Sample Grouping Algorithm acts on multiple samples belonging to one account. It processes these samples; the results may be Patterns of Samples and Outlying Samples, as used by the Account Sharing Detector for determining sharing in accounts. The heart of the Sample Grouping Algorithm may be the "Cluster Comparer".

Figure 8:
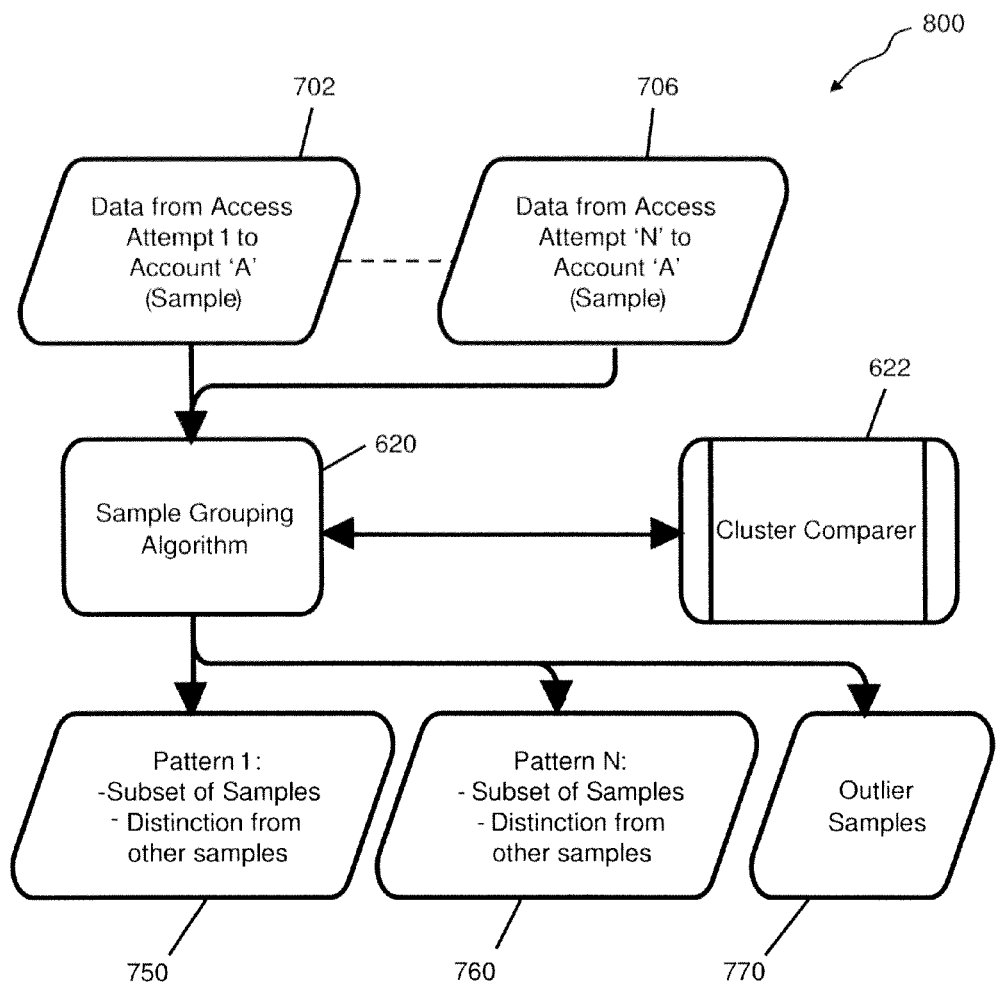
FIG. 8 shows a sample grouping algorithm mechanism, acting on or processing a single account, according to embodiments of the invention.

FIG. 8 shows a sample grouping algorithm mechanism 800, acting on or processing a single account, according to embodiments of the invention. Mechanism 800 uses a cluster comparer. FIG. 8 shows algorithm block 620 using cluster comparer block 622 in order to provide or identify or calculate blocks 750, 760, and 770.

Cluster Comparer

According to embodiments, the Cluster Comparer may be used by the Sample Grouping Algorithm. For two disjoint sets of samples for the same account it determines the relationship of those two sets.

Figure 9:
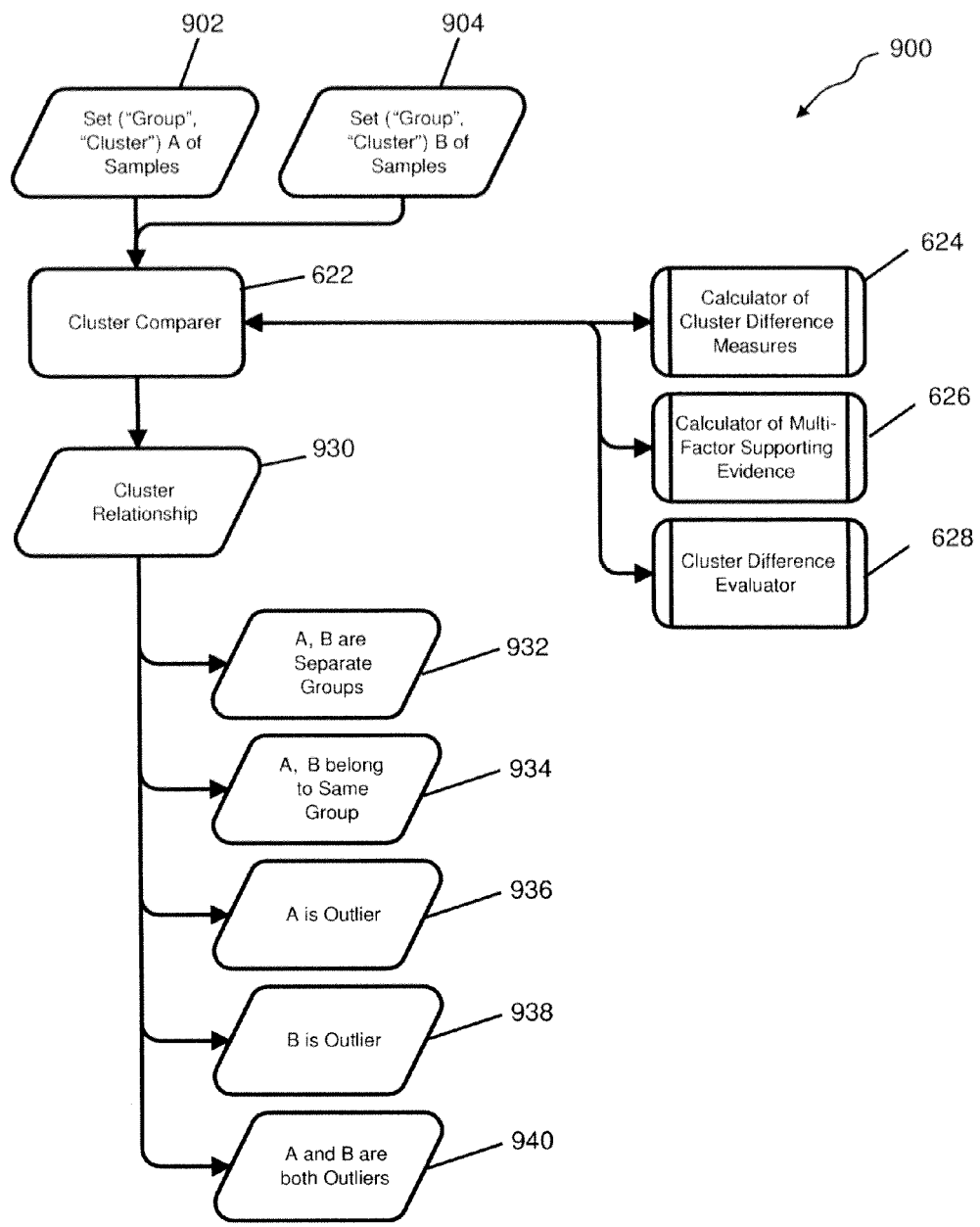
FIG. 9 shows a cluster comparer mechanism acting on or processing two groups of samples, according to embodiments of the invention.

Results of this comparison can be:
 The two sets are separate patterns
 The two sets are part of the same pattern
 One, or the other, or both sets are outliers The Cluster Comparer may use the following elements (detailed in further sections):
 Calculator of Cluster Difference Measures: Calculates one or more measures for how different the two input clusters are
 Calculator of Multi-Factor Supporting Evidence: Calculates whether a distinction of samples into two sets is supported by more than one factor and to what degree
 Cluster Difference Evaluator: Combines the results of difference measures and evidence from multi-factor support into one final result FIG. 9 shows a cluster comparer mechanism 900 acting on or processing two groups of samples, according to embodiments of the invention. FIG. 9 shows mechanism 900 including cluster comparer block 622 receiving Set ("group", "cluster") A of samples block 902 through Set ("group", "cluster") B of samples block 904. Block 622 uses block 624, block 626, and block 628 to output (e.g., identify) cluster relationships at block 930. The cluster relationships identified at Block 930 are shown as determinations or identifications 932-940. Specifically, the relationship between clusters identified by block 622 can be that A and B are separate groups at block 932; that A and B belong in the same group at block 934; that A is an outlier of block 936; that B is an outlier at block 938; and that A and B are both outliers at block 940. Block 622 may include descriptions above with respect to block 622.

Calculator of Cluster Difference Measures

Embodiments of the Calculator of Cluster Difference Measures may calculate one or more measures describing how different two clusters are. One distance measure that may be useful is "Cluster Distance". One embodiment of the invention calculates only Cluster Distance. However, for some embodiments, accuracy may improve by considering a second distance measure, "Cluster Distance Ratio" and including it into the decision making process. In some embodiments of the invention both "Cluster Distance" and "Cluster Distance Ratio" may meet certain criteria for two groups to be considered distinct. However, "Cluster Distance" may play a more significant role, since the values for Cluster Distance decide which 2 groups are compared in each clustering iteration.

More distance measures and other distance measures can be used, too. The Cluster Difference Evaluator may use all available distance measures, evaluate them and conclude, whether two clusters are distinct or not or whether they are outliers. Therefore, the Cluster Difference Evaluator may depend on the type and number of distance measures calculated, as it may use all of them to come to a final conclusion.

Figure 10:
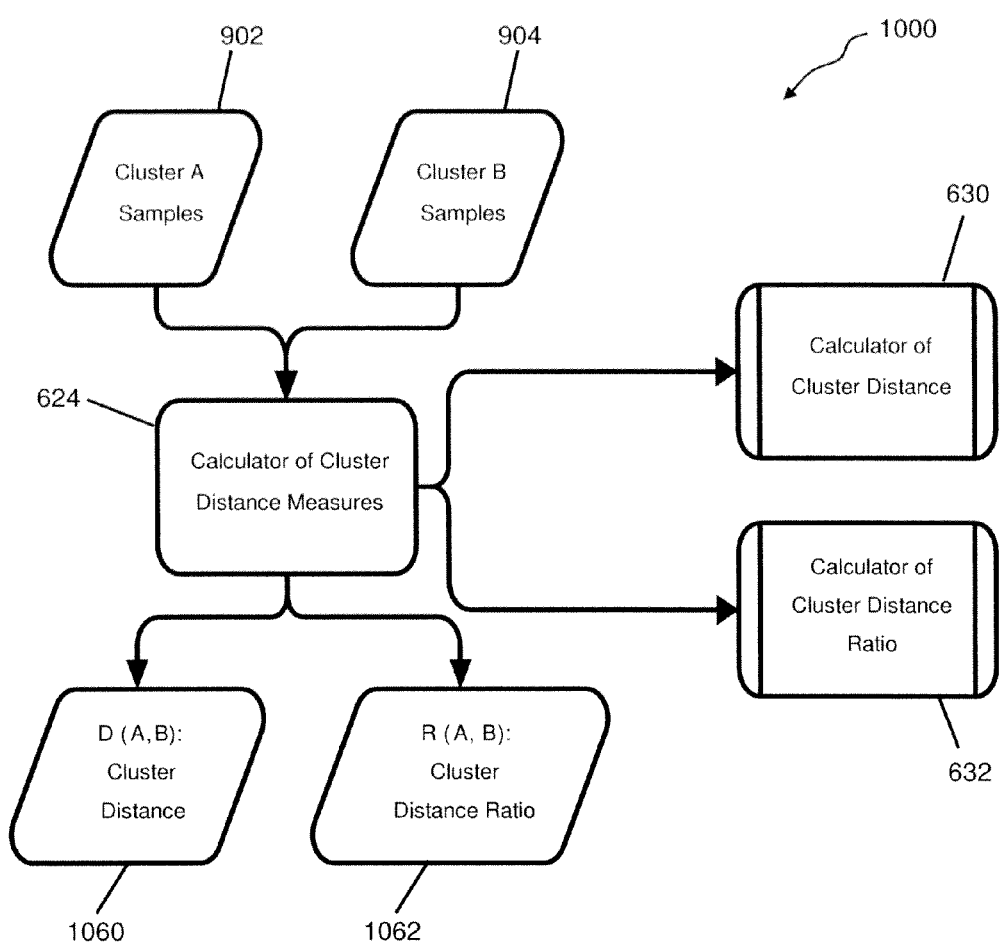
FIG. 10 shows a calculator of cluster distance measures for two groups of clusters of samples, according to embodiments of the invention.

FIG. 10 shows a calculator of cluster distance measures for two groups or clusters of samples, according to embodiments of the invention. FIG. 10 shows calculator of cluster distance measures of two groups processing element or mechanism 1000 including calculator of cluster difference measures block 624 receiving cluster A samples block 902 and cluster B samples block 904. Block 624 interacts with calculator of cluster distance block 630 and calculator of cluster distance ratio block 632 to provide or identify or calculate D (A, B); cluster distance block 1060; and R (A, B); cluster distance ratio block 1062, based on calculations provided using block 630 and 632 respectively.

Figure 11:
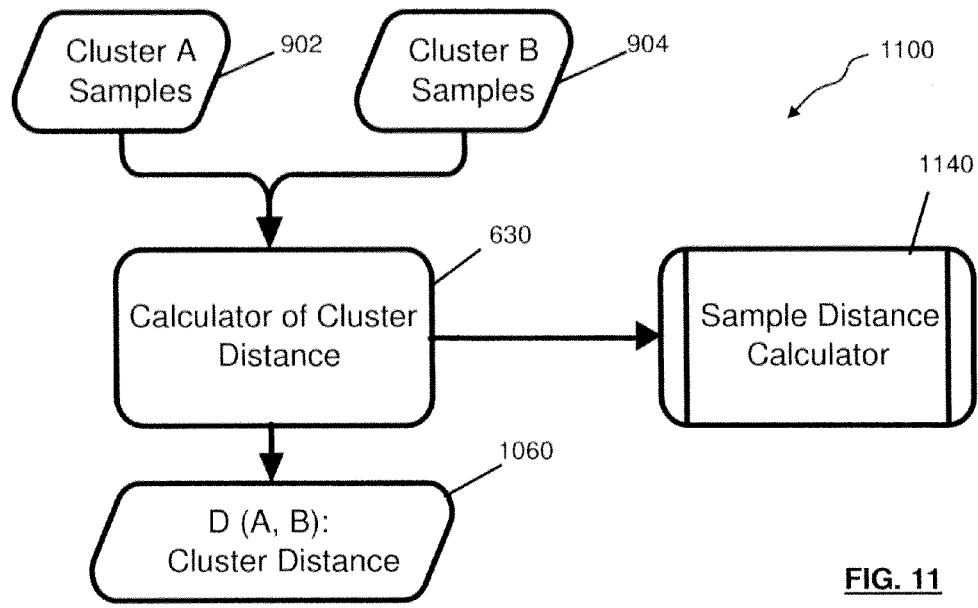
FIGS. 11-12 show a breakdown of the mechanism of FIG. 10 with respect to cluster distance and cluster distance ratio, according to embodiments of the invention.
Figure 12:
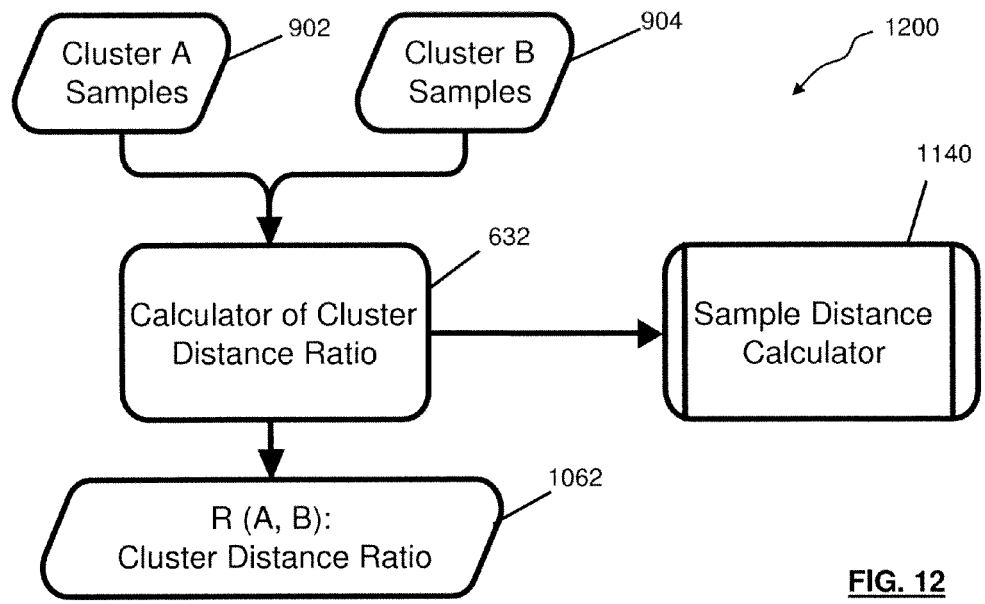

FIGS. 11-12 show a breakdown of the mechanism of FIG. 10 with respect to cluster distance and cluster distance ratio, according to embodiments of the invention.

"Cluster Distance"

According to embodiments, Cluster Distance calculates a measure that expresses how much two sets of samples differ. It relies on the "Sample Distance Calculator", which measures distance between two samples. The Cluster Distance may be a mathematical combination of all pair-wise distances of samples within A U B. FIG. 11 shows cluster distance mechanism 1100 including calculator of cluster distance block 630 receiving blocks 902 and 904. Based on or using sample distance calculator block 1140, block 630 outputs or calculates block 1060.

"Cluster Distance Ratio"

According to embodiments, similar to Cluster Distance, Cluster Distance Ratio may be a measure for how much two sets of samples differ. Just like Cluster Distance, Cluster Distance Ratio also makes use of the Sample Distance Calculator, which calculates the distance between 2 individual samples. The Cluster Distance Ratio may be a mathematical combination of all or of subsets of pair-wise distances (e.g., ratio of inter-cluster pairs to intra-cluster pairs) of samples within set A U B. FIG. 12 shows cluster distance ratio mechanism 1200 including calculator of cluster distance ratio block 632 receiving blocks 902 and 904. Block 632 provides or calculates block 1062 based on or using sample distance calculator block 1140.

Distance Between 2 Samples

According to embodiments, Cluster Distance and Cluster Distance Ratio make use of a pair-wise distance between two samples. The Sample Distance Calculator may measure this distance between two samples. This distance may be a crucial and fundamental piece in the account sharing detection technology, since any decisions and measures on grouping may use this simple distance measure directly or indirectly.

The Distance between 2 Samples may be responsible for distinguishing individual samples; in particular it may be responsible for distinguishing samples which contain keystroke dynamics timings. To this end it may use one or all of the following 3 pieces of technology:

Keystroke Dynamics Feature Selection: This piece selects which parts and aspects of a typed string or of other data may be important for distinguishing 2 samples Normalized Distance Measures: These are measures independent of the number of data points obtained as features. Each feature type has a specific measure associated with it. Each measure's purpose is to distinguish 2 samples based on a specific feature type Outlier Tolerance: This is a mechanism to allow for the type of variations typical in keystroke dynamics or in other factor data (e.g., See FIG. 16). The mechanism can be applied to any normalized distance measure and to any feature type.

Calculator of Multi-Factor Supporting Evidence

According to embodiments, once groups have been determined based on one or more factors (such as keystroke dynamics), the grouping can be corroborated by other "secondary" factors (such as IP address, machine identification, etc.). For example, a Calculator of Multi-Factor Supporting Evidence may determine, which factors support a given grouping, and calculate a measure which expresses to what degree a factor supports a grouping. According to embodiments, a key piece in this calculation is performed by the Multi-Factor Correlation Evaluator, which in turn may use the Second Factor Correlation Calculator. The Second Factor Correlation Calculator calculates a number similar to a correlation, which expresses how well the distribution of an additional factor supports a grouping determined by one or more primary factors.

Cluster Difference Evaluator

According to embodiments, the Cluster Difference Evaluator may determine the relationship between two clusters, and it further may determine whether these two clusters are supposed to be considered distinct, for the purpose of account sharing detection. The Evaluator may take into account the calculated distance measure(s) between clusters, and the support by additional factors for the grouping, to determine the relationship between two clusters. According to embodiments, clusters that are similar by distance measure(s) will be considered part of the same group, while clusters that are very different by distance measure(s) will be considered separate groups. Additional factors and the distribution of their values across two clusters A and B can also contribute to that decision. The relationship between two clusters A and B as it is returned by the Cluster Difference Evaluator can be:

A and B are separate groups
A and B are part of the same group
A is an outlier
B is an outlier
A and B are both outliers This may be the same result type that the Cluster Comparer returns. The result from the Cluster Distance Evaluator may be returned to the Cluster Comparer.

Account Sharing Technology—Details

Descriptions above provided an overview of the technology elements used in Account Sharing Detection. The following provides the details for each technology element of various embodiments. In some cases details are explained by way of example to make the concepts more intuitive. The graphs and details are not intended to restrict the generality of the concepts nor are they intended to limit embodiments of the invention to only the depicted examples.

Account Sharing Detection—Details of High Level Processing

Embodiments of account sharing detection mechanism may rely on grouping authentication attempts ("samples"). A group of samples may be identified to be the product of a distinct user of the account, provided it meets additional criteria. In one embodiment of the invention, groups below a certain size are not identified as the product of distinct users. This prevents outlying samples and quirks in the grouping algorithm from creating extra groups that did not really originate from new users.

The disadvantage of disregarding small groups is that small contributions by additional users will not be recognized. However, when using account sharing detection for revenue recovery, small contributions may be of minor importance and this feature of ignoring small groups is an asset, not a liability. In some embodiments, it may be beneficial or useful to enforce a minimum group size of 5.

Figure 13:
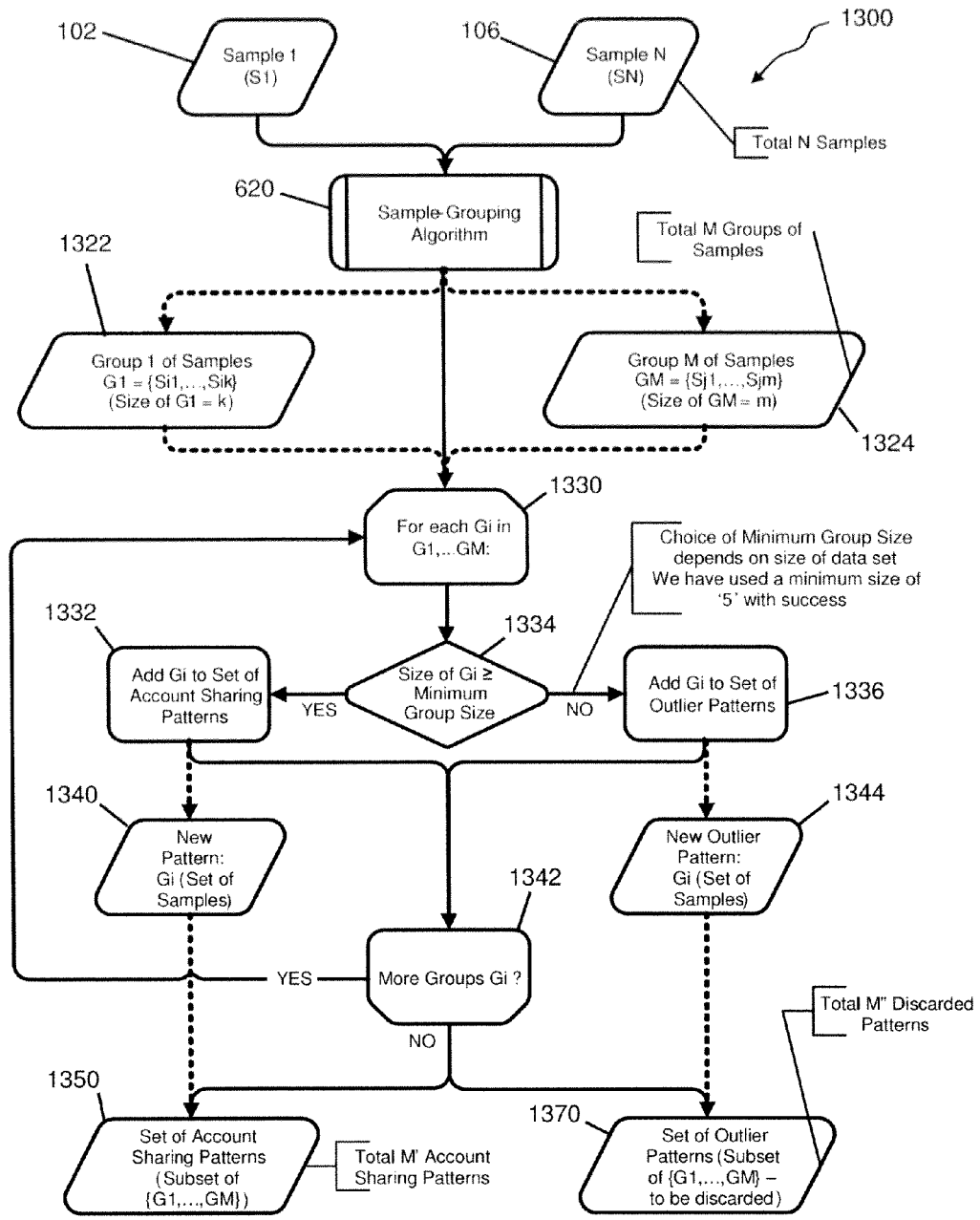
FIG. 13 shows an account sharing detection mechanism that uses a sample grouping algorithm, according to embodiments of the invention.

FIG. 13 shows an account sharing detection mechanism 1300 that uses a sample grouping algorithm, according to embodiments of the invention. FIG. 13 depicts an example of details of an Account Sharing Detector (See also FIGS. 6 and 7 for an overview of the account sharing detector and how it fits in the global picture of embodiments of the invention). FIG. 13 shows mechanism 1300 including sample grouping algorithm block 620 receiving block 102 through block 106 of N samples. Block 620 groups the N samples into group 1 of samples at block 1322, through group M of samples at block 1324 to provide a total of M groups of samples. At decision block 1334 it is determined whether the size of each group Gi of groups G1 through Gm is greater than or equal to a minimum required group size. If the group size is smaller than the minimum group size, the group Gi is added to a set of outlier patterns at block 1336. Alternatively, if the size is greater than or equal to the minimum group size, the group Gi is added to a set of account sharing patterns at block 1332. The choice of a minimum group size at block 1334 may be selected or predetermined depending on a size of a data set, and may be a size such as 3, 4, 5, 6, or 7. In some embodiments, the minimum group size is 5. In other embodiments it is 4, or 6.

After block 1336 a new outlier pattern, group Gi (set of samples), is added to the set of all outlier patterns at block 1344. Similarly, after block 1332 a new pattern, group Gi (set of samples), is added to the set of all account sharing patterns at block 1340. At block 1342 it is determined whether more groups require processing. If so, processing returns to block 1330. If not, processing continues from block 1342 to block 1350 where a set of account sharing patterns (subset of G1 through Gm) is provided for a total of M' (i.e., M-prime) account sharing patterns; and block 1370 providing a set of outlier patterns (subset of G1 through Gm) to be discarded for a total of M" (i.e., M-double-prime) "discarded patterns". In some cases, M"<=M, and M"+M'=M. Mechanisms 1300 may include descriptions above with respect to blocks 140 and 440, such as to process samples for any one of accounts 132 through 134.

The Sample Grouping Algorithm

According to embodiments, at the heart of the account sharing detection mechanism is the Sample Grouping Algorithm. According to embodiments, the Sample Grouping Algorithm may incorporate the mechanisms of Hierarchical Clustering as noted to in the earlier description of Hierarchical Clustering.

Hierarchical Cluster Processing for the Sample Grouping Algorithm

According to embodiments, a cluster hierarchy expresses the relationship of elements and groups of elements. It may not indicate which groups should be considered distinct for a given purpose (such as account sharing detection). For instance, in the cluster hierarchy there may exist 2 clusters A and B of data samples, which are disjoint. The hierarchy tells us how great the distance between those clusters is. It doesn't tell us, whether A and B belong to two different persons, or whether A and B are sub-patterns by the same person. It can even be that A and B are not distinct patterns at all, not even sub-patterns: The nature of cluster processing is such that clusters are formed as single-element groups and are built up to bigger and bigger groups by joining the closest clusters together, until a final single cluster results. A and B can simply be groups of samples by the same person that belong together, but haven't been joined yet.

Thus, identifying meaningful clusters within the Hierarchical Clustering tree may not be trivial. Some processes involve "cutting the tree" at a fixed cluster distance or evaluating the ratio of distances of clusters at a cluster merge. Use of hierarchical clustering may be adapted to the specific problem of account sharing detection by using processes or mechanisms that take into account the nature of data used and available in account sharing detection supported by keystroke dynamics. Processes or mechanisms may be further designed to keep statistical errors (False Positives, False Negatives) low for the specific problem and specific type of data of account sharing detection. For some sample grouping algorithms multiple processes may be used with success, such as using at least one or all of:

A single-distance criterion equivalent to cutting the tree at a fixed cluster distance A criterion based on both distance and ratio together And additional factors (e.g., secondary factors) to the criteria.

Some embodiments of the invention also add a new processing element and additional options to the basic clustering iteration as it is used in Hierarchical Clustering.

According to embodiments, the process starts by creating single-element clusters from all data samples available in an account. Distances between any two clusters are calculated based on the distances between any two elements in the two clusters. (Details on cluster distance calculation can be found below in Calculator of Cluster Difference Measures.

During the clustering iteration, the closest two clusters (by cluster distance) may be compared further, based on two or all of the following:

Should the two clusters be considered part of the same group?

Should the two clusters be considered distinct from each other (i.e. their samples originated from different users)?

If the two clusters are distinct from each other, at least one of the two clusters is also distinct from all other (currently not compared) clusters. Which (one or both) of the two clusters is distinct from all other clusters as well?

Should one or both clusters be considered outliers?

Depending on the answers to the above questions, the clustering iteration proceeds in the following way:

Clusters which are considered part of the same group are merged into a single cluster Clusters to be considered distinct are handled depending on whether they are also distinct from all other clusters:

Each cluster distinct from all others becomes an "Identified Group", and is removed from further processing Or if one of the clusters cannot be considered distinct from other clusters (yet), that cluster remains for further processing Clusters to be considered outliers are removed from further processing The clusters may be compared by the Cluster Comparer (full details below in Calculator of Cluster Difference Measures). The Cluster Comparer may be responsible for distinguishing between clusters; its flexibility at correctly identifying clusters of different consistency may be directly responsible for the effectiveness of the algorithm.

According to embodiments, clustering iterations proceed until no more clusters remain for processing (i.e. there are less than 2 clusters left). In the situation, that no identified group was recognized by the clustering process, the entire sample set may be considered a single group and the clustering process is complete. If a single cluster is left at the end of the last clustering iteration, the cluster may have the necessary minimum size to be considered a group, and if there are already Identified Groups listed, then this cluster may also be added as a group to the list of Identified Groups. If multiple identified groups were recognized, the account may be diagnosed as shared.

Figure 14:
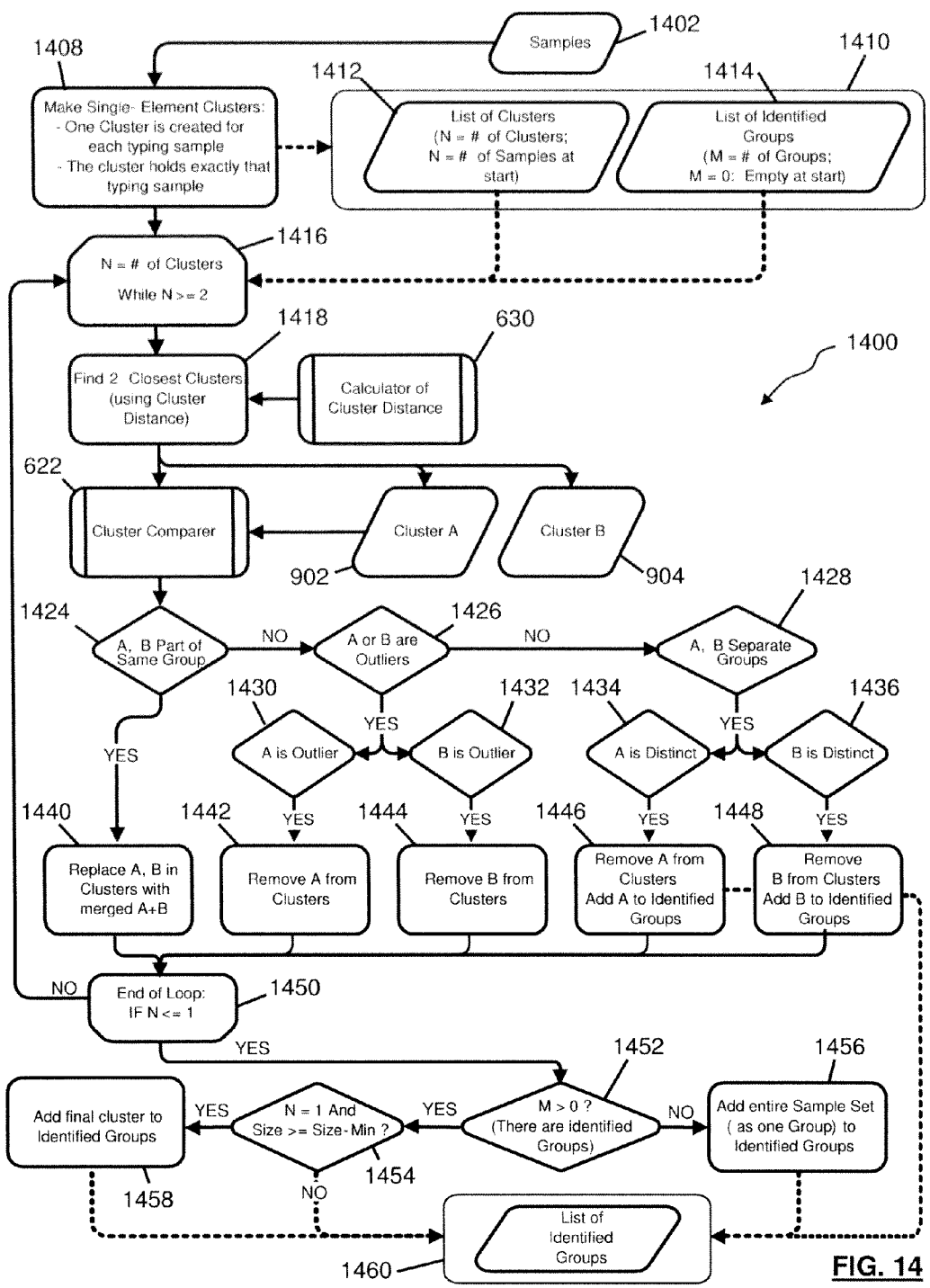
FIG. 14 shows a grouping algorithm flow diagram according to embodiments of the invention.

FIG. 14 shows grouping algorithm flow diagram 1400 according to embodiments of the invention. FIG. 14 shows process or mechanism 1400 including block 1408 receiving samples from block 1402 and creating a single element cluster for each sample. Block 1408 outputs block 1410 which includes block 1412 having a list of clusters (e.g., which initially consists of single-element clusters, one cluster for each sample and containing exactly that sample) and block 1414 having a list of identified groups (e.g., which is initially empty). Block 1408 also outputs N which is the number of clusters that exist to block 1416. Block 1416 also receives output from blocks 1412 and 1414. Based on the inputs from block 1408, 1412, and 1414, provided to block 1416 and received at block 1418, block 1418 finds the two closest clusters using distance by interacting with calculator of cluster distance block 630 and cluster comparer block 622 to provide cluster A at block 1420 and cluster B at block 1422. If clusters A and B are part of the same group at block 1424, clusters A and B are replaced with a merged cluster including cluster A plus B at block 1440. If at block 1424 the clusters are not part of the same group it is determined whether at least one of A and B are outliers at block 1426. If neither cluster is an outlier at block 1426 processing continues to block 1428 where it is determined if A and B are separate groups. If at block 1428 it is determined that A and B are separate groups; A is identified as distinct at block 1434; and B is identified as distinct at block 1436. For instance, at block 1428: A, B separate groups: always returns Yes (other cases are already taken care of). At block 1434: Yes is returned if A is Distinct: if No is returned, then no action is taken for A. Similarly, at block 1436: Yes is returned if B is Distinct: if No is returned, then no action is taken for B. However, blocks 1434 and 1436 can't both return No. Similar considerations apply to blocks 1426 (like 1428), 1430 (like 1434) and 1432 (like 1436).

At block 1446, A is removed from the clusters and identified as a group. Similarly at block 1448 B is removed from the clusters and identified as a group.

If at 1426 A or B are identified as outliers, at block 1430 it is determined whether A is an outlier, and at block 1432 it is determined whether B is an outlier. At blocks 1442 and 1444, A and B are removed from clusters, if they are identified as outliers respectively. At block 1450 it is determined whether more than one cluster remains in the list of clusters 1412 or if it is the end of the loop. If it is not the end of the loop processing returns to block 1460. If it is the end of the loop, processing proceeds to block 1452 where it is determined if more than one group is identified. If not at least one group is identified, processing continues to block 1456 where the entire sample set is identified as one group. If at block 1452 at least one group is identified processing continues to block 1454 where it is determined whether there is one cluster remaining in the list of clusters and whether that cluster is greater than the minimum cluster size. If the cluster is not greater than a minimum size processing continues to block 1460 and the list of identified groups is considered already complete. If in block 1454 the last remaining cluster is greater than a minimum size, that last cluster is added to the identified groups at block 1458 and processing continues to block 1460. After blocks 1448 or 1456, processing also continues to block 1460. At block 1460, a list of groups is identified for the samples of block 1402. Block 1460 may correspond to the description above for block 1410. Moreover, in some cases 1410 transitions into 1460 as identified groups are added throughout the process of mechanism 1400. Mechanism 1400 may include descriptions above with respect to mechanism 700, mechanism 800, algorithm 620, and/or algorithm 620.

The Cluster Comparer

According to embodiments, the Cluster Comparer is the major component of the Sample Grouping Algorithm. As mentioned before it may be responsible for assessing whether two sets of samples are to be considered part of the same group, whether they are to be considered different groups, or whether one or both sets are outliers that should not be considered further. As also mentioned previously, flexibility in identifying different varieties of clusters may be very important: the cluster comparer should be able to identify groups with different internal "tightness" or consistency. Additionally, multiple factors may be available for use, such as any combination of two or more of: Keystroke dynamics, IP Address, Device identifier, etc.

Embodiments of the invention may therefore encompass multiple different Cluster Comparers. The structure of all Cluster Comparers may be similar: Each may use one or all of the following:

A Calculator of Cluster Difference Measures: Additional to "cluster distance", other distance measures between two clusters can be calculated and can later be used in the decision process A Calculator of Multi-Factor Supporting Evidence: If keystroke dynamics is the only obtainable factor, or if it is not desirable to use multi-factor evidence for support, then this calculator is empty—there is no supporting evidence. If other factors such as IP address, Device identifier and others are available, they can be used to support a pattern found through primary factors such as keystroke dynamics A Cluster Difference Evaluator: All evidence for a decision about two clusters is available at this point (one or more distance measures, possible supporting evidence). Using the collected evidence, the Cluster Difference Evaluator makes a decision about how two clusters should be treated:
Either as part of a single group
Or as two separate groups (where one or both group are to be treated as globally distinct)
Or one or both of the clusters are to be treated as outliers The relationship about two clusters determined by the Cluster Comparer may be then returned to the Sample Grouping Algorithm.

Figure 15A:
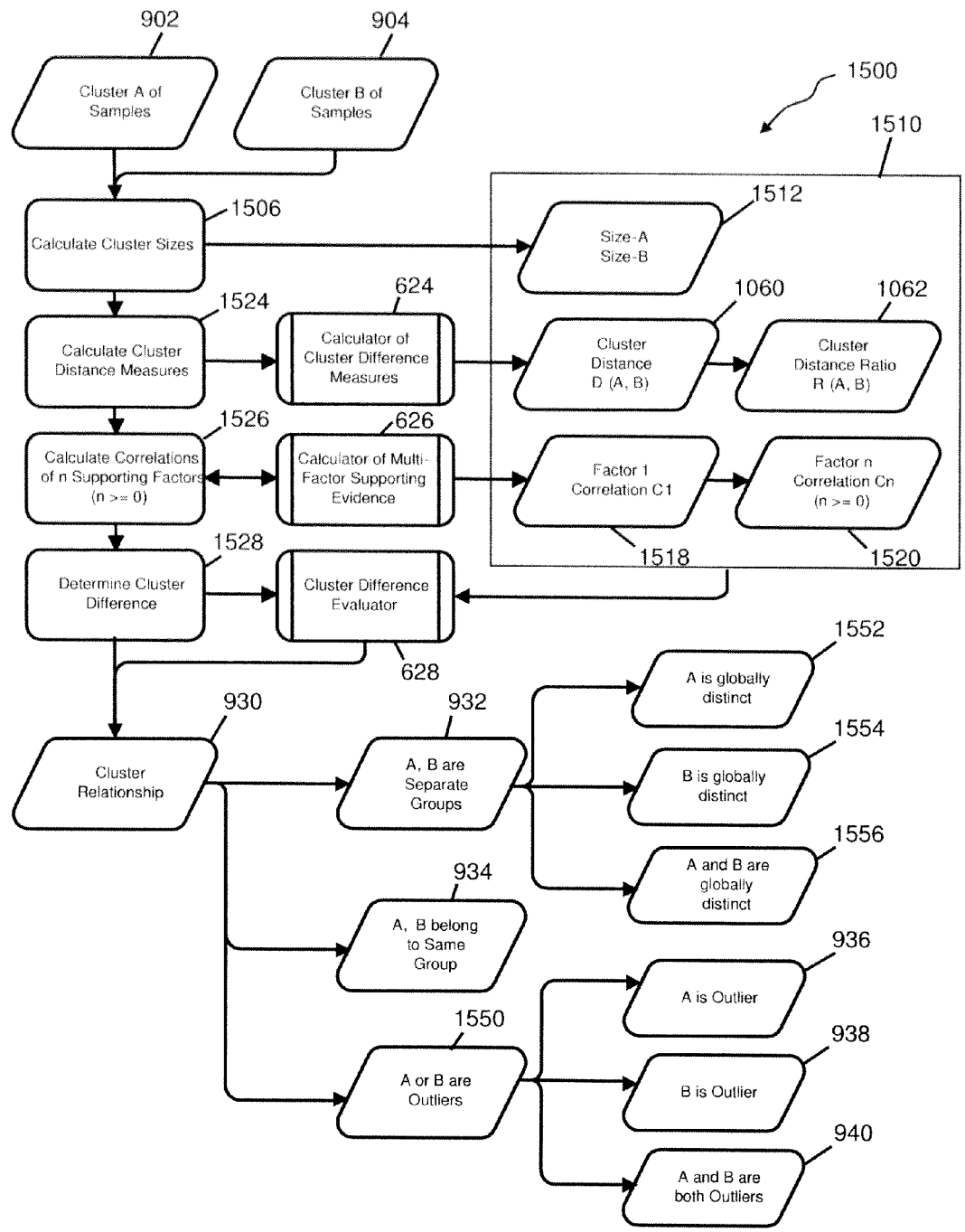
FIG. 15A shows a cluster comparer mechanism for acting on or processing two groups of samples, according to embodiments of the invention.

FIG. 15A shows a cluster comparer mechanism 1500 for acting on or processing two groups of samples, according to embodiments of the invention. FIG. 15A shows mechanism 1500 including block 1506 receiving cluster A samples from block 902 and cluster B samples from block 904 and calculating cluster sizes for clusters A and B. The size of clusters A and B are output to block 1512. Block 1524 then receives cluster A and B and calculates cluster distance measure which are output to block 624, the calculator of cluster difference measure. Block 1526 receives cluster A and B and calculates correlations of n supporting factors (n≥0), and outputs the correlations to block 626, the calculator of multi-factor supporting evidence.

Block 624 outputs the cluster difference measures to block 1060, the cluster distance; and to block 1062 the cluster distance ratio. Block 626 outputs the multi-factor supporting evidence to block 1518 the factor 1 correlation C 1; and to block 1520 the factor n correlation Cn (n≥0). Block 1528 receives cluster A and B and determines the cluster difference, which is output to block 628 the cluster difference evaluator, and output to block 930 the cluster relationship.

Results block 1510 includes blocks 1512, 1060, 1062, 1518 and 1520, and outputs the results to block 628 the cluster difference evaluator. The output of block 628 is also received by cluster relationship block 930. Block 930 determines, identifies, and/or outputs whether clusters A and B are separate groups at block 932; whether they belong to the same group at block 934; and whether either cluster A or cluster B are outliers at block 1550. Block 932 determines or identifies whether A is globally distinct at block 1552 (and B is not globally distinct), or whether B is globally distinct at block 1554 (and A is not globally distinct), or whether A and B are both globally distinct at block 1556.

Block 1550 determines or identifies whether A is an outlier at block 936 (and B is not an outlier), or whether B is an outlier at block 938, (and A is not an outlier), or whether A and B are both outliers at block 940. Mechanism 1500 may include descriptions above with respect to mechanism 900, block 622, and/or block 922.

Calculator of Cluster Difference Measures

According to embodiments, the Calculator of Cluster Difference Measures calculates one or more measures that express how much two sets of samples ("clusters") differ. This mechanism may be used by the Cluster Comparer which determines the relationships between two clusters.

Cluster Distance

One measure that expresses the difference between two clusters is "Cluster Distance". This measure has a special role:

Like other measures it serves to compare and to distinguish two clusters

Unlike other measures it is used to determine the order in which clusters are being processed:

For each clustering iteration the two clusters closest by Cluster Distance may be chosen for further comparison and analysis of their relationship. The clustering iteration is then performed on these two clusters.

For two clusters A and B, the Cluster Distance may be defined as a mathematical combination of all:

D(a, b), where a is an element (sample) in cluster A and where b is an element (sample) in cluster B and where D is the Sample Distance between 2 samples One embodiment of the invention uses the following specific Cluster Distance with success:

Cluster Distance=Avg $\{D(a,b)|a$ in $A$, $b$ in $B$, $D$ is KD-Distance$\}$.

KD-Distance is the Sample Distance further described below in A Distance Measure for 2 Typing Samples: "KD-Distance". Thus Cluster Distance may express how far apart on average elements in two clusters are from each other. KD-Distance is the Sample Distance further described below in A Distance Measure for 2 Typing Samples: "KD-Distance". Thus Cluster Distance may express how far apart on average elements in two clusters are from each other.

Other Cluster Distances that may be commonly used in cluster analysis:

Max Distance: $D$-Max=Max $\{D(a,b)|a$ in $A$, $b$ in $B$, $D$ a distance measure between 2 samples$\}$ Min Distance: $D$-Min=Min $\{D(a,b)|a$ in $A$, $b$ in $B$, $D$ a distance measure between 2 samples$\}$ Cluster Distance Ratio According to embodiments, another measure that expresses the difference between two clusters is "Cluster Distance Ratio". As mentioned before, Cluster Distance as a single absolute measure may not effectively group samples into clusters, since groups originating from different users can consist of close samples or they can consist of looser samples, depending on the user. Cluster Distance Ratio is a second measure of cluster difference. The second measure provides a separate or additional check or basis that can be used to determine whether two clusters likely belong to two different users or whether they don't.

Whereas Cluster Distance expresses the absolute distance between two clusters, Cluster Distance Ratio expresses the relationship between internal cohesion of a cluster to distance between two clusters. Examples of different types of Cluster Distance Ratio include:

Definition 1: Cluster Distance Ratio R(A,B)

A, B are two clusters. Then the Cluster Distance Ratio R(A, B) is defined as:

$$R(A, B) = \frac{InternalDistance(A \cup B)}{InternalDistance(A) + InternalDistances(B)}$$

$$InternalDistance(\text{Sample} - \text{Set } S) = \sum_{a,b \in S, a \neq b} (KD - \text{Distance}(a, b))^2$$

KD-Distance is the Sample Distance further described below in A Distance Measure for 2 Typing Samples: "KD-Distance". Other Internal Distances may be other combinations of KD-Distance values D(a, b), where a in A and b in B.

Figure 15B:
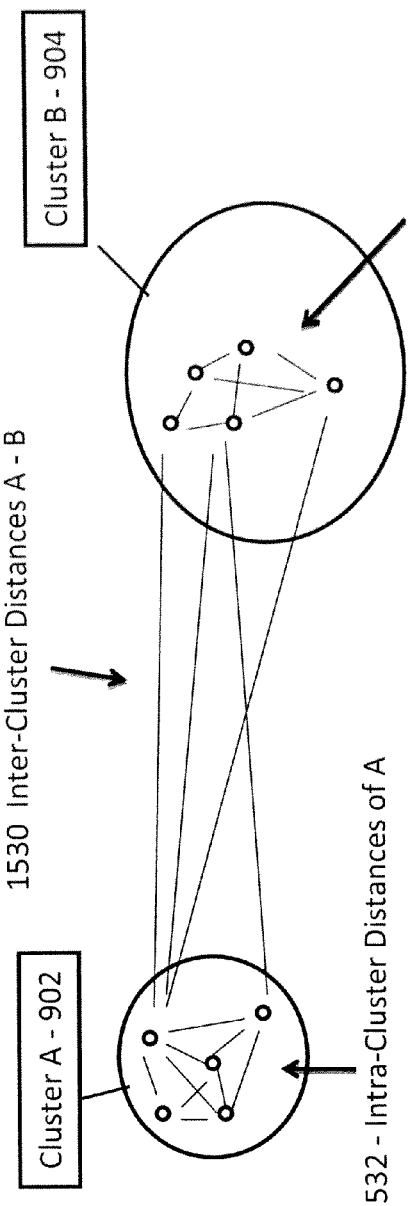
FIG. 15B shows biased ratio calculations of mathematical combinations of distances between subsets and all of data point pairs of the feature set data of clusters.

FIG. 15B shows biased ratio calculations of mathematical combinations of distances between all and subsets of data point vectors of the feature set data of clusters. FIG. 15B shows cluster A-902 (e.g., a subset of all the data point vectors) having intra-cluster distances 1532. Cluster B-904 (e.g., a subset of all the data point vectors) has intra-cluster distances 1534. The inter-cluster distances between cluster A and cluster B (e.g., two subsets of all the data point vectors) are shown as distances 1530. The distance between clusters 1560 may be described as average 1540.

Biased ratio 1562 may be calculated by calculating the ratio of: (1) the sum of intra-cluster distances of cluster A union ("U") cluster B (the sum or aggregate of distances 1530 plus 1532 plus 1534, e.g., all the data point pairs) to (2) the sum of the intra-cluster distances of cluster A and the sum of the intra-cluster distances of cluster B (the sum or aggregate of distances 1532 and 1534, e.g., a subset of all the data point pairs). Another description of this ratio is ratio 1564 which is 1 plus (1530/(1532 plus 1534)).

This biased ratio tends to be higher if the number of elements in clusters A and B are the same; and it tends to be higher if the number of elements (e.g. data point pairs of feature set data) in clusters A and B are small. Moreover, if the number of elements in A is much larger than the number of elements in B, then the intra-cluster distances of A tend to dominate both measures, and ultimately the ratio, which will be close to 1.0. This means the ratio is biased towards sets A and B of similar sizes, for which the ratio is larger. However, these behaviors may be undesirable since they are influenced by the number of elements in the clusters, instead of by the closeness of elements in clusters A and/or B, which is what the ratio is trying to measure to determine whether the clusters should be merged, discarded or found distinct.

Cluster Distance Ratio expresses, how much the internal distances of two clusters change, when the two clusters are joined. One can think of the internal distance of a cluster as the looseness or lack of cohesion of elements within the cluster. If two clusters are joined leading to a much larger internal distance or much looser cohesion, then the evidence points to the two clusters being intrinsically different. Thus using or including Cluster Distance Ratio in decision making provides another angle of looking at two data sets and deciding whether they originated from different users.

Definition 2: Using Two Unbiased Ratios

To avoid bias of the ratio based on size (e.g., as described above), two unbiased ratios RA and RB may be defined, where RA expresses the relationship of A to the union of A and B, RB expresses the relationship of B to the union of A and B, and both RA and RB are normalized for the size of the involved clusters:

$$RA(A, B) = r'(A, A \cup B) = \frac{\frac{InterClusterDistance(A, B)}{size(A) * size(B)}}{\text{Avg} - InternalDistance(A)}$$

similarly:

$$RB(A, B) = r'(B, A \cup B) = \frac{\frac{InterClusterDistance(A, B)}{size(A) * size(B)}}{\text{Avg} - InternalDistance(B)}$$

where:

$InterClusterDistance(A, B) =$ $$\sum_{a \in A, b \in B} (KD - \text{Distance}(a, b))^2 \text{ similar to Internal Distance!}$$

$Avg - InternalDistance(A) =$ $$\frac{\frac{InternalDistance(A)}{size(A) * (size(A) - 1)}}{2} \text{ normalized for size of } A$$

Figure 15C:
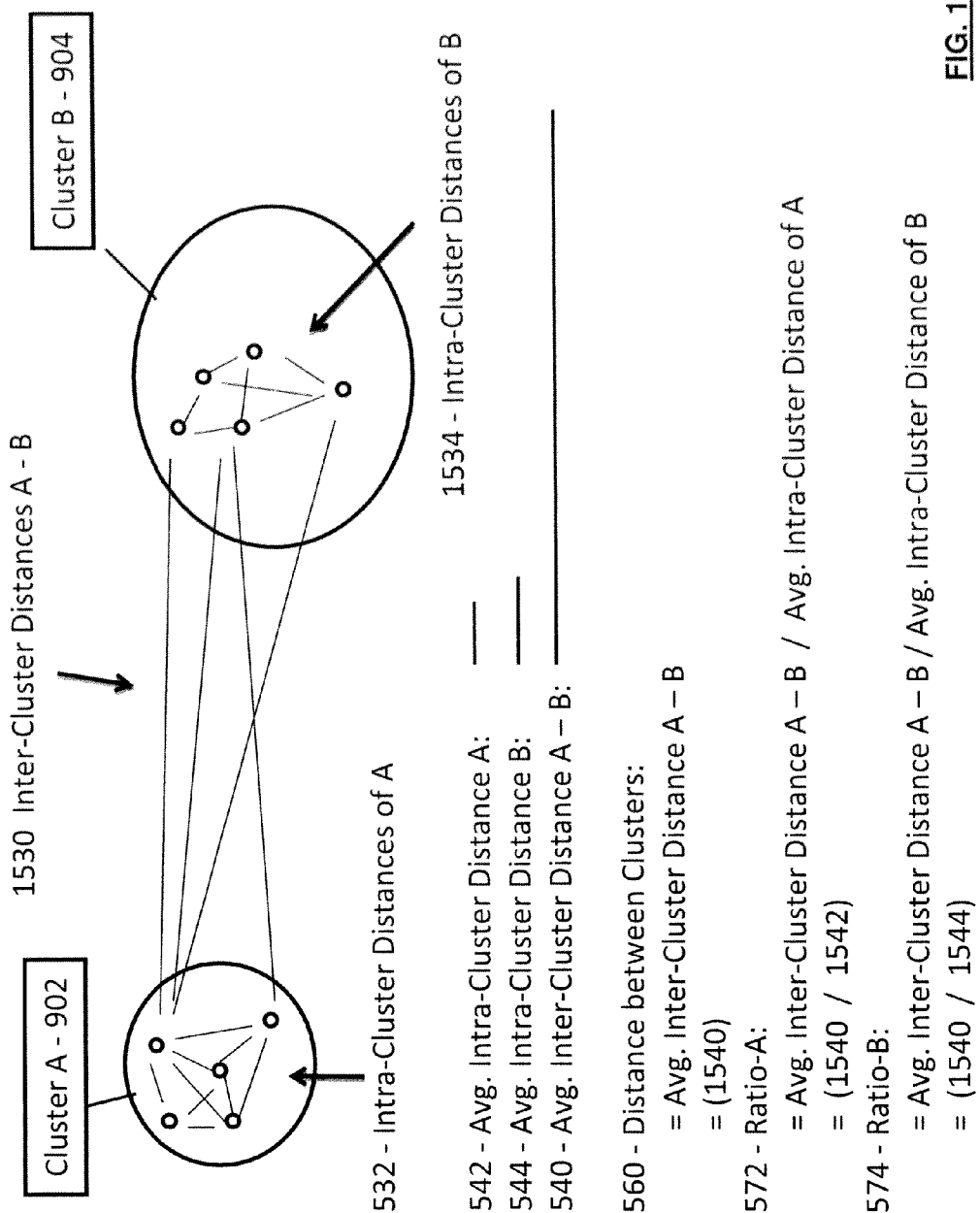
FIG. 15C shows unbiased ratio calculations of mathematical combinations of distances between subsets of data point pairs of the feature set data of clusters.

FIG. 15C shows unbiased ratio calculations of mathematical combinations of distances between subsets of data point pairs of the feature set data of clusters. FIG. 15C shows cluster A-902 (e.g., a subset of all the data point vectors) having intra-cluster distances 1532 and average intra-cluster distance 1542. Cluster B-904 (e.g., a subset of all the data point vectors) has intra-cluster distances 1534 and average intra-cluster distance 1544. The inter-cluster distances between cluster A and cluster B (e.g., two subsets of all the data point vectors) are shown as distances 1530 and have average inter-cluster distance 1540.

An unbiased ratio, ratio-A-1572 may be calculated by taking the ratio of average inter-cluster distance 1540 to average inter-cluster distance of cluster A-1542. Similarly, another unbiased ratio, ratio-B-1574 may be calculated by taking average inter-cluster distances 1540 to average inter-cluster distances of cluster B-1544. These two unbiased ratios may be described as a ratio of mathematical combinations (e.g. average inter-cluster distance/average intra-cluster distance) of cluster differences which are combinations of differences of data point pairs (e.g. the average of the sum of inter-cluster distances and intra-cluster distances of the data point pairs).

Here, the biased ratio sum of cluster distances A U B (from FIG. 15B) is replaced with the average of inter-cluster distances of A to B (e.g., excluding the "non-normalized" sum or a non-averaged sum that includes intra-cluster distances of A and/or of B). Similarly, to "un-bias" the second measure and contributor to ratio, the biased ratio sum of all intra-cluster distances of A and of all intra-cluster distances of B (from FIG. 15B) is replaced with the two measures, average intra-cluster distance of A, or average intra-cluster distance of B, resulting in two ratios.

Advantages of these unbiased ratios include, without limitation thereto, that they normalize all involved measures and take out cluster size (e.g., number of elements in a cluster) as a factor. Thus, the unbiased ratios avoid and cure the undesirable behavior of the biased ratios since they are Not influenced by the number of elements in the clusters, and instead, more accurately represent the closeness of elements in clusters A and/or B, which is what the ratio is trying to measure to determine whether the clusters should be merged, discarded or found distinct.

Some embodiments include (A) calculating distance data between each non-discarded data point pair of the feature set data of each pair of samples; (B) identifying the existence of two clusters of the feature set data by comparing the distance data to a distance threshold; (C) based on the distance data, calculating a first ratio of: (1) an average distance between the combinations of all inter-cluster distances of data point pairs of the feature set data in both of the two clusters, to (2) an average distance between the combinations of all intra-cluster distance of data point pairs of the feature set data in a first of the two clusters; (D) based on the distance data, calculating a second ratio of (1) the average distance between the combinations of all inter-cluster distances of data point pairs of the feature set data in both of the two clusters, to (2) an average distance between the combinations of all intra-cluster distance of data point pairs of the feature set data in a second of the two clusters; and (E) one of (a) merging the first and second cluster, (b) discarding the first or second cluster, and (c) identify the first and second cluster as distinct by comparing the first and second ratio to a ratio threshold.

According to some embodiments, calculating distance data may comprise calculating distance data between each pair of data point vectors, where each vector in the pair is comprised of one half of the data points of non-discarded data point pairs of the feature set data of a pair of samples. Here, distances are calculated between data points in a pair of two data vectors (e.g., excluding or eliminating outliers).

The Cluster comparer may use the two unbiased ratios to distinguish A and B from each other. The ratios may also be used (e.g., by the cluster comparer) to distinguish A and B from the rest of the groups. In some cases:

If RA is large and RB is large, then both A and B are distinct groups in their own right If RA is large, but RB is not large, then A is distinct, but B may not be complete, there may be other clusters and samples close to B. Further processing is needed and B should not be removed from it.

Analogously, if RB is large, but RA is not large, then B is identified as a distinct group, but A remains for further processing.

Advantage of Using Ratio Additionally to Distance

Distance measures may be present in various embodiments or settings: The distance between two samples (KD-Distance), the distance between two clusters ("cluster distance" or "inter-cluster distance"), the internal distance within a cluster ("intra-cluster distance", e.g. based on KD-Distance), etc. Distance in all these settings may express an absolute difference: How different are two samples, how different are two clusters, how consistent is a set of samples.

Cluster decisions made based on these distance measures may be decisions based on absolute differences in typing rhythm. In some cases or settings, multiple typing rhythms might have to be accommodated. For example:

Two typists contribute samples to an account, but one typist is highly consistent, while the other typist is not. An algorithm with an absolute distance threshold would identify patterns of one given consistency, but it might miss highly consistent patterns which are fairly close to each other, and at the same time it might detect multiple patterns when there is really only one inconsistent pattern Similarly, applying one threshold to multiple accounts leads to the same problem: A single user of account A might be very consistent, while a single user of account B might be very inconsistent. As a consequence B might be detected as shared (while in reality B may not be shared), and A may contain a second pattern that remains hidden to the algorithm Typing consistency is closely linked to the typed string, how familiar a person is with it, how complex it is to type, how long it is, etc. An effective algorithm needs to accommodate different accounts with different levels of typing consistency, string complexity, string familiarity, etc.

It is easy to believe (and it may be proved in experiments) that a fixed threshold for absolute distance does not provide the necessary flexibility to handle multiple scenarios of typists, strings, and familiarity. A ratio measure (or multiple ratio measures) may provide that added flexibility: Ratio looks at clusters A, B and their relationship to the merged cluster A U B. If the expanse of A U B in the space of data vectors is much larger than the expanse of A or the expanse of B or the expanses both of A and B by the addition of A to B, then A and B are likely different patterns. This may allow for different consistencies within different clusters. The patterns can still be found.

In practice, a tradeoff may be used between absolute distance and ratios: Two clusters with large distance may be considered different, and two clusters with small distance but high ratio may also be considered different.

A Distance Measure for 2 Typing Samples: "KD-Distance"

In the previous sections Cluster Distance Measures heavily referred to a pair-wise distance between 2 data samples. According to embodiments, this measure may be at the root of Cluster Distance Measures, and thus part of the sample grouping algorithm. It evaluates the difference between samples: A high value is assigned to two samples that are likely created by different individuals, and a low value is assigned to two samples that are likely created by the same individual.

Keystroke dynamics analysis is heavily involved in that pair-wise distance. In some embodiments of the invention keystroke dynamics data is the only data being compared in this pair-wise distance, although it can also be used with other data and other data types. The distance uses for keystroke dynamics data may therefore be called "KD-Distance".

Keystroke Dynamics and Other Factors

When later describing the involvement of multiple factors in the account sharing mechanism (see Calculator of Multi-Factor Supporting Evidence below), some embodiments of the invention distinguish between primary and secondary factors.

Primary factors may be directly linked to a person accessing an account. For instance, one or more biometric factors, which are directly linked to a person, can be used as primary factors. In particular some embodiments of the invention use keystroke dynamics as its single primary factor, simply because it is easily available and effective.

Secondary factors may be indirectly linked to a person. They can include factors, that are only indirectly linked to a person, such as a machine identifier, IP address, location, etc. The different values of a secondary factor in multiple data samples can be used to determine or hint at the presence of multiple persons among the account users, but alone, they may not be true evidence of such. For example, two people can share a single machine, and on the other hand, one person may use two different machines. Thus, secondary factors showing this evidence are not conclusive, but may be used as circumstantial evidence.

To achieve maximum accuracy in some embodiments of account sharing detection, the sample grouping algorithm focuses on primary factors. Here, when grouping samples, the distance between 2 samples may compare primary factors alone. Since some embodiments of the invention use keystroke dynamics as a sole primary factor, in the following KD-Distance will be defined in detail for keystroke dynamics data only. A generalization of this measure for data with multiple primary factors is given near the end of this section.

Keystroke Sample Data and Basic Distance Considerations

For some embodiments of keystroke data distance calculations, from each data sample only keystroke timings are considered for the comparison of 2 samples. From each set of keystroke timings (also called "typing sample") key-down and key-up timings are extracted. From those timings derived features such as dwell, flight, etc are calculated. This calculation results in a Feature-Vector for each typing sample.

As described above in Keystroke Dynamics Basics, Features are derivatives of basic key-up and key-down events, such as (for example):

Dwells: Time interval between key-down and subsequent key-up events
Flights: Time interval between key-up event of one key and key-down event of the next key
Latency: Time interval between key-down event and key-down event of the next key.
Total time to type a string, etc For example, two typing samples may result in two feature vectors similar to the following:

$$\text{Typing Sample 1} - \text{FeatureVector:} \vec{x} = \begin{pmatrix} x1(\text{dwell}) \\ x2(\text{dwell}) \\ \vdots \\ xn(\text{flight}) \end{pmatrix}$$

$$\text{Typing Sample 2} - \text{FeatureVector:} \vec{y} = \begin{pmatrix} y1(\text{dwell}) \\ y2(\text{dwell}) \\ \vdots \\ yn(\text{flight}) \end{pmatrix}$$

To measure the difference between two samples, one could calculate the Euclidean Distance between the two vectors x and y.

$$ED(\vec{x},\vec{y}) = \sqrt{(x1-y1)^2 + \ldots + (xn-yn)^2}$$

The Euclidean Distance is a distance, and one could use it to group samples by their pair-wise distances from each other. However, the Euclidean Distance may have a number of shortcomings:

Euclidean Distance may not take into account the different types of features extracted from the original timings sample:
  Flight values can be very large (above 1000 ms) and their large values can completely overshadow dwell values which might be around 100 ms and whose differences (xi−yi) might be around 10 or 20 ms.
  Dwells and Flights have units (milliseconds, microseconds), while other features such as Dwell Tendencies and Flight Tendencies are scalar. The Euclidean Distance is not defined for vectors of mixed types of coordinates.
Euclidean Distance may be sensitive to the number of data points in the vector. Although all pairs of compared samples are always based on the same typed strings and always have the same dimension, different accounts with different usernames and passwords would lead to different lengths of feature vectors and to different vector dimensions. This makes it impossible to have effective thresholds for all situations of different typed strings
Euclidean Distance may be highly sensitive to outliers: One aberrant data point of 1000 ms in a set of otherwise near 100 ms data points completely dominates the resulting distance. Typing rhythms are by nature full of outliers: A typist might hesitate on a specific key once, when he normally doesn't. On the next day he may hesitate on a different key once. A typing pattern consists of not just typical behavior; it also may need to have tolerance for typical typing aberrations.

Thus, for some embodiments, another usable distance can be constructed in several iterations. In these embodiments, any or all of the following 3 strategies may be used in the development of a usable distance:

Each feature type is treated separately: A separate distance value is calculated for each examined feature type. The separate distances are combined into one overall distance
Each feature type is associated with its own specific distance calculation, which is customized and optimized for the feature type, its typical values and its typical variation Each distance calculation employs a process of eliminating outlying points Customized Distance Types:

According to embodiments, any one or more of the following 3 basic distance measures ("distances") may be included in share detection, with success:

Normalized Euclidean Distance ("NED"):

Normalized Euclidean Distance is Euclidean Distance adjusted for vector dimension. This distance may work best for distinguishing data vectors made up of Dwell points. It may still suffer from low tolerance for outliers. Dwells normally have less outliers and less dramatic outliers than some of the other feature types.

$$\text{Feature Vectors } \vec{x} = \begin{pmatrix} x1 \\ \ldots \\ xn \end{pmatrix}, \vec{y} = \begin{pmatrix} y1 \\ \ldots \\ yn \end{pmatrix}$$

$$NED(\vec{x}, \vec{y}) = \sqrt{\frac{1}{n} * ((x1 - y1)^2 + \ldots + (xn - yn)^2)}$$

This distance is very similar to Euclidean distance, except for factor $$\sqrt{\frac{1}{n}}$$

Normalized "Harmonic" Distance ("HD"):

Flight times can be very large. In Euclidean distance these very large values can dominate the result. Another process normalizes the Euclidean distance by the size of the two contributing vectors, leading to normalized distance. Normalized Distance may be used successfully for distance calculation involving Flight data; however it is still sensitive to outliers.

$$HD(\vec{x}, \vec{y}) = \frac{\|\vec{x} - \vec{y}\|}{\sqrt{\|\vec{x}\| * \|\vec{y}\|}}$$

where $\|\vec{z}\| = \sqrt{z1^2 + \ldots + zn^2}$ for any n-dimensional vector $\vec{z} = (z1, \ldots zn)$ Inverted Distance ("ID"):

Inverted Distance is a distance designed to give more weight to the smaller coordinate-specific distances (xi-yi) than to the larger distances (xi-yi). Inverted Distance is less sensitive to outliers. It has performed well for Flight data.

$$ID(\vec{x}, \vec{y}) = \frac{1}{n} \sum_{i=1}^{n} \left(1 - \frac{1}{1 + k * (xi - yi)^2}\right)$$

k: a scaling factor

Examples of other Distance types that may be used in embodiments include:

Normalized k-Norm-Based Distance:

$$Dist(\vec{x}, \vec{y}) = \left(\frac{1}{n} * (|x1 - y1|^k + \ldots + |xn - yn|^k)\right)^{\frac{1}{k}}$$

Normalized Squared Euclidean Distance $$Dist(\vec{x}, \vec{y}) = \frac{1}{n} * ((x1 - y1)^2 + \ldots + (xn - yn)^2))$$

Outlier Control

Even after all the adjustments or uses of distance types above, all distances may still suffer from being highly influenced by outlier points. Flight may have frequent sporadic, far outliers in unpredictable positions. For example, a vector x=(x1, . . . , xn) of flight data of a sample S1 might have a flight point xi>1000 ms, and another vector y=(y1, . . . yn) of flight data of a sample S2 by the same typist might have flight point yj>1000 ms, where i≠j. Meanwhile xj and yi might have more "usual" values in the range 0-200 ms. |xi−yi| would be large, and |xj−yj| would also be large, and consequently any of the above distance measures applied to x and y would be large, even though the samples are not essentially different. Similar outlier problems may occur for dwell as well, only to a smaller degree.

As mitigation, some embodiments may add another processing "outlier control" iteration to identify and discard (e.g., detect and remove; or "prune") outliers, such as data points (or data point pairs) that are determined to be detrimental or over influential to the distance calculations. For example, for any two samples that are compared, outlier discarding may result in all or only a subset of all data point pairs being included in the distance calculation (e.g., the discarded data points or data point pairs are excluded from the calculation). For some embodiments, outlier processing is performed for (e.g., based on) each 2 samples (rather than larger sets of samples) to effectively determine which outliers to get rid of. For an embodiment where only a subset of all data point pairs are included in the distance calculation:

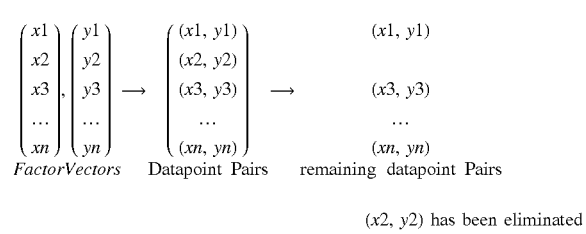

(x2, y2) has been eliminated

The selection of which data point pairs remain for processing may be based on how different the points in each pair are: The pairs, whose distances between their two points are largest are removed from the set. The remaining pairs are used in the distance evaluation:

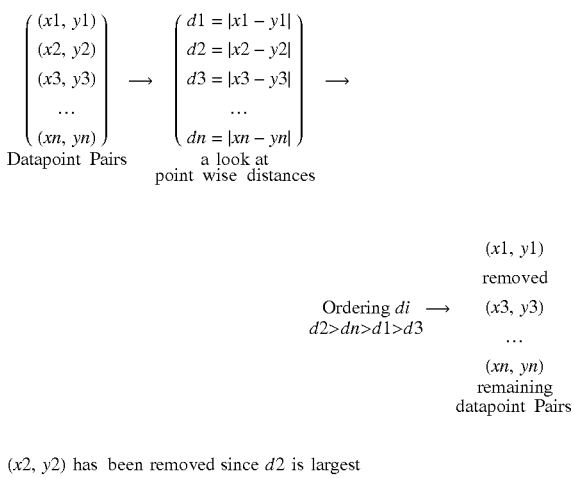

(x2, y2) has been removed since d2 is largest

Note that (x2, y2) has been eliminated (since d2 is largest). According to embodiments, the remaining data point pairs are then used in the calculation of the distance of two feature vectors x and y. Any distance measure (NED, HD, ID, etc) can be combined with this mechanism of first removing certain data point pairs. The distance measure is applied to the remaining data point pairs.

This means, that of all the data point pairs only a subset of data point pairs are included in the distance calculation. The choice of subset depends on the absolute values of the point-wise distances |xi−yi| of each data point pair (xi, yi), but also on the number of data point pairs to be included. In one embodiment of the invention a fixed percentage q of data point pairs are picked for inclusion in the final distance calculation. q can be chosen specifically for each type of distance measure, for each feature type or for other considerations.

For feature types such as flight which vary highly even for the same typist and the same feature in the same string, q=50% to q=80% have proven to be usable numbers of data points to be included in the calculation. For feature types such as dwell, which vary less for a single typist and the same feature in the same string, q=80% to q=90% of data point pairs can be included in the distance calculation.

The percentage q may be determined in tests with user data by how well a feature-specific distance measure manages to distinguish two samples by the same user from two samples by different users. Thus q may depend on the type of feature it is applied to. q may also depend on the type of distance measure (NED, HD, ID, etc) used in an evaluation of a feature.

Some embodiments of the invention use the following feature-specific distances and outlier removal percentages:

For Dwell points: Normalized Euclidean Distance (NED), using the 80% closest data point pairs (closest=the absolute distance between the two elements in the pair may be among the 80% smallest of all dwell data point pairs)

For Flight points: Normalized "harmonic" Distance (HD) using the 60% closest data point pairs According to embodiments, a key to this process of outlier elimination may be that the points eliminated from the feature distance calculation depend on the specific two samples being compared. They are not fixed for a single sample, nor are they fixed for a set of n>2 samples. For any specific comparison of two specific samples, their own subset of outlying data point pairs may be determined. For example, a sample S1 with feature points {x1, . . . , x10} may be compared to another sample S2 based on points {x1, . . . , x8}, while S1 may be compared to another sample S3 based on points {x3, . . . , x10}. More motivation for and properties of this process are detailed further below.

Combining Feature-Specific Distances:

Some embodiments use selection of subsets of feature point pairs, using outlier control, and applying a customized distance measure to each subset of feature point pairs to calculate or result in multiple distance values. Each distance value may be specific to one of the selected subsets of feature point pairs. For example, the comparison between two typing samples may result in both a dwell-distance and a flight-distance.

For further processing of a set of samples into groups through cluster analysis (e.g., as noted herein) a single distance may be necessary. This distance may express in one value how 2 typing samples differ. Therefore, a combination iteration may be required. This combination may fulfill one or all of the following requirements:

The distances for each of the selected subsets (of feature point pairs) are included Subset-specific distances are feature-specific and should be scaled, such that they can be combined Subset-specific distances should be weighted according to their significance To that purpose, embodiments of the invention may use a combination function 'C'

Combined-Distance=$C(d1, \ldots, dn)=w1*s1(d1)+ \ldots +wn*sn(dn)$

Where d1, . . . , dn are the real-number results of feature-specific distance measures of two samples, and i, . . . , n indicate the index of each feature And where w1, . . . , wn are real-number weights And where s1, . . . sn are linear or non-linear scaling and normalization functions where si: $di \rightarrow si(di)$, for i=1, . . . n A function si maps the feature-specific distance di to a normalized value, such that s1(d1), . . . , sn(dn) are comparable by size and variation. The normalization includes adjustment of scale factor of each di which removes any units from di and makes di scalar, and it further includes translation of expected values for di to make the results for the various si(di) similar. In the Combined-Distance function C the values 'si(di)' are then linearly combined using weights w1, . . . , wn.

Some embodiments of the invention use normalization functions:

Dwell: $s1(d1)=Max((d1-30 \text{ ms})/60 \text{ ms}+0.5, 0)$

Where d1 is the result of a dwell-specific distance measure (such as Normalized Euclidean Distance) for dwell data point pairs Flight: $s2(d2)=Max((d2-0.3)/0.6+0.5, 0)$ Where d2 is the result of a flight-specific distance measure (such as Normalized "Harmonic" Distance) for flight data point pairs And Combination function Combined-Distance=$0.5*s1(d1)+0.5*s2(d2)$ Summary According to embodiments, to calculate the distance between two samples the following iterations are performed in the following order:

1. Calculate feature-specific distances d1, d2, ..., dn:
   a. Extract feature vectors
   b. Select subset of data point pairs for calculation (using feature-specific value 'q' to specify subset size)
   c. Apply feature-specific distance measure to each pair of feature vectors
2. Map feature specific distances d1, ... dn to normalized distances s1(d1), ..., sn(dn) using normalization functions s1, ..., sn
3. Combine normalized distances s1(d1), ..., sn(dn) using combined distance function.

Figure 16:
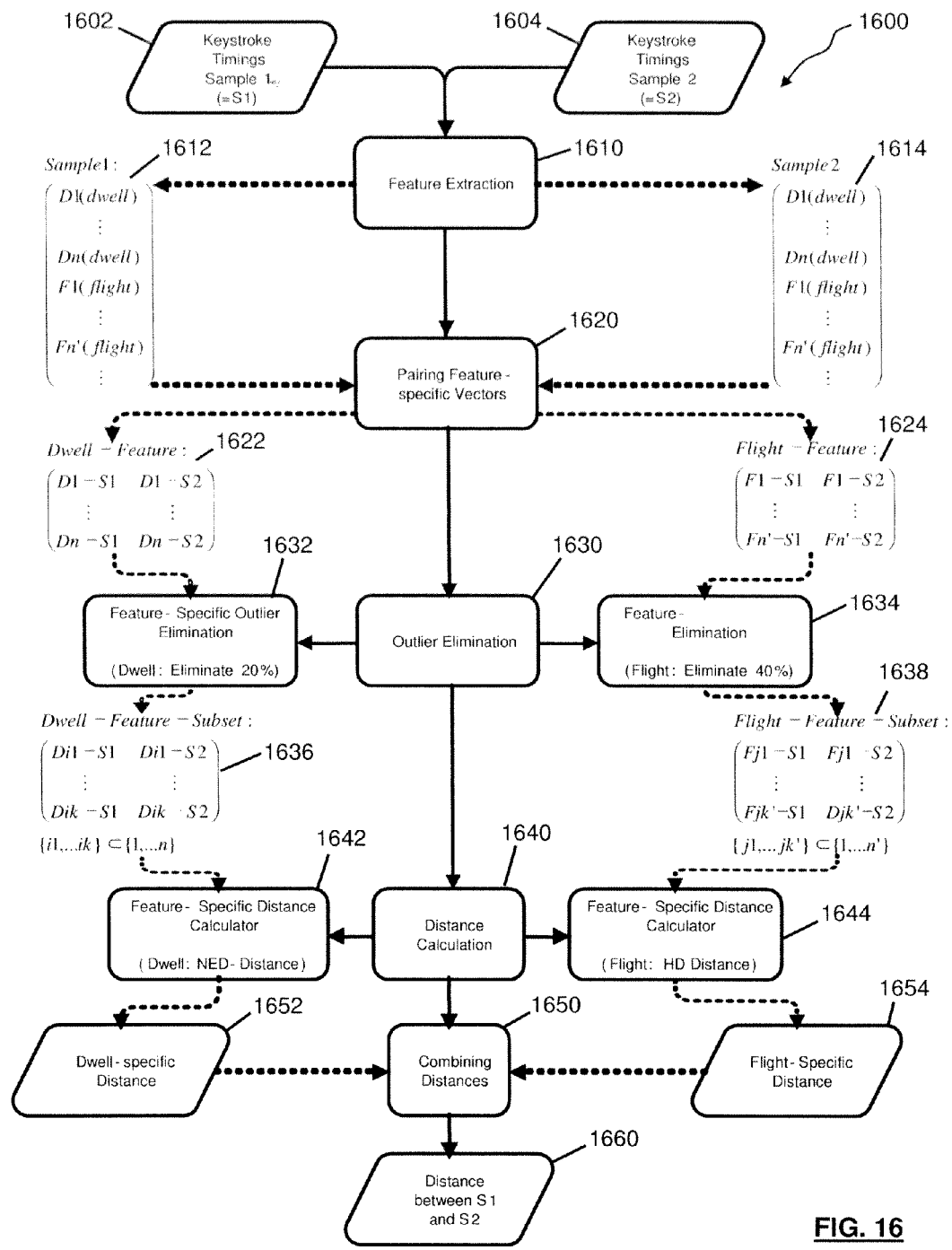
FIG. 16 shows a flow diagram or mechanism 1600 for calculating the distance between two timing samples, according to embodiments of the invention.

FIG. 16 shows a flow diagram or mechanism 1600 for calculating the distance between two timing samples, according to embodiments of the invention. FIG. 16 shows mechanism 1600 including feature extractor block 1610 receiving keystroke timing samples S1 and S2 from blocks 1602 and 1604 respectively. Block 1610 identifies or calculates the dwell and flight times for sample 1 and sample 2 at blocks 1612 and 1614. At block 1620 the features extracted at block 1610 are paired by each specific vector, such as shown for the pairing of dwell feature vectors at block 1622 and the pairing of flight feature vectors at block 1624. At block 1630 the outlier data point pairs of the paired feature vectors are eliminated, such as by eliminating specific dwell outliers at block 1632 and eliminating specific flight outliers at block 1634. Block 1632 shows a dwell elimination percentage for outliers of 20 percent; and block 1634 shows a flight elimination outlier percentage of 40 percent. However, it can be appreciated that the dwell eliminate percent can be different than 20 percent, such as by being 10, 15, 25, or 30 percent. Similarly, the flight elimination percent can be different than 40 percent such as by being 30, 35, 45, or 50 percent.

At block 1640 the distance between the paired feature vectors, excluding outliers (e.g. after outlier elimination at block 1630) is calculated, such as at block 1642 where the feature specific distance calculator calculates the dwell distances between the samples using a dwell-specific distance measure; and at block 1644 where the feature specific distance calculator calculates the flight difference for the samples using a flight-specific distance measure. The dwell specific distance and flight specific distance are provided at block 1652 and 1654 respectively.

Block 1650 receives the flight and dwell specific distances and combines the distances to provide the total distance calculated between sample S1 and S2 at block 1660. Mechanism 1600 may include descriptions above with respect to mechanism 1000, mechanism 1100, block 624, block 630 and/or block 633.

Some embodiments of the invention use the following features, functions and parameters:
Features used are dwell and flight
Feature-specific subset selection for outlier tolerance Dwell: $q=80\%$ Flight: $q=60\%$ Feature-specific distances:

Dwell: $d1$=NED (Normalized-Euclidean Distance)

Flight: $d2$=HD (Normalized "Harmonic" Distance)

Normalization functions:

Dwell: $s1(d1)=\text{Max}((d1-30 \text{ ms})/60 \text{ ms}+0.5,0)$

Flight: $s2(d2)=\text{Max}((d2-0.3)/0.6+0.5,0)$

Combination function

Combined-Distance=$0.5*s1(d1)+0.5*s2(d2)$

Special Strengths of KD-Distance

According to embodiments, a key feature of successful KD-Distance may be its comparison-specific outlier tolerance: A specified number of outlying data points are eliminated from the distance calculation. The data points eliminated are specific to the pair of samples being compared, and not necessarily common to the entire set of samples.

For example: Given 3 typing samples S1, S2, S3, each with feature points {dwell1, dwell2, dwell3, ..., dwell10}. The distance between S1 and S2 may be based on feature points {dwell1, ..., dwell8} of S1 and {dwell1, ..., dwell8} of S2. The distance between S1 and S3 may be based on feature points {dwell3, ..., dwell10} of S1 and {dwell3, ..., dwell10} of S3.

This allows for focusing on the similarities of typing within a group of typists: While a group of samples by the same typist may be expected to have similarities in the same feature points, different typists may have similarities between typing samples in typist-specific feature points. In other words: Typist A is consistent in different aspects of typing than is Typist B.

In another Example: Given the following:
Typing samples S1, ..., S5 by typist A, and typing samples S6, ..., S10 by typist B.
Each typing sample (S1, ..., S10) consists of timings for the same typed string.
Each typing samples (S1, ..., S10) contains 10 data points for the dwell feature: Dwell-1, ..., Dwell-10.
Suppose:
Typist A is an overall consistent typist, and typist B is an overall consistent typist
Typist A is most consistent in dwells 1,2,3,4,5,6,7,8
Typist B is most consistent in dwells 3,4,5,6,7,8,9,10.
Distances between any 2 of samples S1, ..., S5 (by typist A) will therefore be calculated using dwells Dwell-1, ..., Dwell-8, while distances between any 2 of samples S6, ..., S10 (by typist B) will be calculated using dwells Dwell-3, ..., Dwell-10. Any distance between 2 samples within {S1, ..., S5} will be small, and any distance between 2 samples within {S6, ..., S10} will be small, since both A and B are consistent in the data points examined for sample distances. The distances within {S1, ..., S5} will even be small, if A is inconsistent in dwells 9 and 10. Similarly B is "allowed" 2 points of inconsistency. In B's case, B may be inconsistent in dwells 1 and 2 without increasing the distance of his samples. The distance of samples Si and Sj, where Si is typed by A and Sj is typed by B will be larger, if A and B don't type alike. The differences between data points of A-samples and data-points of B-samples will be much larger than the differences between data points of two samples by the same typist. This may be the key to this outlier-tolerant KD-Distance, that it may be more tolerant of the natural inconsistencies of a typist, while still being effective at distinguishing different typists' patterns.

According to embodiments, the ability of a pair-wise distance measure to distinguish same-typist samples from different-typist samples may make it a fundamental and crucial element in cluster analysis and the calculation of cluster distance measures.

A Generalization for Multiple Primary Factors

According to additional embodiments, as mentioned earlier, it may be possible to include other primary factors besides keystroke dynamics in the comparison of two data samples. According to embodiments, the changes from the KD-Only Distance would be the following:

Feature Extraction: New primary factors would involve new features. They have to be defined and extracted from the data samples. This could be straightforward, when using a technology which has well-defined features already.

Outlier elimination: For each new feature type, a new rate of feature-specific outlier elimination may be determined experimentally. In some cases the outlier percentage could be 0%, if features are always clear and consistent.

Feature-Specific Distance Calculation: For each new feature type a normalized distance type suited to the type of data available in the feature may be determined. Example successful distance types of NED, ID and HD may well work for other features as well. Or the new feature or features already come with their own comparison measure established by the technology.

Combining distances: More feature types lead to more partial distances that need to be combined. A normalization of the new partial distances to align them with current partial distances may be required. Good processes of normalization can be determined experimentally. A weight of the new partial distance may also be required and this also can be determined experimentally.

According to embodiments, multiple factors can be used to detect account sharing. Keystroke Dynamics may be a factor tied directly to the person accessing an account and may be therefore among the more reliable factors for tracking an identity. A factor which provides strong evidence about a person may be considered a "primary factor". One embodiment of the invention uses keystroke dynamics as a primary factor, but other possible primary factors are other biometric data, such as fingerprint, retina image, palm measurements, etc.

Other "secondary" factors may provide circumstantial evidence: To access an account different machines might be used at different times, access may have occurred from a different IP Address, which might indicate a different physical location. These differences do not prove that a different user has been attempting access, since the same person can use different machines, different IP addresses or different locations at different times. However, the use could hint at a different person using an account. Those factors are considered "secondary factors". As secondary factors, one embodiment of the invention uses IP Address, device tag (information on the physical machine used for access) and geographic information derived from the IP address. Other factors can include date and time, access path, network configuration, browser version, and many more.

Embodiments of the invention may use primary factors to group samples into identified groups (each group representing a distinct user's access attempts), and it uses secondary factors to complete the picture of account sharing established by primary factors. This means that for account sharing patterns established through primary factors, secondary factors provide supporting evidence.

Example: Two groups A and B have been identified as distinct by the primary factor of keystroke dynamics. Looking at secondary factors, the following evidence comes to light: Group A's samples were all submitted by device 1 from New York, while Group B's samples were all submitted by devices 2 and 3 from Los Angeles. This draws the picture of two account users accessing the account from their own machines, each user at their own location. In arguments with the account owner the evidence from secondary factors can be used to prove the type of account sharing that is occurring and that has been detected.

In certain borderline cases embodiments of the invention further use or include secondary factors to tip the balance towards identifying an account as shared: If two groups of samples are somewhat different, but not quite different enough to be considered caused by different users, support by secondary factors will influence the decision and the two groups may be considered distinct. This result may be marked as an "emerging pattern", in contrast to an outright distinction by a primary factor, which may be marked as a "strong pattern". The use of supporting evidence through secondary factors is detailed below in Cluster Difference Evaluator.

What it means that a secondary factor supports a primary-factor-based grouping may be defined below in Correlation Calculator. The support may be expressed by the concept of correlation, which is also defined below. A minimum correlation may be required to consider a secondary factor supportive of a primary-factor-based grouping. The minimum correlation can depend on the type of secondary factor used in support for a grouping. In some embodiments of the invention, a universal threshold of $Ci\text{-}min=0.65$ works well for the secondary factors: device tag, IP address and location. In other embodiments, a threshold of $Ci\text{-}min=0.6$, 0.7, or 0.8 works well for the secondary factors (e.g., $Ci\text{-}min$ can be selected to be within a range of 0.6 to 0.8). The Correlation Calculator may be the heart of the Multi-Factor-Support Calculator.

Figure 17:
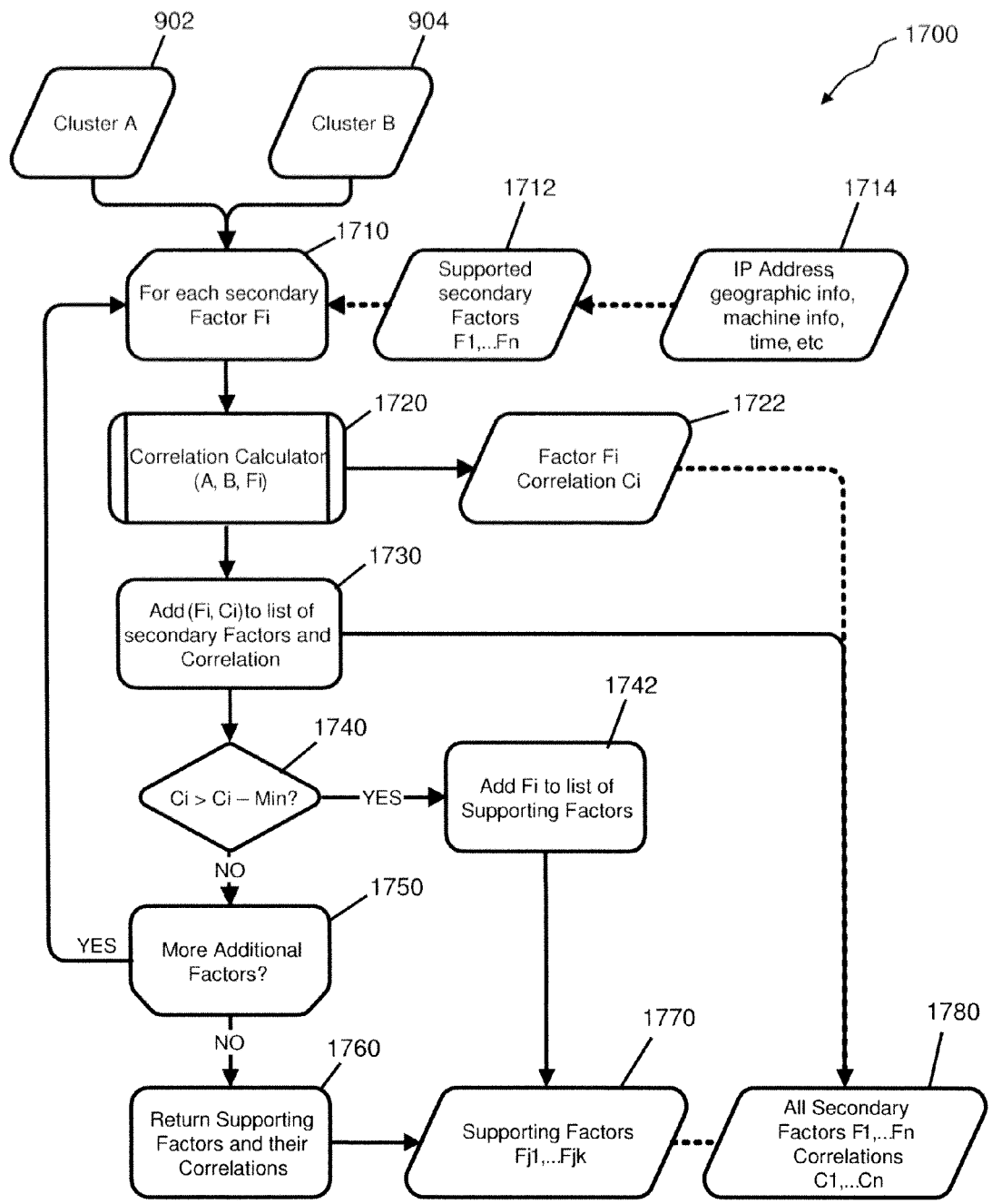
FIG. 17 shows a mechanism for calculating multi-factor supporting evidence, according to embodiments of the invention.

FIG. 17 shows a mechanism 1700 for calculating multi-factor supporting evidence, according to embodiments of the invention. FIG. 17 shows mechanism 1700 including block 1710 receiving clusters A and B from blocks 902 and 904. Block 1710 receives supported secondary factors F1 through Fn from block 1712 which receives secondary factor information such as IP address, geographic information, machine information, time of sample entry, etc. from block 1714 and determines which of the secondary factors from block 1714 are supported for processing by a mechanism 1700. Block 1714 may include secondary factors described for mechanism 500 blocks 522-528, 532, and 534.

For each secondary factor Fi of clusters A and B, correlation calculator block 1720 calculates a correlation of the secondary factor for cluster A and B and outputs the correlation as Ci to block 1722 and adds the factor in correlation to a list of secondary factors and correlations at block 1730. Block 1780 receives the data of block 1722 and 1730 and stores a recording of all secondary factors F1 through Fn, and all correlations C1 through Cn. At block 1740 it is determined whether correlation Ci is greater than a minimal predetermined or selected correlation threshold. If it is, processing can be used to block 1742 where factor Fi is added to a list of supporting factors and stored at supporting factors Fj1 through Fjk at block 1770.

If the correlation is not greater than a factor-specific minimum Ci-Min at block 1740 processing continues to block 1750 where it is determined whether more secondary factors exist. If they do, processing returns to block 1710. If they don't, processing continues to block 1760 where the supporting factors and their correlation are returned to the account sharing detector, such as by returning the information stored at blocks 1770 and 1780 as the multi-factor correlation data of block 640 of mechanism 600. Mechanism 1700 may include descriptions above with respect to mechanism 600, blocks 626, 640, and/or 642.

Correlation Calculator

According to embodiments, the purpose of the Correlation Calculator may be to establish how well a secondary factor, such as IP Address, location or machine identifier can be used as a basis with, or supports a grouping by a primary factor to determine sharing. The use of "correlation" in this context may be different from the well-established and well-known definition of correlation used in statistics. According to embodiments, "Correlation" here means the degree of similarity with which two different properties group a set of samples. Use of the term "correlation" makes sense here, since there may be no real danger of confusion based on context, and since the intuitive meaning may be similar between statistical correlation of two random variables and the similarity of grouping characteristics of two properties.

For example: Consider two groups A and B distinguished by different keystroke dynamics patterns. Suppose each data sample in A and each data sample in B has information on the machine the sample was submitted from. A's samples were submitted from machines 1, 2 and 3 and B's samples were submitted from machines 3 and 4. The question may be to what degree the machine information distinguishes A samples from B samples. There is some overlap (machine 3) and there is some distinction (machines 1, 2, 4).

If all but a few samples were submitted from machine 3, by both A and B, then machine information does not really support the distinction between A and B. The distinction into A and B rests on keystroke dynamics alone. If on the other hand all but a few samples were submitted from machines other than machine 3, by both A and B, then machine information for A-samples differs from machine information for B-samples in a similar way that Keystroke patterns differ for A-samples and B-samples. In the latter case the property "machine information" supports the grouping established by keystroke dynamics and can be used to strengthen it. The degree of support (or "correlation") comes down to how much the distribution of machine information values of A-samples differs from the distribution of machine information values of B-samples.

In greater generality: According to embodiments, the Correlation Calculator does the following: Given two sets S1 and S2 of elements, where each element in each set has the same property P, and each element's property P has an element-specific value vi, the Correlation Calculator compares the distribution D1 of values vi of P across set S1 to the distribution D2 of values vi of P across set S2. If distributions D1 and D2 of P-values are very different, then property P supports the distinction into S1 and S2. If on the other hand, distributions D1 and D2 of P-values are very similar, then P may be independent of the grouping into S1 and S2 and doesn't support it. In the first case, in which P supports the distinction into S1 and S2, P may be said to be correlated to the grouping (S1, S2), and the relationship between P and (S1, S2) may be assigned a correlation coefficient C. The larger C is, the closer the relationship between P and the grouping (S1, S2). Maximum value for C may be 1.0. In the latter case, in which P does not support the distinction into S1 and S2, P may be said to be not correlated to the grouping (S1, S2), or it may be said to be independent of the grouping (S1, S2). A correlation coefficient assigned to that scenario has a low value. The lowest value for C may be 0.0 (There is no negative correlation).

Figure 18:
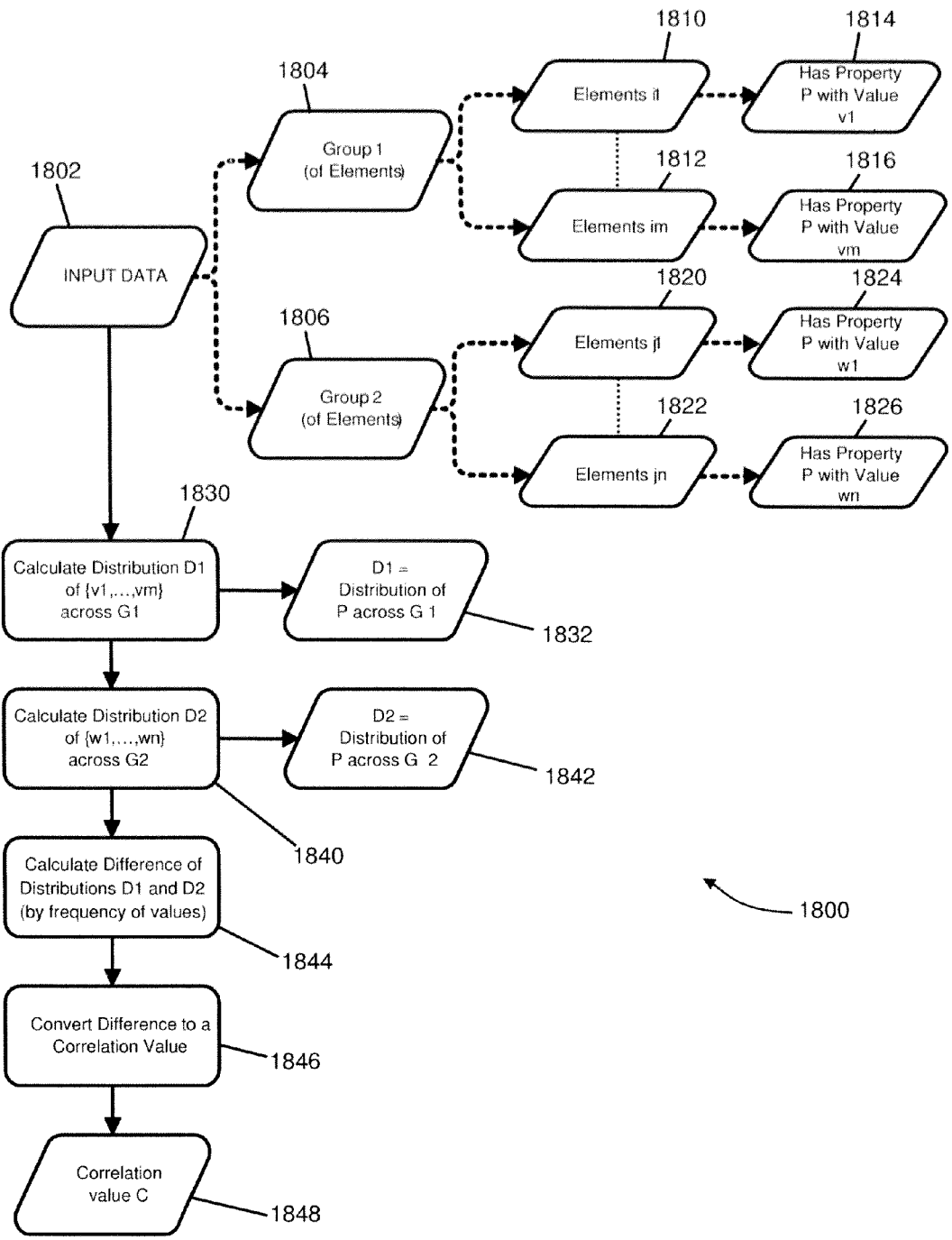
FIG. 18 describes a secondary factor correlation calculator or mechanism 1800 to correlate given groups of elements with a second property of the elements for two groups or clusters, according to embodiments of the invention.

FIG. 18 describes a secondary factor correlation calculator or mechanism 1800 to correlate given groups of elements with a second property of the elements for two groups or clusters, according to embodiments of the invention. FIG. 18 shows mechanism 1800 having group 1 of elements at block 1804 and block 2 of elements at 1806 separated or identified from input data 1802. At blocks 1810 through 1812 elements i1 through im are separated or identified for group 1; and at blocks 1814 through 1816 the properties P having value v1 through vm are identified for the elements of blocks 1810 through 1812.

At blocks 1820 through 1822 elements j1 through jn are separated or identified for group 2; and at blocks 1824 through 1826 the properties P having values w1 through wn are identified for the elements j1 through jn.

At block 1830 the distribution of D1 of v1 through vm is calculated across G1 and output at block 1832. At block 1840 the distribution D2 of w1 through wn is calculated across G2 and output to block 1842. At block 1844 the difference of distributions D1 and D2 is calculated by frequency values and converted to a correlation value at block 1846, which is output as correlation value C at block 1848. Mechanism 1800 may include descriptions above with respect to correlation calculator 1720.

Figure 19:
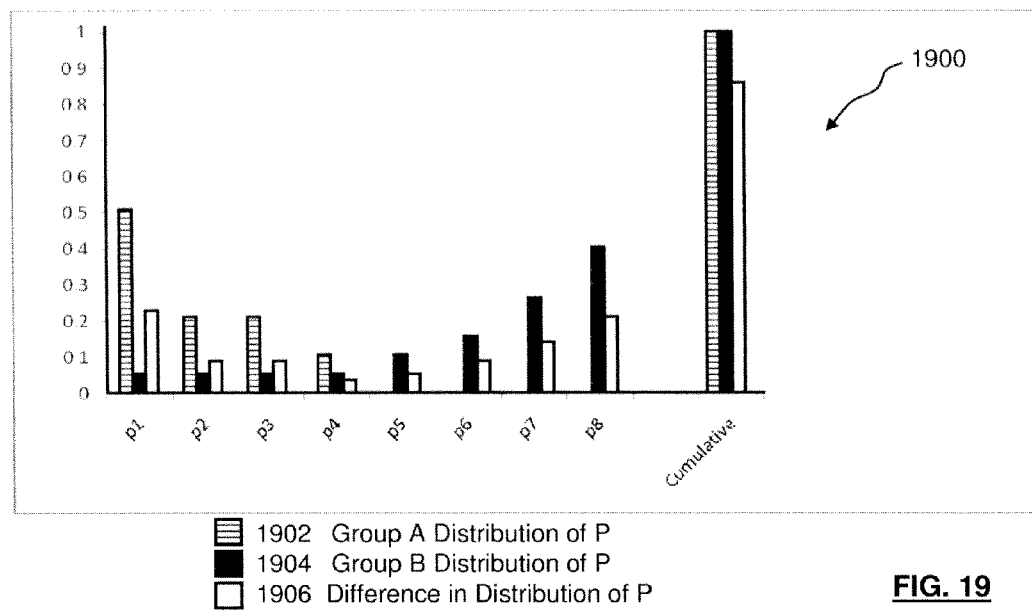
FIG. 19 shows graph illustrating how secondary factor distributions can be compared, according to embodiments of the invention.

According to embodiments, at the center of the Correlation Calculator may be the iteration of calculating the Difference of Distributions D1 and D2 and converting the difference to a correlation value. FIG. 19 shows graph 1900 illustrating how secondary factor distributions can be compared, according to embodiments of the invention. FIG. 19 shows graph 1900 charting properties p1 through p8 and the cumulative aggregate of the properties for group A distribution of P-1902, group B distribution of P-1904, and difference in distributions of P-1906. As can be seen in graph 1900 the distributions of group A are largest at p1 and decrease as p increases. Conversely, the distribution of group B is greatest at p8 and decreases as p decreases. Consequently, the difference in distributions is greatest at p1 and p8 and decreases towards p4.

FIG. 19 shows two density distributions of a property P with values $\{p1, \ldots, p8\}$: The first distribution is for the set "Group A", the second distribution is for the set "Group B". According to embodiments, the difference of the two discrete distributions can be defined as $$C = \sum_{p_i \in P} \frac{|A(p_i) - B(p_i)|}{2}$$

Where
  A: $P \to [0,1]$ is the density distribution of P across Group A and
  B: $P \to [0,1]$ is the density distribution of P across Group B
The factor ½ in the formula guarantees that C is always between 0 and 1.
  Example: 2 Identical Distributions
  A(pi)=B(pi) for all pi→C=0
The correlation of P to the grouping into A and B is 0.
  Example: 2 Completely Distinct Distributions
  For any pi, A(pi)=0 or B(pi)=0. Both can also be equal to 0. Since $$\sum_{p_i \in P} A(p_i) = 1.0$$

and $$\sum_{p_i \in P} B(p_i) = 1.0,$$

Therefore, C=1.0
The correlation of P for the grouping into A and B is 1.0.
Useful Variations According to embodiments, in the case that A-samples and B-samples have many values pi for P, each of low frequency, a high correlation may result without being meaningful. For example, suppose IP addresses for A and B samples are given out randomly from a large pool of IP addresses. Likely A-samples will have many different IP addresses, and B-samples will have many different IP addresses. At the same time, A-samples' IP addresses are likely to be different from B-samples' IP addresses. Clearly in this situation, the fact that A-samples and B-samples share few or no values of IP addresses is not meaningful to support the grouping of samples into A and B.

According to additional embodiments, a modified correlation calculation may be used, such as:

$$C = \sum_{p_i \in P} \frac{1}{2} * |A'(p_i) - B'(p_i)|$$

$$A'(p_i) = \frac{N_A * A(p_i) + \Delta}{N_A + \Delta}$$

$$B'(p_i) = \frac{N_B * B(p_i) + \Delta}{N_B + \Delta}$$

$N_A$ = Number of elements in cluster $A$ $N_B$ = Number of elements in cluster $B$ $\Delta$ = a constant, good value:

$\Delta = 0.5$

Here, instead of comparing P-distributions A(p) and B(p), modified distributions A'(p) and B'(p) are compared. A' and B' are the result of adding noise to the original distributions: An additional $\Delta$ occurrences of each value pi of P are added to both the distribution of P across A and the distribution of P across B. $\Delta$ does not have to be an integer; it can be a real number such as 0.5. Other good numbers for $\Delta$ 0.44, 0.45, 0.46, or 1.0, such as depending on business requirements (e.g., $\Delta$ can be selected from within a range of 0.44 to 1.0). This modification may take care of properties with scattered values, such that these properties don't appear to be supporting a grouping that they don't really support.

Cluster Difference Evaluator

According to embodiments, the Cluster Difference Evaluator may be the piece in the Cluster Comparer that for two given clusters A and B processes one or all of the following obtained evidence:

The number of samples in each A and B

The cluster distance measures between A and B

The supporting evidence for the grouping into A and B by secondary factors

For different embodiments of the invention, the processes to obtain this information may vary greatly. Based on this information, the cluster difference evaluator may decide:

Are clusters A and B part of the same group

Is one or both of the clusters distinct

Is one or both of the clusters an outlier (optionally)

According to embodiments, the Cluster Difference Evaluator makes Boolean decisions based on various thresholds involved that are introduced throughout this section. For example, there may be a lower threshold for cluster distance, below which samples are always considered to be of the same group. This threshold may be called T-min and some embodiments may use T-min=0.35. A value of 0.35 of sample distance may be quite common for 2 typing samples by the same user and thus in this case a cluster distance of 0.35 between two clusters A and B should not lead to A and B being considered created by two different users. However, various other values are considered such as 0.3, 0.4 or 0.5.

In order to be considered a standalone group, a cluster may fulfill requirements to contain a minimum number of samples. This number of samples, S-min, can be a proportion of all samples, it can be a hard minimum, etc. Some embodiments of the invention, successfully use a hard value of S-min=5. This value may ensure that account sharing detection may be not overly sensitive to outlying samples, which may occasionally form small groups. However, various other values are considered such as 3, 4, 6 or 10. In some embodiments, it is possible to use a smaller value, such as 3 when examining data sets with little data per account, but to use a larger value such as 10 to identifying strong groups. In other cases, accounts may be ranked for account sharing using a group size of 10 to put a pattern into the "mature" category. Here, "immature" patterns of 5-9 are ranked lower. It takes two mature patterns, large keystroke differences (distance and ratio) between patterns and support by at least one second factor to achieve top ranking for account sharing.

If one or both clusters are too small to form a standalone group, the Cluster Difference Evaluator may treat them differently depending on their distance: If the cluster distance is larger than distance threshold T-max (a good value for which may be 0.6), then the cluster or clusters which are too small are considered outliers. However, various other values are considered such as 0.5, 0.7 or 0.8. If the cluster distance is smaller than T-max, then the clusters are considered to be part of the same group and they are flagged for merging.

Figure 20:
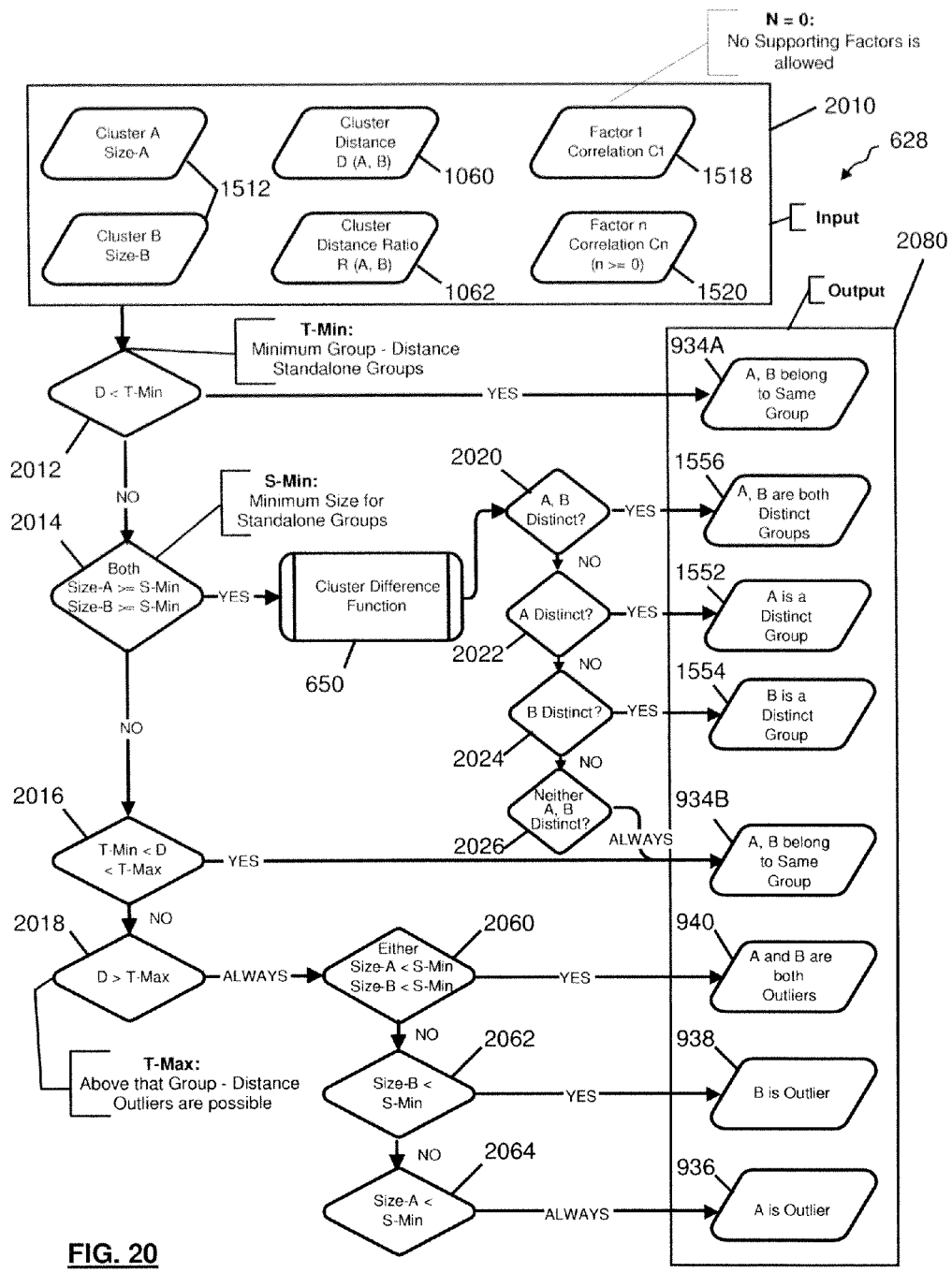
FIG. 20 shows a cluster difference evaluator mechanism, according to embodiments of the invention.

Finally, in some embodiments, if both clusters are large enough to be standalone groups, a further function, the Cluster Difference Function looks at the relationship between the two groups. The Cluster Difference Function determines, whether either the clusters are each a standalone group, or whether the clusters are part of the same group. The Cluster Difference Function may be the workhorse of the Cluster Difference Evaluator; it may be responsible for the main decisions, after borderline cases and outlying cases have been taken care of FIG. 20 shows a cluster difference evaluator mechanism 628, according to embodiments of the invention. FIG. 20 shows mechanism 628 to determine or identify whether clusters A and B are distinct (e.g. separate groups) and/or outliers, considering keystroke timing data and secondary factors of block 2010. Block 2010 includes the size of cluster A and B at block 1512, the cluster distance between A and B at block 1060, the cluster distance ratio of A and B at block 1062, the correlation C1 of secondary factor 1 at block 1518 through the correlation Cn of secondary factor n at block 1520.

At block 2012 it is determined whether the distance is less than a predetermined or selected minimum cluster distance. If it is, A and B are identified as belonging to the same group at block 934A of output block 2080. If not, processing continues to block 2014 where it is determined if the sizes of both A and B are greater than or equal to a predetermined or selected minimum size for stand alone groups. If at block 2014 both sizes are greater than the minimum, processing continues to cluster difference function block 650.

Based on the inputs from block 2010 block 650 provides or identifies whether clusters A and B are distinct, such as by considering cluster distance, cluster distance ratio, and secondary factors. Block 650 may include any one, more than one, or all of blocks 652, 654, 656, and/or 658 such as described for FIG. 6.

After block 650 it is determined at block 2020 whether A and B are both distinct. If so, A and B are identified as distinct groups at block 1556 of output block 2080. If not, processing continues to block 2022, 2024, and 2026 where it is determined whether A is distinct by itself, B is distinct by itself, or neither A nor B are distinct, respectively. As a result of blocks 2022 through 2026 A is identified as a distinct group, B is identified as a distinct group, or A and B are identified as belonging to the same group at blocks 1552, 1554, and 934B, respectively, of output block 2080.

If at block 2014 either size is not greater than the minimum, processing continues to block 2016 where it is determined whether the distance between A and B is greater than or equal to the minimum and less than or equal to a predetermined or selected maximum group distance; if at block 2016 the distance is between the minimum and maximum, A and B are identified as belonging to the same group at block 934b at output block 2080. If at block 2016 the distance is not between the minimum and the maximum, processing continues to block 2018 where it is determined that the distance is greater than the maximum and processing continues to block 2060.

At block 2060 it is determined whether the size of A and B are both less than a predetermined or selected minimum size. If so, A and B are identified as both being outliers at block 940 of output block 2080. If not, processing continues to block 2062 and 2064 where it is determined whether A or B are smaller than a minimum size thus identifying A or B as an outlier at blocks 936 and 938, respectively, of output block 2080. Mechanism 628 may include descriptions above with respect to FIG. 6.

Cluster Difference Functions

The Cluster Difference Function used in the Cluster Difference Evaluator may use all available data on cluster distance and secondary factor correlation, and decide whether two clusters are to be considered part of the same group, or whether one group or the other is distinct. As an aside, the cluster Difference Function may also return the correlation values for each individual secondary factor.

Figure 21:
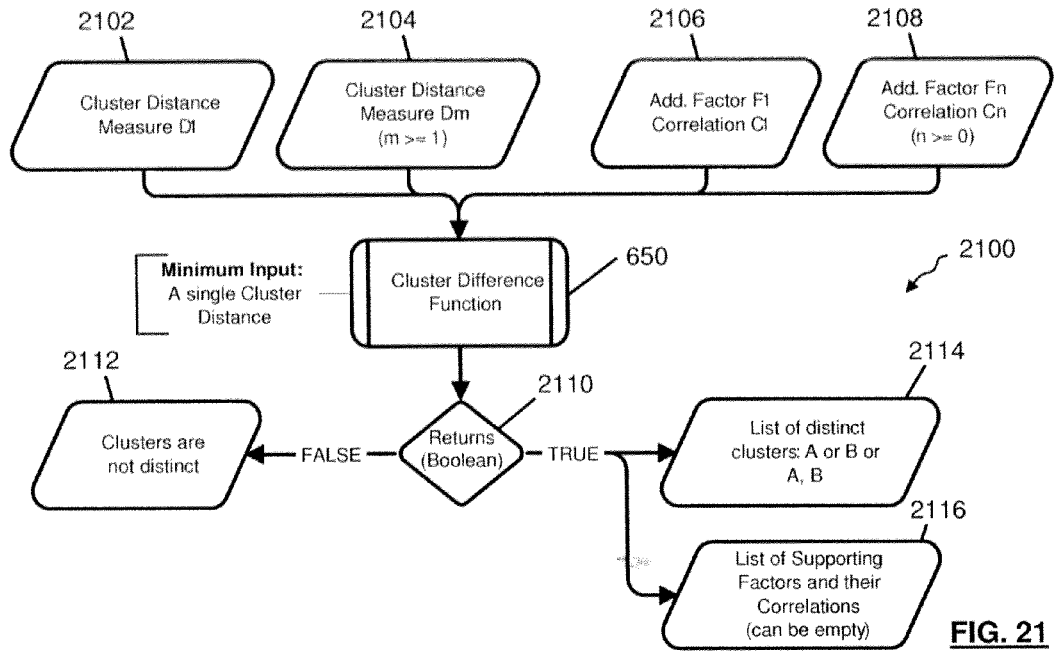
FIG. 21 shows a cluster difference function mechanism that returns the correlation values for each individual factor, according to embodiments of the invention.

FIG. 21 shows a cluster difference function mechanism 2100 that returns the correlation values for each individual secondary factor, according to embodiments of the invention. FIG. 21 shows mechanism 2100 which shows cluster difference function block 650 receiving cluster distance measures D1 through Dm (examples for which may be Cluster Distance or Cluster Distance Ratio) from blocks 2102 through 2104; and receiving correlation C1 of factor F1 through correlation Cn of factor Fn from blocks 2106. Block 650 then determines or identifies by Boolean return 2110 whether the two clusters are distinct based on the cluster distance measures and secondary factors; if the return at block 2110 is false the clusters are identified as not distinct at block 2112. If at block 2110 the return is true the clusters are identified and listed as distinct clusters A or B, or A and B at block 2114; and supporting factors and their correlations are identified or listed at block 2116.

Primarily the Cluster Difference Function returns whether two clusters are separate or not. Additionally and optionally it may return other information, such as:

The information whether and which additional factors support the grouping

For each additional factor the extent to which it supports the grouping (correlation)

If A and B are separate groups, the Cluster Difference Function can return whether either A or B or both are to be considered globally distinct A few remarks about being globally distinct. According to some embodiments, cluster analysis always compares the closest clusters. Thus if two clusters A and B are very distinct, an algorithm can always consider each to be globally distinct. However, in some cases this approach does not work well because: A might be a very tight cluster and B a very loose cluster. Thus, in these cases, if A is very distant from B, it is also very distant from any other cluster. The same is not true for B: Although B is very distant from A, there may be other samples just further distant that still belong to B. Thus, in this case, B is not distinct, and it needs to remain in the cluster processing.

It can therefore make sense for some embodiments of an algorithm to return A as the only distinct group or B as the only distinct group, or A and B both as distinct groups. However, if A is very distant from B, at least one of A and B is always considered distinct. There are many different Cluster Difference Functions that can be used. Examples of important ones are listed below.

A Basic Cluster Difference Function

A very basic Cluster Difference Function of some embodiments uses Cluster Distance as its only distance measures for clusters—no Cluster Distance Ratio or other cluster distance measures, and no secondary factor evidence. Here, clusters are either both considered distinct or neither is considered distinct—here the basic Cluster Difference function does not support the concept of one cluster in a 2-cluster comparison being considered distinct and not the other one.

Figure 22:
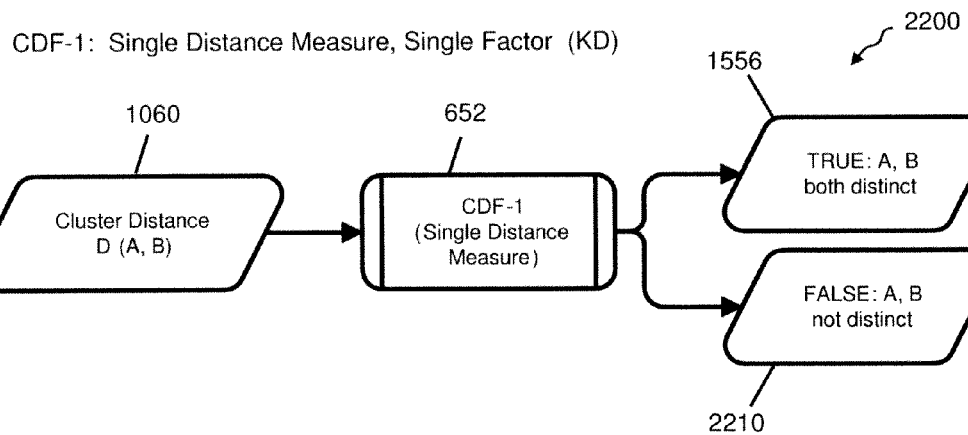
FIG. 22 shows a single distance measure, single factor (KD) mechanism for determining whether clusters are distinct without considering cluster distance ratio, according to embodiments of the invention.

FIG. 22 shows a single distance measure, single factor (KD) mechanism 2200 for determining whether clusters are distinct without considering cluster distance ratio, according to embodiments of the invention. FIG. 22 shows mechanism 2200 including CDF-1 single distance measure block 652 receiving cluster distance between clusters A and B from block 1060. Block 652 determines whether the clusters are distinct, or not, and outputs that they are distinct to block 1556, or that they are not distinct to block 2210, respectively.

A basic Cluster Distance function some embodiments have used $$CDF\ 1:\ D \mapsto \begin{cases} \text{True} & \text{if } D > T - \text{basic} \\ \text{False} & \text{otherwise} \end{cases}$$

T-basic can be a value such as 0.47 or 0.6. However, various other values are considered such as 0.4, 0.45, 0.5, 0.7 or 0.8.

The advantage of this cluster Difference Function may be that it is easily adjustable to customer requirements: If it is important above all else to keep False Positives low, then a high threshold T-basic (e.g., 0.6, 0.7 or 0.8) will only allow the most blatantly different groups to be detected. This use case may be important if account sharing detection is followed by retribution or inconveniences to the customer's user base. A high False Positive rate would cause a lot of irritation among the customer's user base and can be avoided by setting a high threshold T-basic.

If on the other hand a low False Negative rate is important, then a low threshold T-basic such as 0.45 will make sure that accounts with a hint of sharing are recognized. This use case could be important to a customer who wants to provide special support to shared accounts that helps rather than inconveniences the account users. However, various other values are considered such as 0.4 or 0.5.

The disadvantage of this Cluster Difference Function may be that it has no flexibility for different cohesion in clusters. For example, consistent typists may be treated the same as inconsistent typists, leading to errors both in False Positives and in False Negatives. Another disadvantage of this Cluster Difference Function may be that there is no place for secondary factors. Thus there may be no help from secondary factors in the decision making and there is no additional evidence of sharing being collected or evaluated. In cases where more information than just keystroke timings is collected secondary factors should be included to add to a complete picture of a shared account.

A Multi-Measure Cluster Difference Function

Figure 23:
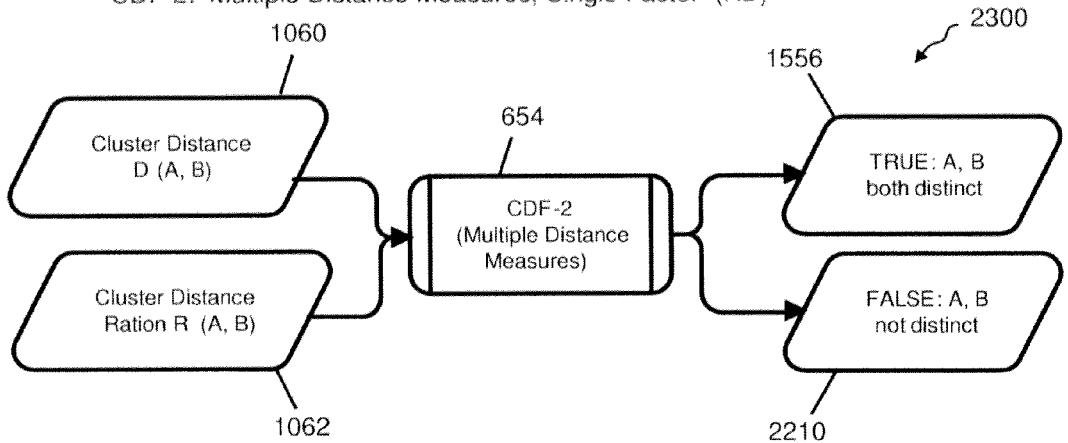
FIG. 23 shows a multiple distance measures, single factor (KD) mechanism for determining whether clusters A and B are distinct, by considering cluster distance and cluster distance ratio, according to embodiments of the invention.

FIG. 23 shows a multiple distance measures, single factor (KD) mechanism 2300 for determining whether clusters A and B are distinct, by considering cluster distance and cluster distance ratio, according to embodiments of the invention. FIG. 23 shows mechanism 2300 including CDF-2 multiple distance measures block 654 receiving cluster distance and cluster distance ration from blocks 1060 and 1062, respectively. Block 654 calculates or identifies whether or not the clusters are distinct and outputs to blocks 1556 and 2210, respectively.

CDF-2 may be improved over CDF-1 in flexibility of recognizing groups of different cohesion. Additionally to Cluster Distance D the Cluster Distance Ratio R is used. While CDF-1 used a hard threshold for D to decide whether two clusters were standalone or not, CDF-2 allows a larger range of possible values D, coupled with a D-dependent threshold for R. For large D, R may only need to pass a very low R-threshold for clusters A and B to be considered distinct. For smaller D, R may need to pass a higher R-threshold.

According to embodiments, this relationship may be expressed in the non-linear map TDI, which for a cluster distance d=D(A, B) determines a lower threshold R-min for cluster ratio r=R(A, B) (e.g., the "biased" ratio described above; the un-biased ratios use a different function TDI).

TDI: d→R-Min

TDI may be defined for d in [0.35, infinity]

(R-Min is a real number >=0)

Note that herein, distance and ratio may be represented by lower-case symbols, at least for d and r. Sets may be represented by capitals, such as A, B, S1, and G1). Properties may be capital (P), but values lower-case (vi, etc).

Figure 24:
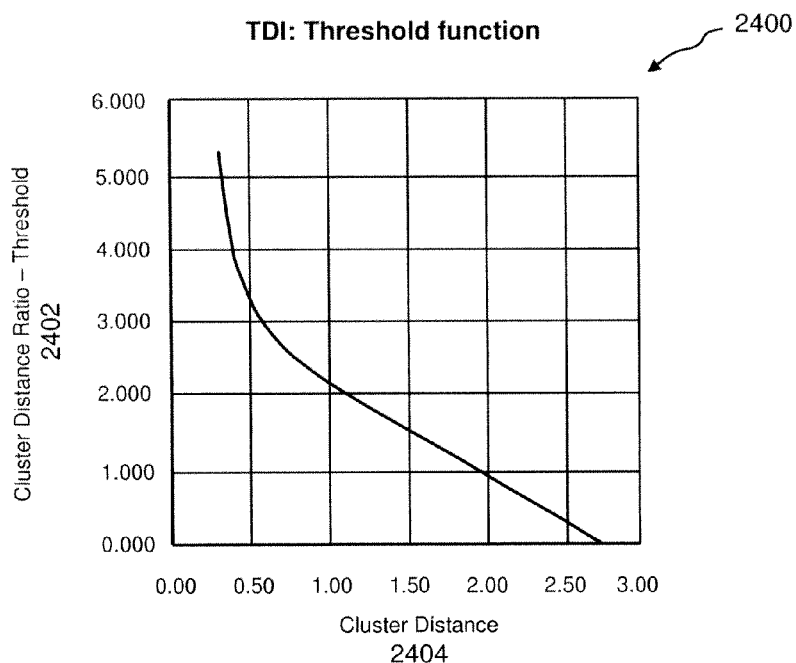
FIG. 24 shows a graph of cluster distance ratio thresholds versus cluster distance, for selecting or predetermining a cluster distance ratio threshold value, according to embodiments of the invention.

FIG. 24 shows a graph 2400 of cluster distance ratio thresholds versus cluster distance, for selecting or predetermining a cluster distance ratio threshold value, according to embodiments of the invention. FIG. 24 shows graph 2400 charting cluster distance ratio threshold 2402 against cluster distance 2404. Consequently, a threshold can be selected or predetermined for comparing to the cluster distance ratio to determine whether the ratio identifies clusters as distinct, or enhances a determination identifying whether clusters are distinct (e.g. by being combined with other considerations such as distance and secondary factors).

It may be useful to define TDI through:
An explicit map for specific points
Linear Interpolation/Extrapolation between or outside these points

| Cluster Distance | Cluster Distance Ratio Threshold |
|---|---|
| 0.35 | 5.250 |
| 0.40 | 4.625 |
| 0.45 | 4.000 |
| 0.50 | 3.625 |
| 0.55 | 3.375 |
| 0.60 | 3.125 |
| 0.80 | 2.600 |
| 1.00 | 2.250 |
| 1.20 | 2.000 |

According to embodiments, if the Cluster Distance Ratio R(A, B) is above the threshold defined by Cluster Distance D(A, B) and threshold function TDI, then clusters A and B are considered distinct. If the cluster ratio of A and B is below the threshold defined by D(A, B) and TDI, then A and B are considered part of the same group.

For example: For very large cluster distances d=D(A, B), such as d=0.8 or d=1.0 only a small cluster distance ratio (r=2.6 or r=2.25 respectively; r=R(A, B)) is required for A and B to be considered distinct. For cluster distances near the critical lower level of 0.45, a larger ratio (r=4.0) is required for two clusters A and B to be considered distinct. However, various other ratio values are considered such as 3, 4, 5 or 6.

Summary of iterations for evaluating the CDF-2 for two clusters A, B:
Evaluate merge distance d=D(A, B)
Evaluate merge distance ration r=R(A, B)
Evaluate R-Min=TDI(d)
Is r>=R-Min: Then groups are distinct
Is r<R-Min: The groups are not distinct A Multi-Measure, Multi-Factor Cluster Difference Function According to embodiments, CDF-3 is a more advanced Cluster Difference Function than CDF-1 or CDF-2 because it combines multiple Cluster Distance Measures (such as Cluster Distance and Cluster Distance Ratio) with secondary factors. Secondary factors can be factors such as IP Address, machine identification and geographic information, for example.

In some cases, as compared to CDF-1 or CDF-2, CDF-3 may have a lowest threshold T-min for D(A, B) (T-min=0.35 has been proven useful), below which two clusters A and B are always considered part of the same group. However, for CDF-3, various other values are considered such as 0.25, 0.3 or 0.4. For embodiments of CDF-3, for each of the supported secondary Factors Fi the correlation Ci of Fi's distributions and the grouping (A, B) is calculated. A factor Fi, whose corresponding correlation Ci is larger than some minimum correlation Ci-min may be considered a supporting factor. The minimum correlation Ci-min can be factor-specific. For some embodiments of the invention a hard threshold of C-min=0.65 works well for all factors used. However, various other values are considered such as 0.6, 0.7, or 0.8.

For some embodiments, CDF-3 may have a second lower threshold T-1 for D(A, B) (T-1=0.45), below which two clusters A and B can only be called distinct based on a primary factor process. However, various other values are considered for T-1 such as 0.4 or 0.5. In this case secondary factors can be evaluated (e.g., included in identifying) to complete the sharing picture for groupings or reports, but they may not influence the decision. The reason for using T-1 is, that below a small cluster distance such as 0.4 or 0.45 clusters are truly very similar, and that secondary factors may only provide weak support for increasing confidence in the grouping of such similar clusters. To keep False Positives low, this second distance threshold may be used.

For some embodiments, when D(A, B) is above the second lower threshold T-1, two clusters A and B can be called distinct based either on the primary factor process resulting in a "strong pattern" difference, or based on a primary+secondary factor process, resulting in an "emerging pattern" difference.

Details of a group comparison, such as "strong" vs. "emerging" pattern, or the type and degree of secondary factor support, may be useful for reporting. A reporting tool separate from the actual account sharing detector can be used to gather all evidence gained throughout the analysis and report it in a preferred manner.

According to some embodiments, account share detection results (e.g., data from clustering, in addition to identifying an account as "shared/not shared") can be analyzed and/or reported to identify: profiling, type of sharing (at least by volume, volume by pattern, number of patterns, etc), number of patterns, which logins belong to which pattern, what does each pattern look like (common traits: devices used, IP addresses, etc), a measure of relative confidence in the sharing result, and/or a ranking of all accounts suspected of sharing. In some cases, these are results provided by the engine to and displayed by an accounts administration console.

Figure 25:
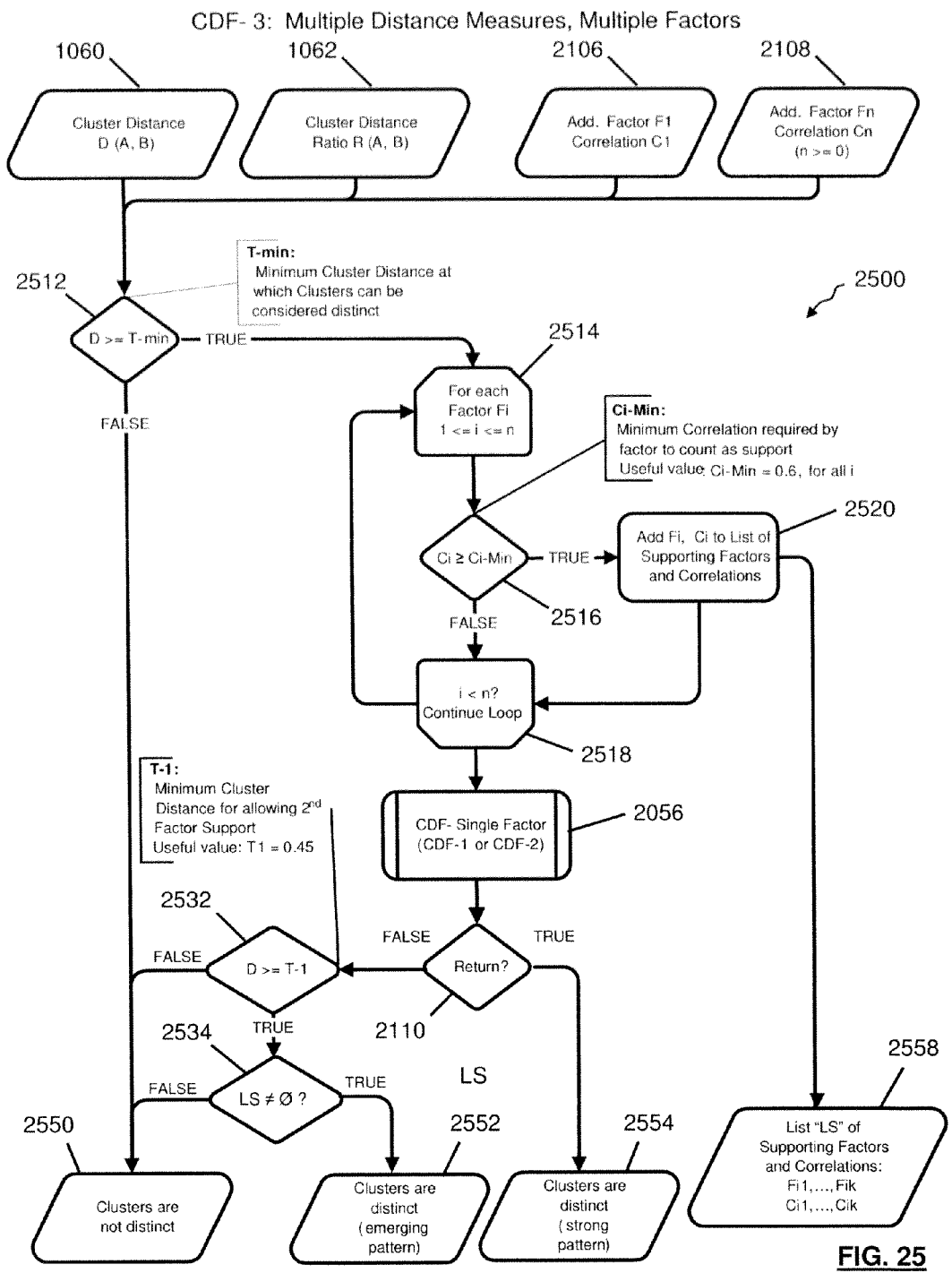
FIG. 25 shows a multiple distance measures, multiple factor (KD and secondary factors) mechanism for determining whether clusters A and B are distinct, by considering cluster distance, cluster distance ratio, and secondary factors, according to embodiments of the invention.

FIG. 25 shows a multiple distance measures, multiple factor (KD and secondary factors) mechanism 2500 for determining whether clusters A and B are distinct, by considering cluster distance, cluster distance ratio, and secondary factors, according to embodiments of the invention. FIG. 25 shows mechanism 2500 having CDF-Single Factor (CDF-1 or CDF-2) block 2056; and input blocks 1060, 1062, 2106, and 2108. At block 2512 if the distance is greater than a predetermined threshold minimum, processing continues to block 2514. If not, processing continues to block 2550 where it is determined that the clusters are not distinct.

At block 2514, 2516, and 2518 it is determined whether the correlation between the clusters is greater than or equal to a predetermined minimum threshold (e.g. see block 2516) for each secondary factor F1 through Fn. For each correlation that is greater than or equal to the minimum, the factor and correlation are added to a list of supporting factors and correlations at block 2520 and stored at block 2558.

After blocks 2514 through 2520 are performed for each secondary factor, processing continues to block 2056 where it is determined whether the clusters satisfy a single distance measure (e.g. based on distance) or a multiple distance measure (e.g. based on distance and distance ratio). Block 2056 may include descriptions above for mechanism 2200, block 652, mechanism 2300, and/or block 654. For example, at block 2056 either CDF-1 or CDF-2 measures, described for mechanism 2200 or 2300, respectively, are used to determine whether the clusters are distinct. In some cases, CDF-1 or CDF-2 only use measures such as distance and ratio, both based only on primary factors, in their decision making (e.g., in their process to identify groups). Here, neither CDF-1 nor CDF-2 makes use of secondary factors.

If at block 2110 the clusters are identified as distinct based on distance, or distance and distance ratio, processing continues to block 2554 where the clusters are identified as distinct in a strong pattern. In some cases, although the identification of strong patterns does not use second factors in its decision making, evidence on supporting second factors is gathered in block 2558. If at block 2110 the clusters are not identified as distinct, then strong patterns are considered not to be present and processing continues by evaluating the clusters for emerging patterns: and processing continues to block 2532 where it is determined whether the distance between the clusters is greater than or equal to a second threshold allowing for secondary factor support. Block 2532 shows the second threshold is equal to 0.45, however, various other values are considered such as 0.4 or 0.5. If at block 2532 the distance is smaller than the second threshold, emerging KD pattern will not be considered and the clusters are identified as not distinct. If on the other hand at block 2532 the distance is greater than the second threshold processing continues to block 2534 where it is determined if the list of secondary factors (LS) at block 2558 is non-empty, in other words, includes at least one secondary factor that had correlation Ci greater than or equal to the minimum at block 2516. If LS is non-empty processing continues to block 2552 where the clusters are identified as distinct in an emerging pattern.

According to embodiments, emerging patterns may differ from strong patterns in two ways: Emerging pattern measures (distance and ratio) based on primary factor evidence may not satisfy the stricter limits required of strong patterns. Thus, in some cases, the identification of an emerging pattern may always require the support by second factor evidence, while strong patterns may or may not be supported by second factor evidence. Here, a pattern identified as emerging may thus always imply second factor support.

If in block 2534 LS is empty, then no secondary factor supports the patterns; and processing continues to block 2550 where the clusters are identified as not being distinct. Mechanism 2500, such as blocks 2512 through 2558 may include descriptions above with respect to mechanism 600, mechanism 900, mechanism 2500, mechanism 2200, mechanism 2300, block 652, block 654, block 656, and/or block 658.

A Multi-Measure, Multi-Ratio, Multi-Factor Cluster Difference Function

Another advanced process of cluster difference functions is CDF-4, which may specifically take advantage of improvements in ratio calculation, but can stand alone, too. In an "additional embodiment" (e.g., CDF-4) of the invention, CDF-4 uses as input the two un-biased ratios RA=r'(A, A U B) and RB=r'(B, A U B) as described in [00181]. It also uses the usual cluster distance and supporting factor correlation data (e.g., described herein).

For some additional embodiments, CDF-4 decides or determines how to handle multiple ratios as follows. If the larger of the ratios indicates a distinction, then the groups are separate from each other. If both ratios indicate a distinction, then both groups are considered distinct, otherwise only the group whose associated ratio is the larger is considered distinct. A non-distinct group of two separate groups continues to be processed further.

Also, for some additional embodiments, since CDF-4 specifically uses the two unbiased ratios, the use of internals (CDF-3, etc.) is also different as compared to what it was for "some embodiments" (e.g., CDF-2 or 3). For instance, CDF-3 remains as described herein; however CDF-3 uses CDF-2, and the details of CDF-2 are different for these "additional embodiments" as compared to what they were for some embodiments.

CDF-2 compares two clusters based only on a distance and a ratio value, and in some additional embodiments, the threshold distance indicator for the un-biased ratios and for the use in CDF-4 can be a simple linear function (e.g., determined through experiments):

TDI: d→r-threshold $R\text{-threshold}(d) = -1.0 * d + 2.65$

Where d is the cluster distance based on KD-Distance.
A ratio (RA or RB) greater than the r-threshold indicates that the cluster (A or B respectively) being compared to the merged clusters (A U B) is globally distinct.

Figure 26:
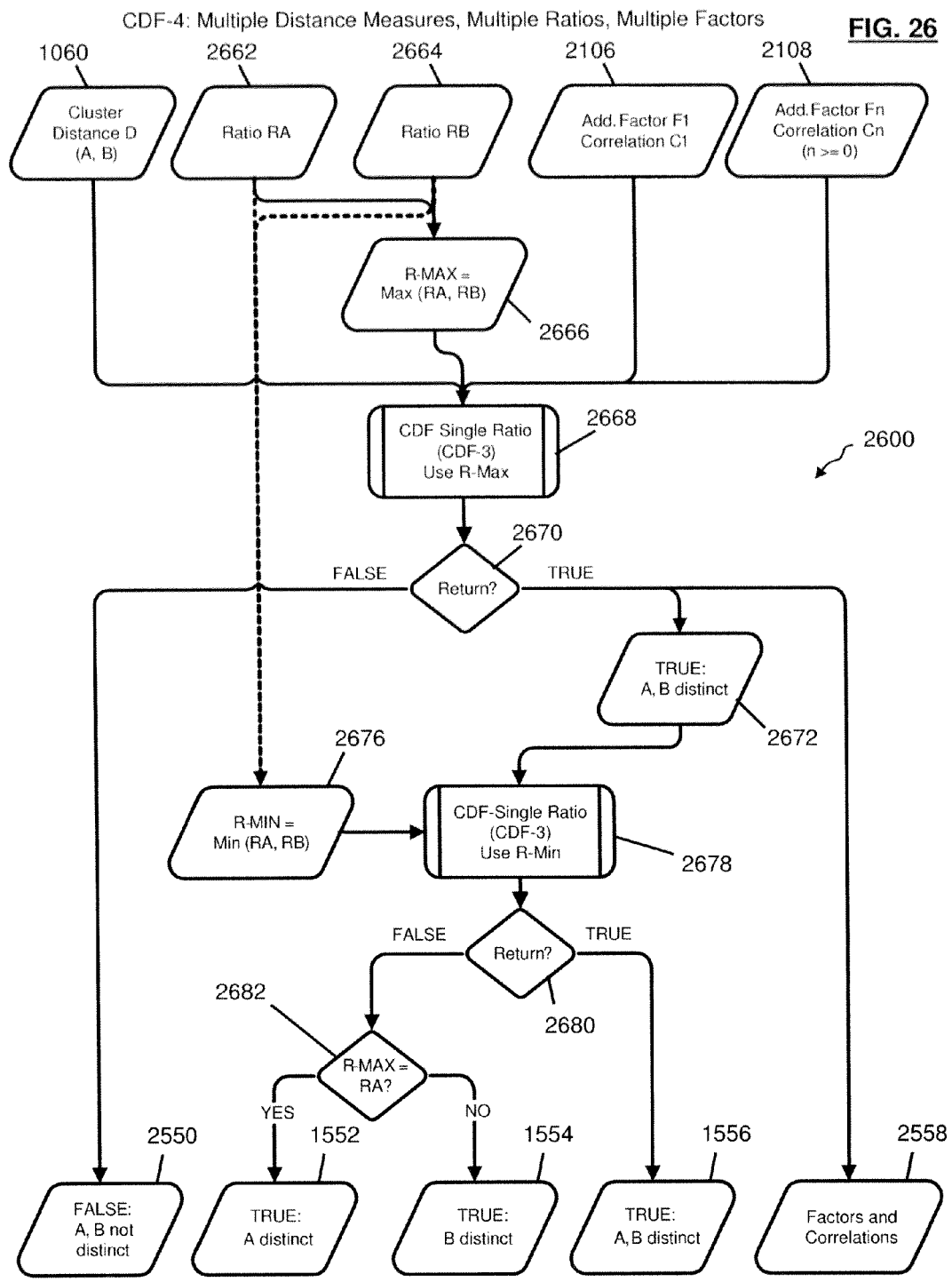
FIG. 26 shows multiple distance measures, multiple ratios, multiple factors, mechanism for determining whether two clusters are distinct based on cluster distance, distance ratio of each cluster, and secondary factors, according to embodiments of the invention.

FIG. 26 shows multiple distance measures, multiple ratios, multiple factors, mechanism 2600 for determining whether two clusters are distinct based on cluster distance, distance ratio of each cluster, and secondary factors. FIG. 26 shows mechanism 2600 having as input cluster distance at block 1060, ratio RA of cluster A at block 2662, ratio RB of cluster B at block 2664, correlation C1 of factor F1 at block 2106 through correlation Cn at factor Fn at block 2108. At block 2666 it is identified whether ratio RA or RB is the larger of the ratios, and is thus identified as R-MAX. At block 2668 it is determined or identified whether either or both of the ratios indicate a distinction of the groups or are equal to or greater than a ratio threshold maximum to indicate that A and B are distinct. For example, at block 2668 R-MAX may be used in mechanism 2500 (e.g. together with distance D(A,B) and second factor correlations and compared to ratio maximum thresholds selected or predetermined, such as using blocks 2512 through 2558) to determine whether the clusters are distinct. Some additional embodiments include using R-MAX of FIG. 26 to replace the un-biased ratio R(A,B) of FIG. 25. For instance, block 2668 may determine whether the groups are separate based on either or both of the ratios RA and RB together with evidence from distance D(A,B) and second factor correlations. At block 2670 if the groups are not determined to be distinct based on the ratios and additional evidence, processing continues to block 2550 where they are identified as not distinct. If at block 2670 they are identified as distinct processing continues to block 2672 where they are identified as distinct and 2558 where the list LS of supporting factors and correlations is output (e.g. and stored).

At block 2676 it is determined which of the ratios RA and RB is the smaller ratio, and thus identified as R-MIN. At block 2678, it is determined whether the groups are distinct by considering or based on the output of block 2676 and 2672. For example, block 2678 may include performing mechanism 2500 based on the minimum ratio from block 2676 and the information that the groups have been found distinct based on block 2672 (such as by performing block 2512 through 2554) to determine whether the groups are distinct. If the groups are distinct at block 2680, processing continues to block 1556 where the groups are identified as distinct. If at block 2680 the groups are not identified as distinct, processing continues to block 2682 where it is determined whether the maximum ratio is RA or RB. If the maximum is RA, processing continues to block 1552 where A is identified as distinct, if not processing continues to block 1554 where B is identified as distinct. Mechanism 2600 may include descriptions above with respect to mechanism 600, mechanism 900, mechanism 2500, mechanism 2200, mechanism 2300, block 652, block 654, block 656, and/or block 658.

Summary of Some of the Embodiments

There are many processing elements and concepts involved in account sharing detection. Here is a short summary of some of the embodiments of the invention, putting all the pieces together.

"Some Embodiments" (e.g., CDF-2 or 3)

Some embodiments of account sharing detection engine uses keystroke dynamics as primary factor and as secondary factors uses machine identifier, IP address and geographic location derived from IP address via $3^{rd}$ party geographic lookup. The data may be obtained on login and saved in a database for further processing. Data analysis may be via a scheduled job; results are again saved in a database. On demand database queries can report on the results found in account sharing detection. Data analysis groups samples using the Sample Grouping Algorithm described above. The Cluster Comparer can be quite diverse for different embodiments, so here is a summary of the important points of example embodiments:

Cluster Distance measures used are:
Cluster Distance as described, and based on KD-Distance between 2 samples
Cluster Distance Ratio R(A, B) as described in Definition 1 of 'Ratio' (see Calculator of Cluster Difference Measures)
Calculator of Second Factor Correlation is as described. The Cluster Difference Evaluator uses Cluster Difference Function CDF-3. CDF-3 uses CDF-2, which in turn uses the TDI-function outlined in CDF-2. The remaining settings and boundary conditions of the Cluster Difference Evaluator (minimum cluster size, etc) are as described.

Some "Additional Embodiments" (e.g., CDF-4)

Additional Embodiments may include an approach to avoid biased processing.

Recall that biased processing arose with the introduction of Cluster Distance Ratio R(A,B). To remove this bias, instead of R, two ratios may be used, RA and RB, based on two clusters A and B respectively as they are compared. These ratios are defined in Definition 2 of 'Ratio' (see Calculator of Cluster Difference Measures)

Additional embodiments may be identical to some embodiments mentioned on the high level, but have differences in the Cluster Comparer:

Cluster Distance measures used are:
Cluster Distance as described, and based on KD-Distance between 2 samples (same as in "Some embodiments")
Unbiased Cluster Distance Ratios
RA(A, B): A-based distance ratio
RB(A, B): B-based distance ratio Calculator of second factor Correlation remains as described (same as in some embodiments). The Cluster Difference Evaluator uses Cluster Difference Function CDF-4 (instead of CDF-3 as in some embodiments). Both CDF-4 in additional embodiments and CDF-3 in some embodiments use CDF-2, but additional embodiments use a different TDI function within CDF-2. The TDI function for additional embodiments is described in CDF-4 under additional embodiments.

Software, Computers, and Related Hardware of Embodiments

Figure 27:
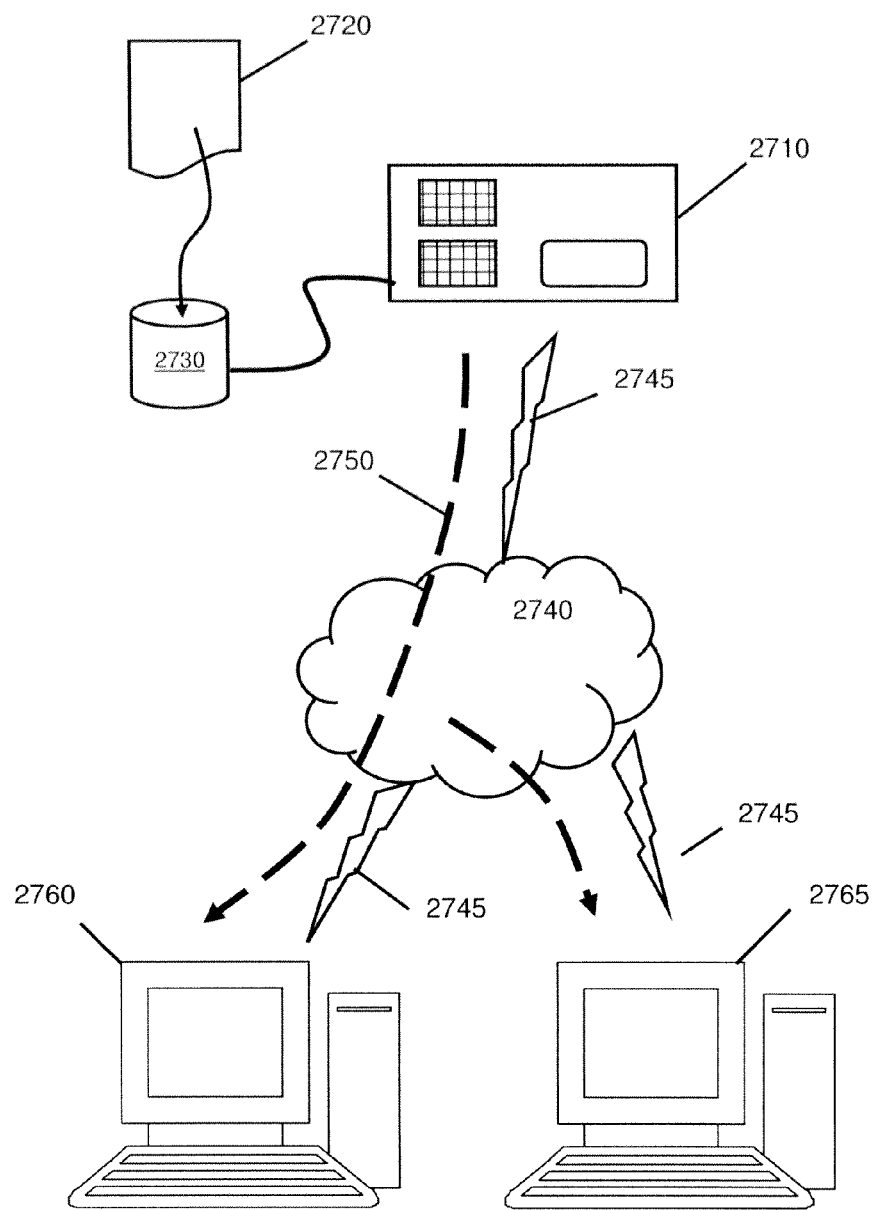
FIG. 27 shows computer systems coupled by a data network, according to embodiments of the invention.

FIG. 27 shows computer systems coupled by a data network, according to embodiments of the invention. Computer system 2710 (e.g., a computer server) has a group of instructions and data (shown as document 2720), which may be stored on a mass storage device 2730. These instructions and data are to cause a programmable processor to implement a process or method according to an embodiment of the invention. System 2710 is connected to a distributed data network 2740 such as the Internet, an intranet, a LAN, a GAN, etc. Systems 2760 and 2765, also connected to the distributed data network 2740, may request services or access to resources (e.g., based on a purchased license the user provides a username and password for authorized access) from or through system 2710 (e.g., by having their access accepted or rejected by system 2710) via electronic means, such as the distributed data network 2740. It is considered that other systems, may be connected to the distributed data network 2740, to request services or access to resources from or through system 2710 via electronic means, such as the distributed data network 2740. These other systems may include one or more computer devices, computing systems, laptop computers, portable computers, hand held computer systems, cellular phones, client computers, server computers, and the like.

Some embodiments include transmitting or generating a plurality of data samples from or at least one computer having at least one keyboard of one keyboard type (e.g., systems 2760 and 2765). Each data sample may include: (1) feature set data (e.g., keyboard input timing factors input or typed at the computers) of the same character string (e.g., the same one or more character string(s), such as where username and password provide 2 character strings) input on each of the at least one keyboards by at least one user. In response to transmitting or generating the samples, a determination or identification is made (e.g., by a computer receiving the transmitted or generated samples) as to of whether the data samples are from more than one user based on distance data calculated between data point pairs of feature set data of each pair of samples, and based on ratios calculated for distances between the data point pairs of the feature set data in each of two clusters of the data point pairs. In some embodiments, each data sample includes (2) at least one secondary factor from each of the at least one computers and related to the keyboard input timing factors, and the authentication is also based on the secondary factor (e.g., also received by the computer making the determination/identification).

According to some embodiments, the determination or identification may be delayed with respect to the computer (e.g., a server system) receiving the samples, and performed at the system's leisure, such as by a nightly job. The results may be reported through by-hand or through automated processing, which changes the account's administrative policies and/or settings, such as by changing the way the system provides access to the account. Such access changes could include a forced password change, a tighter security policy (e.g., by requiring the user accessing the account to provide a token additionally to credentials), and/or temporary or permanent disablement of the account (the account is locked out, not the last user accessing the account). Alternatively, a warning may be issued to the account owner and changes to the account policy could be delayed and might depend on whether the account continues to be shared after the warning. According to some embodiments, all these changes may happen on the server, (account databases, account settings, account and group policies) while the client is affected in the way that still allows him to access the system.

According to some embodiments, determining or identifying may not be delayed, and in addition to the changes above, the computer or user of the computer where the final or last sample is transmitted or generated receives an authentication acceptance or rejection of the samples based on a determination of whether the data samples are from more than one user.

Document 2720, may be an embodiment of the invention that satisfies the description "a computer-readable medium storing data and instructions to cause a programmable processor to perform operations" as described herein. If system 2710 executes those instructions, it may perform a method according to the invention.

Figure 28:
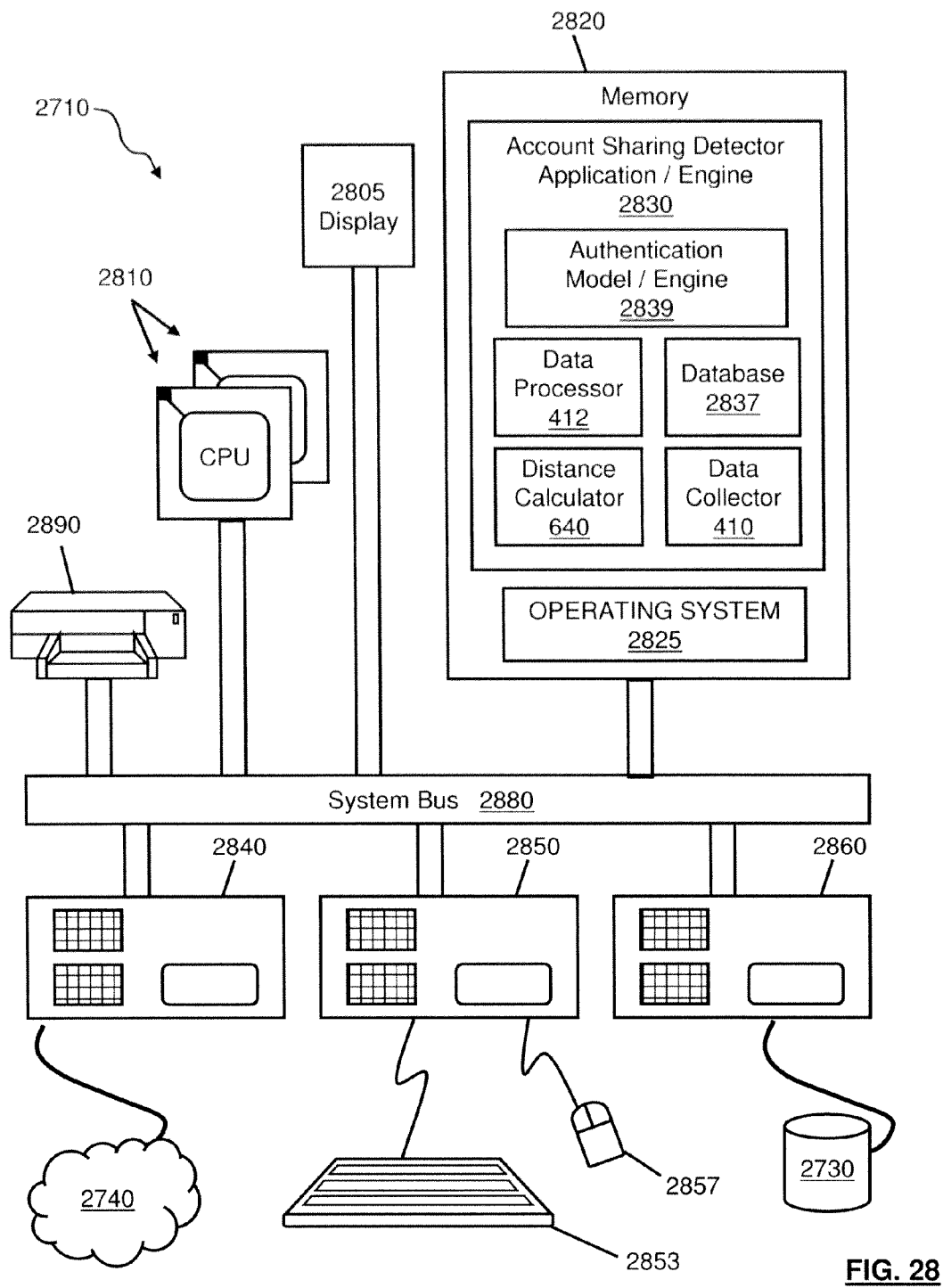
FIG. 28 shows a computer system, according to embodiments of the invention.

FIG. 28 shows a computer system, according to embodiments of the invention. FIG. 28 shows some components and subsystems of a computer system 2710 that implements an embodiment of the invention. Central processing units (CPUs) 2810 are programmable processors that execute according to instructions and data in memory 2820 to perform the mechanisms described herein. Memory 2820 may include portions containing data and instructions to implement an operating system ("OS") 2825 and account sharing detection application or engine 2830 incorporating an embodiment of the invention.

Share detect engine or application 2830 may include one or more different mechanisms described herein, such as mechanisms 100 and 101; 400; 500; 600, etc. As shown, application or engine 2830 includes a number of different specialized modules, such as data collector 410 (e.g., to perform mechanism 100), database 2837, authentication model or engine 2839, and data processor 412 (e.g., to perform mechanism 101). These modules may store, calculate, group, identify, etc. samples, key events, factors, features, distances, distance ratios, secondary factors, clusters, cluster analysis data, and the like, to perform mechanisms described herein based on samples received from network communication input/output 2640 from data network 2740 (e.g., received from other systems as noted for FIG. 27). Input/output 2640 may include a network adapter to support communications with other systems via distributed data network 2740. Another interface adapter 2650 may facilitate coupling the system to user interface devices such as display 2805, printer 2890, keyboard 2653 and mouse 2657. In many systems, user interface devices are connected to a built-in controller, rather than to a "plug in" expansion card.

Mass storage interface 2860 permits the system to store data on mass storage device 2730, such as a hard disk. Thus, for example, data from data collector 410, database 2837, authentication model or engine 2839, and data processor 412 may be stored on device 2730 during or after calculating, identifying, or reporting, such as for user during subsequent calculating, identifying, or reporting. These and other components and subsystems of the computer system are connected to, and exchange data and control signals via, a system bus 2880.

As noted above, services or access to resources may be requested from or through system 2710, by system 2720 receiving data samples from at least one of the systems (e.g., 2760 and 2765 and/or other systems) having at least one keyboard of one keyboard type (receipt of this transmission is shown by bolts 2745 received at or by a network communication input device). Each data sample may include: (1) keyboard input timing factors (e.g., created by input of key events, dwell feature, flight feature, other features, key stroke dynamics) of the same at least one character string input on the at least one keyboard by at least one user, and (2) at least one secondary factor (e.g., different than or other than the timing factors or string characters) from each of the at least one computers and related to the keyboard input timing factors of each data sample. A network communication input device of network communication input/output 2640 may receive the request from data network 2740. Each request may include one or more data samples from a user. Database 2837 may store such received data samples.

System 2710 (e.g., using authentication engine 2839 and/or share detect engine 2830) may determine whether the data samples are from more than one user based on the keyboard input timing factors and based on the secondary factors. To do this, system 2710 may use mechanisms and/or processes described herein.

In some embodiments, in response to or after determining whether the user or users are sharing accounts, system 2710 may send an acceptance or rejection signal (or report) to a display, printer, audio alarm, and/or system 2760 via network 2740, such as to identify or report whether the request (e.g., sample) is accepted or rejected (this transmission is shown by dashed arrow 2750). In some cases, after the determination, display 2805 and/or printer 2890 may display a warning or identifying that the samples are from more than one user. Also, after the determination, display 2805, a network communication output device of network communication input/output 2640, and/or printer 2890 may report whether samples are accepted or rejected (e.g., to the other computers as shown by dashed arrow 2750). Based on the report, the way the system provides access to the account may be changed (optionally, the other computers' request for access is accepted or rejected).

In some embodiments, share detect engine 2830 includes authentication model or engine 2839 to: identify and discard outlier data point pairs of the feature set data of each pair of samples; calculate distance data between each non-discarded data point pair of the feature set data of each pair of samples; identify the existence of at least one first cluster of the feature set data by comparing the distance data to a distance threshold; calculate ratios of combinations of distances between each data point pair of the feature set data in each of the at least one first cluster; and identify the existence of at least one second cluster of the feature set data by comparing the ratio data to a ratio threshold. This process may be repeated to identify one or more of the second clusters, each indicating or evidencing a different user's input to attempt to access the single account. For some embodiments, authentication engine 2839 may accept or reject the samples based on the keyboard input timing factors and based on the secondary factors.

Share detect engine 2830 may also have a distance calculator 640 for comparing two timing samples S1 and S2, as describe herein. The distance calculator may compare each or every two timing samples S1 and S2 for one account. In some case this comparing includes selecting multiple feature types from timing samples S1 and S2 and extracting associated features of S1 and S2 for the selected feature types by, for each sample, extracting multiple feature-point sets: $FS1\text{-}1, \ldots FSn\text{-}1$ for sample S1 and $FS1\text{-}2, \ldots, FSn\text{-}2$ for sample S2; wherein, each set $FSi\text{-}k$ ($i=1, \ldots n; k=1, 2$) is homogeneous and consists of feature values of only one feature type, each set $FSi\text{-}k$ ($k=1, 2$)=$\{f1, \ldots\}$ consists of feature values of the timing sample Sk ($k=1, 2$), the elements of each set $FSi\text{-}1$ correspond 1-1 to the elements of set $FSi\text{-}2$, there is no requirement for the $FSi\text{-}k$ to be disjoint and a feature point of S1 is used in more than one set $FSi\text{-}1$ and in parallel a feature point of S2 is then used in more than one set $FSi\text{-}2$); and there is no requirement for the $FSi\text{-}k$ to be complete. Then, using a method of outlier tolerance for each pair of feature subsets $FSi\text{-}1$ of Sample S1 and $FSi\text{-}2$ of Sample S2, it is possible to select a subset $FSi\text{-}1'$ and $FSi\text{-}2'$, where elements in $FSi\text{-}1'$ and $FSi\text{-}2'$ match 1-1. $FSi\text{-}1'$ and $FSi\text{-}2'$ may then be selected based on the smallest distances of 2 matching elements in $FSi\text{-}1$ and $FSi\text{-}2$. The sizes of $FSi\text{-}1'$ and $FSi\text{-}2'$ and how many elements to eliminate, may then be selected based on the characteristics of feature point sets of type $FSi\text{-}x$. An individual distance measure may then be used for each $FSi\text{-}x, i=1, \ldots, n$, based on characteristics of feature point sets of type $FSi\text{-}x$. One distance value may be then calculated for each pair ($FSi\text{-}1', FSi\text{-}2'$); and all distance values obtained from pairs ($FSi\text{-}1', FSi\text{-}2'$), $i=1, \ldots n$ may then be combined into one single value.

Unless specifically stated otherwise as apparent from the preceding discussion, it is appreciated that throughout the description, discussions utilizing terms such as "identifying" or "computing" or "calculating" or "discarding" or "determining" or "clustering" or the like, may refer to the action and processes of a computer system or similar electronic computing device, that manipulates and transforms data represented as physical (electronic) quantities within the computer system's registers and memories into other data similarly represented as physical quantities within the computer system memories (e.g., including non-volatile memory) or registers or other such information storage, transmission or display devices.

The present invention also relates to apparatus (e.g., a computer, such as a computer server) for performing the data collecting, storing, determining, and/or identifying mechanisms (e.g., operations or processes) herein, such as to detect account sharing based on samples received from various computers having one type of keyboard. This apparatus may include circuitry specially constructed for the required purposes, and/or it may comprise a special (or general) purpose computer selectively activated or specially configured by a computer program stored in the computer. Such a computer program (e.g., program instructions) may be stored in a computer readable (e.g., non-volatile) storage medium, such as, but not limited to, any type of disk including floppy disks, optical disks, compact disc read-only memory ("CD-ROM"), and magnetic-optical disks, read-only memories ("ROMs"), erasable programmable read-only memories ("EPROMs"), electrically-erasable read-only memories ("EEPROMs"), flash memories, magnetic or optical cards, or any type of media suitable for storing electronic instructions. Such a computer may also include a processor coupled to the storage medium to execute the stored instructions. The processor may also be coupled to a volatile memory (e.g., RAM) into which the instructions are loaded from the storage memory (e.g., non-volatile memory) during execution by the processor. The processor and memory(s) may be coupled to receive samples from various computers having one type of keyboard, such as to perform one or more of the mechanisms noted above for FIGS. 1-26. Use of and/or operations performed by the mechanisms may be described as a machine implemented means or method.

In some cases, the mechanisms or operations described herein (such as to perform one or more of FIGS. 1-28) may be embodied in a machine-readable medium (e.g., non-volatile memory) having stored thereon data and instructions to cause a programmable processor to perform those operations. In other embodiments, the operations might be performed by specific hardware components of a specialized computer (e.g., a Server), that contains specialized hardwired logic. Those operations might alternatively be performed by any combination of programmed computer components and custom hardware components.

The algorithms, mechanisms, data, tables, math and figures presented herein are not inherently related to any particular computer or other apparatus. Various general or special purpose systems may be used with programs in accordance with the teachings herein, or it may prove convenient to construct more specialized apparatus to perform the required mechanism or processes. The required structure for a variety of these systems will appear from the description below. In addition, the present invention is not described with reference to any particular programming language. It will be appreciated that a variety of programming languages may be used to implement the teachings of the invention as described herein.

Additional Keystroke Dynamic Features and Their Use

For each time a key is pressed or released, a record may be produced identifying the key, the action and the time at which the action occurred. This may be the only "real" or physical data collected in many embodiments. Special keyboards that can sense typing pressure, finger temperature, or the like, may produce more real data, but such keyboards are uncommon, and an embodiment gives up broader applicability if it relies on such enhanced data.

Times may be given as real ("wall-clock") time (with the resolution and accuracy of a clock available to the system) or as a time relative to a known event such as the most recent system restart. Neither of these times is directly useful for analyzing keystroke dynamics of a user typing a phrase, so an embodiment of the invention computes a first set of derived data based on the collected raw timings.

Instead of, or in addition to dwell and flight times, several other possible time periods can be computed from raw keystroke timing data and used by an embodiment. For example, the key-press-to-subsequent-key-press time, or key-release-to-subsequent-key-release time also permit the events that occurred during the typing of the phrase to be represented in a useful way. Some embodiments may compute key press and release times relative to the key press event that starts the entry of the phrase, or the key press (or release) event that ends entry of the phrase. Also, various derived values can be computed trivially by subtraction.

It is also possible to calculate various first, second, etc. order "derivative" values for timings. Such derived measurements include the rate of change of key dwell or flight during the entry of the phrase. These derived measurements are called the "dwell tendency" and "flight tendency." Dwell tendency may indicate whether the user is holding keys for longer or shorter periods as the phrase entry proceeds. Thus, a negative dwell tendency means that the user's keypresses are becoming shorter, while a positive dwell tendency means that the user's keypresses are becoming longer. These correspond roughly to faster and slower typing, respectively.

Higher-order derivatives may also contain useful information, but eventually, the repeated derivation process will produce a result that is uniformly zero. In some cases, useful information can be obtained from second- and third-order derivatives of the keystroke timing data.

Other derived values that have been considered for embodiments of the invention are shown in the following table.

| Derived Data | Definition | Data Points |
|---|---|---|
| Dwell-Total | Sum of dwell times | 1 |
| Derived Data | Definition | Data Points |
| Dwell Mean | Average dwell time | 1 |
| Dwell Root Product | $n^{th}$ root of (product of all n dwells) | 1 |
| Dwell {d1, d2} | A vector of two consecutive dwells (Uses Euclidean distance to calculate distinguishing power) | N-2 |
| Dwell d1 + d2 + d3 | Dwell sums by threes | N-3 |
| Dwell d1 + d2 | Dwell pair sums | N-2 |
| Flight Min | Minimum flight time | 1 |
| Dwell Max | Maximum dwell time | 1 |
| $\sqrt{Dwell}$ | Square root of dwell time | N |
| Dwell | Plain dwell time | N |
| Log Dwell | Log dwell time | N |
| Dwell/Total(D + F) | Ratio of dwell to dwell + flight total | N |
| Dwell Min | Minimum dwell time | 1 |
| Dwell Sd | Dwell standard deviation | 1 |
| Flight Root Product | $(n-1)^{th}$ root of (product of all n-1 flights) | 1 |
| Flight f * (1/f-Min − 1/f-Max) | f-Min: minimum of all flights f-Max: maximum of all flights For each flight f, calculate formula to the left | N-1 |
| Total Length | Phrase entry, start to finish | 1 |
| Flight-Total | Sum of flight times | 1 |
| Flight Mean | Mean flight time | 1 |
| Parabola-A-Dwell | Highest order coefficient (of $x^2$) of a parabola through 3 consecutive points Points are (x, y) = (position in string, dwell). A measure for rhythm of 3 | N-2 |
| Dwell d1 − d2 | Dwell differences | N-1 |
| Flight {f1, f2} | Two-dimensional vectors of 2 consecutive flights | N-2 |
| Dwell/Max-Dwell | Ratio of dwell to maximum dwell | N |
| Dwell d/Sum-d | Ratio of dwell to total dwell | N |
| Dwell/Mean-Dwell | Ratio of dwell to mean dwell | N |
| Flight/Median-Flight | Ratio of flight to median flight | N-1 |
| Dwell SND | Standard normal deviate: (Dwell − Average(Dwell))/StdDev(Dwell) | N |
| Flight | Flight time | N-1 |
| Dwell d1/d2 | Pairwise dwell ratios | N-1 |
| Up-Latency: f1 + d2 | Sum of one key's flight time and the next key's dwell time | N-1 |
| Flight/Total D + F | Ratio of flight time to total of dwells and flights | N-1 |
| Flight f1 + f2 | Pairwise flight time sums | N-2 |
| Flight f/Sum-f | Ratio of flight time to sum of all flight times | N-1 |
| Flight/Mean-Flight | Ratio of flight time to mean flight time | N-1 |
| Flight f1 + f2 + f3 | Flight sums by threes | N-3 |
| Flight/Max-Flight | Ratio of flight time to maximum flight time | N-1 |
| Down-Latency: d1 + f1 | Sum of one key's dwell time and the next key's flight time. | N-1 |
| Flight/Min-Flight | Ratio of flight time to minimum flight time | N-1 |
| Flight SND | Standard normal deviate: (f − Avg(all f)/Sd(all f) | N-1 |
| Dwell d * (1/d-Min − 1/d-Max) | d-Min: minimum of all dwells d-Max: maximum of all dwells | N |
| Dwell/Median-Dwell | Ratio of dwell to median dwell | N |
| Dwell/Min-Dwell | Ratio of dwell to minimum dwell | N |
| Flight f1 − f2 | Differences between flight times | N-2 |
| Flight f1/f2 | Ratios of succeeding flight times | N-2 |
| Parabola-A-Flight | Highest order coefficient (of $x^2$) of a parabola through 3 consecutive flight points points are (position in string, flight) A measure for rhythm of 3 | N-3 |
| Log-Radius-Avg(f1, f2) | Log of radius of a circle through 3 consecutive points Each point consists of (position in string, Avg(two consecutive flights)) | N-4 |

-continued

| Derived Data | Definition | Data Points |
|---|---|---|
| Log-Radius-Avg(f1, f2, f3) | Log of radius of a circle through 3 consecutive points. Each point consists of (position in string, Avg(three consecutive flights)) | N-5 |
| Dwell Tendency | Quantized dwell tendencies as described herein | N-1 |
| Log-Radius-Flight | Log of radius of a circle through 3 consecutive points. Each point consists of (position in string, flight) | N-3 |
| Parabola-Curve-Dwell | Curvature of parabola through 3 consecutive points. Points are (position in string, dwell) | N-2 |
| Log-Radius-Avg(d1, d2) | Log of radius of a circle through 3 consecutive points. Each point consists of (position in string, Avg(2 consecutive dwells)) | N-3 |
| Log-Radius-Dwell | Log of radius of a circle through 3 consecutive points. Each point consists of (position in string, dwell) | N-2 |
| Log-Radius-Avg(d1, d2, d3) | Log of radius of a circle through 3 consecutive points. Each point consists of (position in string, Avg(3 consecutive dwells)) | N-4 |
| Flight Sd | Flight standard deviation | 1 |
| Parabola-Guru-Flight | Curvature of parabola through 3 consecutive points. Points are (position in string, flight) | N-3 |
| Flight Max | Maximum flight time | 1 |
| Parabola-Curv-UpLatency | Curvature of parabola through 3 consecutive points. Points are (position in string, up-latency) | N-3 |
| $2f/(f- + f+)$ | Ratio of flight to Average of the 2 immediate neighbour flights<br>f−: previous flight time<br>f+: next flight time | N-3 |
| Parabola-Curv-DownLatency | Curvature of parabola through 3 consecutive points. Points are (position in string, down-latency) | N-3 |
| Curv-Avg(f1, f2) | Curvature of circle through 3 consecutive points. Points are (position in string, Avg(2 consecutive flights)) | N-4 |
| Flight-Tendency | Quantized flight tendency as described herein | N-2 |
| Curv-Flight | Curvature of circle through 3 consecutive points. Points are (position in string, flight) | N-3 |
| Curv-Avg(f1, f2, f3) | Curvature of circle through 3 consecutive points. Points are (position in string, Avg(3 consecutive flights)) | N-5 |
| Curv-Avg(d1, d2) | Curvature of circle through 3 consecutive points. Points are (position in string, Avg(2 consecutive dwells)) | N-3 |
| $2d/(d- + d+)$ | Ratio of dwell to average of its two neighbour dwells in the sequence of keys | N-2 |
| Curv-Dwell | Curvature of circle through 3 consecutive points. Points are (position in string, dwell) | N-2 |
| Radius-Dwell | Radius of circle through 3 consecutive points. Points are (position in string, dwell) | N-2 |
| Curv-Avg(d1, d2, d3) | Curvature of circle through 3 consecutive points. Points are (position in string, Avg(3 consecutive dwells)) | N-4 |
| Radius-Avg(d1, d2) | Radius of circle through 3 consecutive points. Points are (position in string, Avg(2 consecutive dwells)) | N-3 |
| Radius-Avg(d1, d2, d3) | Radius of circle through 3 consecutive points. Points are (position in string, Avg(3 consecutive dwells)) | N-4 |
| Radius-Flight | Radius of circle through 3 consecutive points. Points are (position in string, flight) | N-3 |
| Radius-Avg(f1, f2) | Radius of circle through 3 consecutive points. Points are (position in string, Avg(2 consecutive flights)) | N-4 |
| Radius-Avg(f1, f2, f3) | Radius of circle through 3 consecutive points. Points are (position in string, Avg(3 consecutive flights)) | N-5 |

The embodiments and applications of the present invention have been described largely by reference to specific examples and in terms of particular allocations of functionality to certain mechanisms, hardware and/or software components. However, those of skill in the art will recognize that the account sharing detection can also be achieved by software and hardware that distribute the functions of embodiments of this invention differently than herein described. Those of skill in the art will appreciate that alternatives and modifications of the embodiments of this invention will become apparent to those skilled in the art without departing from the scope of this invention. Such variations and implementations are understood to be captured according to the following claims.

What is claimed is:

1. A method comprising:
receiving a plurality of data samples from two computers having two keyboards, each data sample including feature set data of one character string input on the two keyboards by two users;
calculating distance data between data point vectors of feature set data of each pair of samples;
calculating ratios of mathematical combinations of distances between pairs of data point vectors of the feature set data in each of two clusters of the data point pairs; and
determining that the data samples are from two users based on the distance data and the ratios.

2. The method of claim 1 wherein each data sample includes at least one secondary factor from each of the two computers and related to the keyboard input timing factors; and
wherein determining that the data samples are from two users is also based on the secondary factors.

3. The method of claim 2 wherein the keyboard input timing factors include key press timing data and key release timing data; wherein the secondary factors include non-keyboard timing data automatically sent from the computer or generated without the user's knowledge or control; and wherein the secondary different factors include at least one of a time of day during input of the data sample, a machine identification of the computer, a geographic location of the computer, and an Internet protocol (IP) address.

4. The method of claim 1 wherein each data sample includes: (1) keyboard input timing factors of one character string input on the two keyboards by two users, and (2) at least one secondary factor from each of the two computers and related to the keyboard input timing factors.

5. The method of claim 4 wherein the secondary different factors include at least one of a time of day during input of the data sample, a machine identification of the computer, a geographic location of the computer, or an Internet protocol (IP) address.

6. The method of claim 5 wherein the keyboard input timing factors include key press timing data and key release timing data, and wherein the secondary factors include non-keyboard timing data automatically sent from the computer or generated without the user's knowledge or control.

7. The method of claim 6 wherein determining comprises:
calculating feature set data of each pair of the samples using the keyboard input timing factor data and the non-keyboard factor data; and
comparing the feature set data of each pair of samples to at least one threshold to group the samples into at least one cluster.

8. The method of claim 7 wherein comparing comprises:
calculating distance data between each pair of data point vectors of the feature set data of each pair of samples;
calculating ratios of mathematical combinations of distances between a plurality of subsets, each subset including a plurality of the data point vectors of the feature set data; and
identifying the existence of at least one cluster of the feature set data by comparing the ratio data to a ratio threshold and by comparing the distance data to a distance threshold.

9. The method of claim 8 further comprising, prior to calculating distance data, identifying and discarding at least one outlier data point pair in each pair of data point vectors of the feature set data of each pair of samples.

10. The method of claim 8, wherein calculating distance data comprises calculating time difference measurements between pairs of data points of keyboard input timing factors;
wherein calculating ratio data comprises calculating ratios of mathematical combinations of the average time difference measurements between inter-cluster and intra-cluster pairs of data points of feature sets of pairs of samples; and
wherein identifying the existence of at least one cluster comprises at least one of completely removing a cluster, merging two clusters, and identifying as distinct a cluster based on (1) comparing the distance data to a distance threshold, and (2) comparing the ratios to a ratio threshold.

11. The method of claim 6, wherein determining comprises:
using keystroke dynamics and another factor to identify and count patterns of the data samples that can be linked to distinct persons using an account; wherein identifying comprises using cluster analysis to group keystroke patterns into groups of similar samples and separate dissimilar samples; and wherein grouping comprises using multiple distance measure merge criteria and discarding outliers.

12. The method of claim 11, wherein using multiple distance measure merge criteria includes:
using outlier tolerant distance calculations in connection with feature-specific distances, where outlier tolerance is achieved by eliminating a percentage q of pairs of matching data points from each pair of samples;
using a mathematical combination of inter-cluster distances of two clusters to be compared as a primary measure; and
using as a secondary measure a mathematical ratio function based on the intra-cluster distances of each of the clusters and the intra-cluster distances of the union of the two clusters.

13. The method of claim 12, further comprising prior to calculating distances between dwell time and flight time data points, identifying and discarding outliers of the dwell time and flight time data points of each pair of samples.

14. The method of claim 6 wherein determining comprises:
calculating a plurality of dwell time data points and flight time data points for each sample;
calculating distances between dwell time and flight time data points of each pair of samples;
calculating ratios of (1) mathematical combinations of distances between the pairs of data point vectors within each cluster of the first set of clusters and (2) mathematical combinations of distances between the pairs of data point vectors within a union of two clusters of the first set of clusters;
calculating distances between data points of the secondary factors of each pair of samples within each cluster of the set of clusters; and
comparing the distances to a first threshold, comparing the ratios to a second threshold, and comparing the distances of the secondary factors to a third threshold to identify a set of clusters.

15. A specialized computer server system comprising:
a network communication input device receiving a plurality of data samples;
a database of the computer server system storing the plurality of data samples received from at least one computer, each data sample including: (1) keyboard input timing factors of a plurality of characters of one username and password combination input on at least one keyboard of one type of keyboard of the at least one computer by at least one user, and (2) at least one secondary factor from each of the at least one computers and related to the keyboard input timing factors;

a share detect engine of the computer server system to determine whether the samples are from more than one user based on the keyboard input timing factors and based on the secondary factors, wherein the share detect engine further comprises an authentication model to:
  identify and discard outlier data point pairs of the feature set data of each pair of samples;
  calculate distance data between each non-discarded data point pair of the feature set data of each pair of samples;
  identify the existence of two clusters of the feature set data by comparing the distance data to a distance threshold;
  based on the distance data, calculate a first ratio of (1) an average distance between the combinations of all inter-cluster distances of data point pairs of the feature set data in both of the two clusters, and (2) an average distance between the combinations of all intra-cluster distance of data point pairs of the feature set data in a first of the two clusters;
  based on the distance data, calculate a second ratio of (1) the average distance between the combinations of all inter-cluster distances of data point pairs of the feature set data in both of the two clusters, and (2) an average distance between the combinations of all intra-cluster distance of data point pairs of the feature set data in a second of the two clusters;
  one of (a) merging the first and second cluster, (b) discarding the first or second cluster, and (c) identify the first or second cluster as distinct by comparing the first and second ratio to a ratio threshold; and
one of a display, a network communication output, and a printer to display a warning identifying that the samples are from more than one user.

* * * * *